US012370979B2

(12) United States Patent
Liu et al.

(10) Patent No.: US 12,370,979 B2
(45) Date of Patent: Jul. 29, 2025

(54) VEHICLE CONTROL METHOD AND RELATED APPARATUS

(71) Applicant: SHENZHEN YINWANG INTELLIGENT TECHNOLOGIES CO., LTD., Guangdong (CN)

(72) Inventors: Nan Liu, Shenzhen (CN); Miao Yang, Beijing (CN); Mingchao Li, Beijing (CN)

(73) Assignee: Shenzhen Yinwang Intelligent Technologies Co., Ltd., Shenzhen (CN)

(*) Notice: Subject to any disclaimer, the term of this patent is extended or adjusted under 35 U.S.C. 154(b) by 74 days.

(21) Appl. No.: 18/541,418

(22) Filed: Dec. 15, 2023

(65) Prior Publication Data
US 2024/0109513 A1 Apr. 4, 2024

Related U.S. Application Data

(63) Continuation of application No. PCT/CN2022/098419, filed on Jun. 13, 2022.

(30) Foreign Application Priority Data
Jun. 16, 2021 (CN) .......................... 202110669569.7

(51) Int. Cl.
B60R 25/24 (2013.01)
(52) U.S. Cl.
CPC ................... B60R 25/243 (2013.01)
(58) Field of Classification Search
None
See application file for complete search history.

(56) References Cited

U.S. PATENT DOCUMENTS

2013/0179005 A1\* 7/2013 Nishimoto .......... B60R 25/1001
701/2
2019/0266896 A1 8/2019 Kobayashi

FOREIGN PATENT DOCUMENTS

| CN | 112905981 A | 6/2021 |
| EP | 3643859 A1 | 4/2020 |
| EP | 4043298 A1 | 8/2022 |
| WO | 2021082193 A1 | 5/2021 |

OTHER PUBLICATIONS

International Search Report and Written Opinion in International Appln. No. PCT/CN2022/098419, mailed on Aug. 29, 2022, 17 pages (with English translation).
Extended European Search Report in European Appln. No. 22824159. 2, mailed on Aug. 20, 2024, 15 pages.

\* cited by examiner

*Primary Examiner* — K. Wong
(74) *Attorney, Agent, or Firm* — Fish & Richardson P.C.

(57) ABSTRACT

The present disclosure relates to vehicle control methods and apparatuses, applied to fields such as intelligent vehicles. In one example method, an authentication apparatus (for example, a road side apparatus, a vehicle management platform, or a special vehicle) is assigned control permission for a vehicle. When an unlocking requester has a requirement for opening a vehicle lock, the authentication apparatus may indicate to open the vehicle lock. Accordingly, the unlocking requester can open the vehicle lock in a timely manner when a vehicle owner is not near the vehicle or a passenger on the vehicle cannot control the vehicle.

30 Claims, 11 Drawing Sheets

VEHICLE CONTROL METHOD AND RELATED APPARATUS

CROSS-REFERENCE TO RELATED APPLICATIONS

This application is a continuation of International Application No. PCT/CN2022/098419, filed on Jun. 13, 2022, which claims priority to Chinese Patent Application No. 202110669569.7, filed on Jun. 16, 2021. The disclosures of the aforementioned applications are hereby incorporated by reference in their entireties.

TECHNICAL FIELD

This application relates to the vehicle control field, and specifically, to a vehicle control method and a related apparatus.

BACKGROUND

In a process of using a vehicle, to ensure body or property safety of a user, the vehicle is locked by using a vehicle lock. In a current vehicle lock control process, for example, when the vehicle lock is controlled by using an electronic key or a control button in the vehicle, a vehicle owner needs to perform control manually. When the vehicle owner is not near the vehicle or the vehicle owner is in an unconscious state, the vehicle owner or another person cannot lock or unlock the vehicle, resulting in inconvenient use experience of the user. Especially in emergencies, financial security may be endangered or passengers' lives may be threatened.

For example, if the vehicle owner leaves a child or pet in the vehicle, and another person fails to contact the vehicle owner, the vehicle lock cannot be opened in a timely manner. This may delay the rescue and endanger life safety. For another example, for a vehicle with an emergency assistance (EA) function, when the vehicle recognizes, by using a driver monitoring system, that a driver is in an abnormal state and cannot continue to drive the vehicle, the vehicle is controlled to gradually decelerate and stop. After the vehicle stops, hazard lights are automatically turned on, and the vehicle is unlocked, so that rescue personnel can open a door of the vehicle from the outside to perform a rescue action. However, if the vehicle stops and a field of view in an environment around the vehicle is poor, for example, a parking location is on a curve or haze affects visibility, the vehicle may encounter a rear-end collision. In this case, because the vehicle has been unlocked, the vehicle is more likely to be accidentally opened due to impact, causing an additional injury risk to the driver or a passenger.

How to conveniently and safely control locking or unlocking of a vehicle is a technical problem to be urgently resolved by a person skilled in the art.

SUMMARY

This application provides a vehicle control method and a related apparatus, to conveniently and safely control locking and/or unlocking of a vehicle, so as to improve use experience of a user.

According to a first aspect, an embodiment of this application provides a vehicle control method, including:

receiving first information from a first vehicle, where the first information is used to perform authorization or indicates that the first vehicle is in a first state, and the first vehicle that performs authorization is in a locked state, or a vehicle in the first state is in a locked state, or an authorized apparatus is capable of releasing a vehicle in the first state from a locked state;

receiving second information from a terminal apparatus, where the second information is used to request to release the locked state of the first vehicle, and the second information includes verification information; and sending unlocking indication information to the first vehicle based on the verification information, where the unlocking indication information indicates to release the locked state of the first vehicle.

The method may be applied to an authentication apparatus, and is performed by the authentication apparatus or a component (for example, a chip, a software module, or a hardware module) in the authentication apparatus.

In an embodiment of this application, the authentication apparatus has permission to control a vehicle. The authentication apparatus serves as a trusted management intermediary between the vehicle and an unlocking requester, to more conveniently and safely control an external status of the first vehicle (for example, a locked state or an unlocked state of a vehicle door or a rear trunk, an opened state or a closed state of a vehicle window, or an opened state or a closed state of a sunroof). For example, a vehicle lock may be opened when a vehicle owner is not nearby or a passenger in the vehicle has no lock control capability, so that rescue personnel can enter the vehicle in an emergency to perform rescue. This reduces personal danger caused because the vehicle lock cannot be opened in a timely manner. For another example, an item may be placed into the vehicle or taken out of the vehicle without damaging the vehicle, so that a user has better vehicle use experience.

For example, when a child or a pet is left in the first vehicle, if a danger occurs, the first vehicle may notify the authentication apparatus of the locked state of the first vehicle by using the first information, and a rescue vehicle may send the second information to the authentication apparatus after arriving. Correspondingly, the authentication apparatus may indicate the first vehicle to release the locked state, so that rescue personnel can rescue the child or the pet in the first vehicle without forcibly opening a vehicle door, breaking a window, or the like. This improves rescue efficiency, and further avoids secondary injury to a passenger in the first vehicle.

For example, for a vehicle with an emergency assistance (EA) function, if a danger occurs, the vehicle may broadcast the first information to the authentication apparatus after the vehicle is parked. After rescue personnel arrive, the rescue personnel send the second information to the authentication apparatus by using a rescue vehicle, a special terminal, or the like, so that the authentication apparatus indicates to open the door lock of the vehicle. This prevents the vehicle from opening the door lock of the vehicle after the vehicle is parked in danger, so that a safety risk is reduced.

In a possible implementation of the first aspect, the authentication apparatus is a road side apparatus or a vehicle management platform, or the authentication apparatus is located in a road side apparatus or a vehicle management platform.

In another possible implementation of the first aspect, the terminal apparatus includes but is not limited to an intelligent terminal or a vehicle like a mobile phone, an automobile, a robot, or an uncrewed aerial vehicle.

Optionally, the foregoing vehicle used as the terminal apparatus may be a special vehicle (including but not limited to a police car, a tractor, a logistics vehicle, or the like) or a rescue vehicle (including but not limited to an ambulance, a fire engine, a recovery vehicle, or the like). Alternatively, the vehicle used as the terminal apparatus may be a preset or predefined trusted vehicle, for example, a trusted vehicle pre-added by the owner of the first vehicle, or a vehicle of a relative of the owner of the first vehicle.

Optionally, the foregoing terminal apparatus may alternatively be a special terminal apparatus, for example, an intelligent terminal like a mobile policing terminal or an express terminal.

In another possible implementation of the first aspect, the method further includes:
receiving first vehicle identity indication information from the first vehicle, where the first vehicle identity indication information indicates the first vehicle or a first user that uses the first vehicle.

It should be noted that the first vehicle identity indication information and the first information may be a same piece of information, or may be different pieces of information.

In another possible implementation of the first aspect, the sending unlocking indication information to the first vehicle based on the verification information includes:
determining, based on the verification information and the first vehicle identity indication information, that the terminal apparatus is an apparatus authorized to release the locked state of the first vehicle; and
sending the unlocking indication information to the first vehicle.

The foregoing implementation describes a case that the authentication apparatus may use the first vehicle identity indication information during authentication or authorization.

For example, the terminal apparatus may be a private apparatus, for example, a private car. Usually, the private car needs to be a vehicle pre-authorized by the first vehicle, or a user that uses the private car needs to have a kinship or another trust relationship with the user that uses the first vehicle. In this case, the first vehicle needs to provide the first vehicle identity indication information, to determine whether the terminal apparatus has permission to release the locked state of the first vehicle.

For example, in another design, the terminal apparatus may be a trusted public rescue apparatus, for example, a fire engine or an ambulance. In this case, the first vehicle may need to provide the first vehicle identity indication information, to determine whether the first vehicle or the user that uses the first vehicle subscribes to a public rescue service.

Certainly, the authentication apparatus may alternatively not need the first vehicle identity indication information during authentication or authorization. For example, in another possible design, it is considered by default that a public rescue apparatus is granted, in a specific condition (for example, the first vehicle sends the first information in a unicast manner or in a broadcast manner), permission to release locked states of all vehicles.

In another possible implementation of the first aspect, the verification information includes identification information of the terminal apparatus or identification information of a second user that uses the terminal apparatus.

In another possible implementation of the first aspect, the sending unlocking indication information to the first vehicle based on the verification information includes:
when the identification information of the terminal apparatus indicates an apparatus authorized to release the locked state of the first vehicle, or the identification information of the second user that uses the terminal apparatus indicates a user authorized to release the locked state of the first vehicle, determining to release the locked state of the first vehicle; and
sending the unlocking indication information to the first vehicle.

It can be learned that when it is determined that the terminal apparatus has control permission, it is indicated to release the locked state of the first vehicle. This can avoid a potential safety risk caused by unauthorized releasing of the locked state of the vehicle, and improve safety.

In another possible implementation of the first aspect, the sending unlocking indication information to the first vehicle based on the verification information includes:
when the identification information of the terminal apparatus indicates an authorized apparatus for the first vehicle or the identification information of the second user that uses the terminal apparatus indicates an authorized user for a second vehicle, determining to release the locked state of the first vehicle; and
sending the unlocking indication information to the first vehicle.

In another possible implementation of the first aspect, the verification information includes type information of the terminal apparatus.

In another possible implementation of the first aspect, the sending unlocking indication information to the first vehicle based on the verification information includes:
when the type information of the terminal apparatus indicates an authorized type, determining to release the locked state of the first vehicle; and
sending the unlocking indication information to the first vehicle.

In another possible implementation of the first aspect, the unlocking indication information further includes security information and/or identification information of the authentication apparatus.

In another possible implementation of the first aspect, the method further includes:
when no third information for requesting to maintain an unlocked state of the first vehicle is received within a preset time period after the second information is received,
sending locking indication information to the first vehicle, where the locking indication information is used to control the first vehicle to be in the locked state.

It can be learned that if the third information is not received within the preset time period, the first vehicle may be indicated to lock the vehicle door, to avoid a property loss.

In another possible implementation of the first aspect, the second information includes time information (which may also be referred to as first time information or time information T1 for ease of differentiation), and the time information T1 indicates a time period for which the first vehicle is to maintain the unlocked state.

The time information T1 may be at least one of duration, a moment, counter information, a validity period, or the like. For example, the time information T1 is 1 hour, indicating that if the vehicle door lock is opened, the vehicle door lock may maintain an unlocked state for 1 hour (a start time point may be preset, or may be a moment of receiving the second information, or may be a moment of opening the vehicle door lock). It can be learned that, according to the time information T1, the vehicle door may be locked after the duration expires, to avoid a property loss.

In another possible implementation of the first aspect, the unlocking indication information includes time information (which may also be referred to as second time information or time information T2 for ease of differentiation), and the time information T2 indicates the time period for which the first vehicle is to maintain the unlocked state.

In another possible implementation of the first aspect, the first information is periodically repeated information. The first vehicle may continuously notify the road side apparatus of an updated status of the first vehicle by sending the periodic first information, so that the road side apparatus performs, in a timely manner, an operation that matches the latest status of the first vehicle. In addition, periodically repeated sending can increase a possibility that the first information is successfully received.

In another possible implementation of the first aspect, the second information is periodically repeated information. Periodically repeated sending can increase a possibility that the second information is successfully received by the road side apparatus. In addition, the periodically repeated sending may further indicate that a request of the terminal apparatus for requesting to release the locked state persists. That is, if the terminal apparatus stops periodically sending the second information, it may indicate that the terminal apparatus changes from expecting to release the locked state to not expecting to release the locked state.

In another possible implementation of the first aspect, the unlocking indication information is periodically repeated information. Periodically repeated sending can increase a possibility that the unlocking indication information is successfully received by the first vehicle. In addition, the periodically repeated sending may further indicate that the road side apparatus expects the first vehicle to be in the unlocked state continuously. That is, if the road side apparatus stops periodically sending the unlocking indication information, it may indicate that the road side apparatus changes from expecting the first vehicle to be in the unlocked state to not expecting the first vehicle to be in the unlocked state.

The first information, the second information, and the unlocking indication information may all be periodically repeated information, or one or two of the first information, the second information, and the unlocking indication information may be periodically repeated information.

In another possible implementation of the first aspect, the first information is the following message or is carried in the following message:
 a help-seeking message broadcast by the first vehicle;
 an authorization indication message sent by the first vehicle to the authentication apparatus, where the authorization indication message indicates that the authentication apparatus has obtained authorization to control the first vehicle; or
 a request message sent by the first vehicle to the authentication apparatus, where the request message is used to request the road side apparatus to start control on the first vehicle based on authorization.

In another possible implementation of the first aspect, the first information includes time information (which may also be referred to as third time information or time information T3 for ease of differentiation), and the time information T3 indicates a time period in which the authorized apparatus is capable of releasing the first vehicle from the locked state.

According to the time information T3, the vehicle may be locked after duration indicated by the time information T3 expires, to avoid a property loss.

In another possible implementation of the first aspect, the first information includes vehicle lock indication information.

The vehicle lock indication information indicates a vehicle lock to be released from a locked state, and the vehicle lock to be released from the locked state includes at least one of a driver-side door lock, a front-passenger-side door lock, a rear seat door lock, a rear trunk lock, a front trunk lock, a sunroof lock, and the like that are of the first vehicle.

In another possible implementation of the first aspect, the second information includes the vehicle lock indication information.

In another possible implementation of the first aspect, the unlocking indication information includes the vehicle lock indication information.

It can be learned that the vehicle lock indication information is carried in the unlocking indication information, to notify a receiver of a vehicle lock expected to be unlocked. Further, a sender may indicate, based on information such as a vehicle condition, which lock (or locks) is to be opened, to control the vehicle more properly. For example, when an express package needs to be placed or an item in a rear trunk needs to be taken, it may be indicated to unlock the rear trunk, but a cockpit door may not be unlocked. This reduces a potential safety risk caused by unauthorized unlocking of the vehicle door, avoids an item loss, data leakage, or the like in a cockpit, improves service quality of the vehicle, and improves user experience.

In another possible implementation of the first aspect, the method further includes:
 receiving a first signature from the terminal apparatus, where the first signature is determined based on the second information and a first private key; and
 determining, based on the first signature and a first public key, that verification on the second information succeeds, where the first public key is a decryption key for the first private key.

According to a second aspect, an embodiment of this application provides a vehicle control method, including:
 sending first information, where the first information is used to perform authorization or indicates that a first vehicle is in a first state, and the first vehicle that performs authorization is in a locked state, or a vehicle in the first state is in a locked state, or an authorized apparatus is capable of releasing a vehicle in the first state from a locked state;
 receiving unlocking indication information from an authentication apparatus, where the unlocking indication information indicates to release the locked state of the first vehicle; and
 generating a control signal based on the unlocking indication information, where the control signal is used to release the locked state of the first vehicle.

The foregoing method may be applied to the first vehicle, that is, performed by the first vehicle or a component (for example, a chip, a software module, or a hardware module) in the first vehicle.

In a possible implementation of the second aspect, the method further includes:
 sending first vehicle identity indication information to the authentication apparatus, where the first vehicle identity indication information indicates the first vehicle or a first user that uses the first vehicle.

It should be noted that the first vehicle identity indication information and the first information may be a same piece of information, or may be different pieces of information.

In a possible implementation of the second aspect, the unlocking indication information further includes security information and/or identification information of the authentication apparatus.

In another possible implementation of the second aspect, the generating a control signal based on the unlocking indication information includes:
  determining identity information of the authentication apparatus based on the security information; and
  generating the control signal.

In another possible implementation of the second aspect, the generating a control signal based on the unlocking indication information includes:
  determining, based on the identification information of the authentication apparatus, that the authentication apparatus is an authorized apparatus; and
  generating the control signal.

In a possible implementation of the second aspect, the method further includes:
  receiving second information from a terminal apparatus, where the second information is used to request to release the locked state of the first vehicle; and
  the sending first information includes: sending the first information in response to the second information.

In another possible implementation of the second aspect, the terminal apparatus includes but is not limited to an intelligent terminal or a vehicle like a mobile phone, an automobile, a robot, or an uncrewed aerial vehicle.

Optionally, the foregoing vehicle used as the terminal apparatus may be a special vehicle (including but not limited to a police car, a tractor, a logistics vehicle, or the like) or a rescue vehicle (including but not limited to an ambulance, a fire engine, a recovery vehicle, or the like). Alternatively, the vehicle used as the terminal apparatus may be a preset or predefined trusted vehicle, for example, a trusted vehicle pre-added by the owner of the first vehicle, or a vehicle of a relative of the owner of the first vehicle.

Optionally, the foregoing terminal apparatus may alternatively be a special terminal apparatus, for example, an intelligent terminal like a mobile policing terminal or an express terminal.

In another possible implementation of the second aspect, the second information includes identification information of the terminal apparatus, and the first information includes the identification information of the terminal apparatus.

In another possible implementation of the second aspect, the second information includes identification information of a second user that uses the terminal apparatus, and the first information includes the identification information of the second user.

In another possible implementation of the second aspect, the method further includes:
  when no information for indicating to maintain an unlocked state of the first vehicle is received within a preset time period after the unlocking indication information is received,
  generating a locking control signal, where the locking control signal is used to control the first vehicle to be in the locked state.

It can be learned that the first vehicle can control a time period for which the first vehicle maintains the unlocked state. For example, the information for maintaining the unlocked state of the first vehicle may be unlocking indication information sent periodically or aperiodically. For example, the unlocking indication information may be sent once every 10 minutes, and the preset time period is 12 minutes. If the unlocking indication information is not received again within 12 minutes (optionally, including 12 minutes) after the first vehicle releases the locked state of the first vehicle, the locking control signal is generated, to avoid unauthorized unlocking.

In another possible implementation of the second aspect, the method further includes:
  when the first vehicle is still in the locked state within a preset time period after the unlocking indication information is received,
  generating a locking control signal, where the locking control signal is used to control the first vehicle to be in the locked state.

It can be learned that the first vehicle can control a time period for which the first vehicle maintains the unlocked state. For example, if a door of the first vehicle is not opened within a preset time period after the door is unlocked, the vehicle may be controlled to be in the locked state, to avoid unauthorized opening of the door.

Further, if the first vehicle is originally in the locked state, the first vehicle may maintain the locked state. If the first vehicle is in the unlocked state, the locking control signal is generated, to control the first vehicle to be in the locked state.

In another possible implementation of the second aspect, the unlocking indication information includes time information (which is referred to as first time information or time information T2 for ease of description), and the time information T2 indicates a time period for which the first vehicle is to maintain the unlocked state.

In another possible implementation of the second aspect, the first information is periodically repeated information.

In another possible implementation of the second aspect, the unlocking indication information is periodically repeated information.

In another possible implementation of the second aspect, the first information is the following message or is carried in the following message:
  a help-seeking message broadcast by the first vehicle;
  an authorization indication message sent by the first vehicle to the authentication apparatus, where the authorization indication message indicates that the authentication apparatus has obtained authorization to control the first vehicle; or
  a request message sent by the first vehicle to the authentication apparatus, where the request message is used to request the road side apparatus to start control on the first vehicle based on authorization.

In another possible implementation of the second aspect, the first information includes time information (which is referred to as second time information or time information T3 for ease of description), and the time information T3 indicates a time period in which the authorized apparatus is capable of releasing the first vehicle from the locked state.

In another possible implementation of the second aspect, the first information includes vehicle lock indication information, and the vehicle lock indication information indicates a vehicle lock to be released from a locked state.

The vehicle lock to be released from the locked state includes at least one of a driver-side door lock, a front-passenger-side door lock, a rear seat door lock, a rear trunk lock, a front trunk lock, a sunroof lock, and the like that are of the first vehicle.

In another possible implementation of the second aspect, the unlocking indication information includes the vehicle lock indication information, and the vehicle lock indication information indicates the vehicle lock to be released from the locked state.

According to a third aspect, an embodiment of this application provides a vehicle control method, including:

sending first information to an authentication apparatus, where the first information is used to perform authorization or indicates that a first vehicle is in a first state, and the first vehicle that performs authorization is in a locked state, or a vehicle in the first state is in a locked state, or an authorized apparatus is capable of releasing a vehicle in the first state from a locked state;

receiving unlocking request information from a terminal apparatus, where the unlocking request information includes verification information; and generating a control signal based on the verification information, where the control signal is used to release the locked state of the first vehicle.

The foregoing method is applied to the first vehicle, that is, performed by the first vehicle or a component (for example, a chip, a software module, or a hardware module) in the first vehicle.

In an embodiment of this application, a vehicle management platform may assign vehicle control permission to the terminal apparatus, and the terminal apparatus may control opening of a vehicle door lock based on the permission, to conveniently and safely control the vehicle door lock.

In a possible implementation of the third aspect, the terminal apparatus includes but is not limited to an intelligent terminal or a vehicle like a mobile phone, an automobile, a robot, or an uncrewed aerial vehicle.

Optionally, the foregoing vehicle used as the terminal apparatus may be a special vehicle (including but not limited to a police car, a tractor, a logistics vehicle, or the like) or a rescue vehicle (including but not limited to an ambulance, a fire engine, a recovery vehicle, or the like). Alternatively, the vehicle used as the terminal apparatus may be a preset or predefined trusted vehicle, for example, a trusted vehicle pre-added by the owner of the first vehicle, or a vehicle of a relative of the owner of the first vehicle.

Optionally, the foregoing terminal apparatus may alternatively be a special terminal apparatus, for example, an intelligent terminal like a mobile policing terminal or an express terminal.

In another possible implementation of the third aspect, the method further includes:

sending second information to the terminal apparatus, where the second information indicates that the first vehicle is in the first state; or sending second information to the terminal apparatus, where the second information indicates that the first vehicle authorizes the authentication apparatus or indicates the authentication apparatus.

In another possible implementation of the third aspect, the second information includes identification information of the first vehicle or identification information of a user that uses the first vehicle.

In another possible implementation of the third aspect, the method further includes:

receiving third information from the terminal apparatus, where the third information is used to request to release the locked state of the first vehicle, where the sending first information to an authentication apparatus includes: sending the first information to the authentication apparatus based on receiving of the third information.

In another possible implementation of the third aspect, the third information includes an identifier of the terminal apparatus or an identifier of a user that uses the terminal apparatus.

In another possible implementation of the third aspect, the method further includes:

when no information for indicating to maintain an unlocked state of the first vehicle is received within a preset time period after the unlocking indication information is received, or when the first vehicle is still in the locked state within a preset time period after the unlocking request information is received, generating a locking control signal, where the locking control signal is used to control the first vehicle to be in the locked state.

In another possible implementation of the third aspect, the unlocking request information includes time information (which may also be referred to as first time information or time information T4 for ease of differentiation), and the time information T4 indicates a time period for which the first vehicle is to maintain the unlocked state.

In another possible implementation of the third aspect, the first information is periodically repeated information.

In another possible implementation of the third aspect, the unlocking request information is periodically repeated information.

In another possible implementation of the third aspect, the first information is or is carried in an E-call request message.

In another possible implementation of the third aspect, the first information includes time information (which may also be referred to as second time information or time information T5 for ease of differentiation), and the time information T5 indicates a time period in which the authorized apparatus is capable of releasing a vehicle lock of the first vehicle from a locked state.

In another possible implementation of the third aspect, the first information includes vehicle lock indication information, and the vehicle lock indication information indicates a vehicle lock to be released from a locked state.

The vehicle lock to be released from the locked state includes at least one of a driver-side door lock, a front-passenger-side door lock, a rear seat door lock, a rear trunk lock, a front trunk lock, a sunroof lock, and the like that are of the first vehicle.

In another possible implementation of the third aspect, the unlocking request information includes the vehicle lock indication information, and the vehicle lock indication information indicates the vehicle lock to be released from the locked state.

According to a fourth aspect, an embodiment of this application provides a vehicle door lock control method, including:

sending authorization request information to an authentication apparatus, where the authorization request information is used to request to grant permission to release a locked state of a first vehicle;

receiving authorization information from the authentication apparatus, where the authorization information includes verification information, and the verification information indicates that the terminal apparatus is granted the permission to release the locked state of the first vehicle; and sending unlocking request information to the first vehicle, where the unlocking request information includes the verification information, and the unlocking request information is used to request to release the locked state of the first vehicle.

The foregoing method is applied to a terminal apparatus, that is, performed by the terminal apparatus or a component (for example, a chip, a software module, or a hardware module) in the terminal apparatus.

In an embodiment of this application, the terminal apparatus may obtain vehicle control permission by using a vehicle management platform, to control an external status of a vehicle based on the permission, so as to conveniently and safely control a vehicle door lock.

In a possible implementation of the fourth aspect, the method further includes:

receiving first information from the first vehicle, where the first information indicates that the first vehicle authorizes the authentication apparatus, or indicates the authentication apparatus, or indicates that the first vehicle is in a first state, where a vehicle in the first state is in a locked state, or an authorized apparatus is capable of releasing a vehicle in the first state from a locked state.

In another possible implementation of the fourth aspect, the method further includes:

sending second information to the first vehicle, where the second information is used to request to release the locked state of the first vehicle.

In another possible implementation of the fourth aspect, the unlocking request information is periodically repeated information.

In another possible implementation of the fourth aspect, the unlocking request information includes time information (which may also be referred to as time information T4 for ease of differentiation), and the time information T4 indicates a time period for which the first vehicle is to maintain the unlocked state.

In another possible implementation of the fourth aspect, the first information includes vehicle lock indication information, and the vehicle lock indication information indicates a vehicle lock to be released from a locked state.

The vehicle lock to be released from the locked state includes at least one of a driver-side door lock, a front-passenger-side door lock, a rear seat door lock, a rear trunk lock, a front trunk lock, and a sunroof lock that are of the first vehicle.

In another possible implementation of the fourth aspect, the unlocking request information includes the vehicle lock indication information, and the vehicle lock indication information indicates the vehicle lock to be released from the locked state.

According to a fifth aspect, an embodiment of this application provides a vehicle control method, including:

receiving first information from a first vehicle, where the first information is used to perform authorization or indicates that the first vehicle is in a first state, and the first vehicle that performs authorization is in a locked state, or a vehicle in the first state is in a locked state, or an authorized apparatus is capable of releasing a vehicle in the first state from a locked state;

receiving authorization request information from a terminal apparatus, where the authorization request information is used to request to grant permission to release the locked state of the first vehicle; and sending authorization information to the terminal apparatus, where the authorization information includes verification information, and the verification information indicates that the terminal apparatus is granted the permission to release the locked state of the first vehicle.

The method may be applied to an authentication apparatus, and is performed by the authentication apparatus or a component (for example, a chip, a software module, or a hardware module) in the authentication apparatus.

In a possible implementation of the fifth aspect, the second vehicle may be a special vehicle (including but not limited to a police car, a tractor, a logistics vehicle, or the like) or a rescue vehicle (including but not limited to an ambulance, a fire engine, a recovery vehicle, or the like).

In another possible implementation of the fifth aspect, the verification information may include one or more of identification information of a terminal apparatus, identification information of a user that uses the terminal apparatus, type information of the terminal apparatus, an authorization letter, a permission code, a verification code, a security parameter, or the like.

In another possible implementation of the fifth aspect, the first information includes time information (which may also be referred to as time information T5 for ease of differentiation), and the time information T5 indicates a time period in which the authorized apparatus is capable of releasing a vehicle lock of the first vehicle from a locked state.

In another possible implementation of the fifth aspect, the first information is periodically repeated information.

In another possible implementation of the fifth aspect, the first information is or is carried in an in-vehicle emergency call E-call request message.

In another possible implementation of the fifth aspect, the first information includes vehicle lock indication information, and the vehicle lock indication information indicates a vehicle lock to be released from a locked state.

The vehicle lock to be released from the locked state includes at least one of a driver-side door lock, a front-passenger-side door lock, a rear seat door lock, a rear trunk lock, a front trunk lock, and a sunroof lock that are of the first vehicle.

According to a sixth aspect, an embodiment of this application provides a vehicle control method, including:

receiving request information from a second vehicle, where the request information is used to request to release a locked state of a first vehicle, the request information includes verification information, and the verification information is used to verify whether the second vehicle has permission to release the locked state of the first vehicle;

determining, based on the verification information, that the second vehicle has the permission to release the locked state of the first vehicle; and generating a control signal, where the control signal is used to release the locked state of the first vehicle.

The foregoing method may be applied to the first vehicle, the first vehicle is in a first state, and a vehicle in the first state is in a locked state, or an authorized apparatus is capable of releasing a vehicle in the first state from a locked state.

Further, the foregoing method may be performed by the first vehicle or a component (for example, a chip, a software module, or a hardware module) in the first vehicle.

In the foregoing embodiment, a terminal apparatus has permission to control a vehicle door lock of the first vehicle, and may send request information to the first vehicle, to request to release the locked state of the first vehicle. The first vehicle may release the locked state after verifying the permission of the terminal apparatus, to conveniently and safely control the vehicle door lock.

In a possible implementation of the sixth aspect, the second vehicle may be a special vehicle (including but not limited to a police car, a tractor, a logistics vehicle, or the like) or a rescue vehicle (including but not limited to an ambulance, a fire engine, a recovery vehicle, or the like).

In another possible implementation of the sixth aspect, the verification information may include one or more of identification information of a terminal apparatus, identification information of a user that uses the terminal apparatus, type information of the terminal apparatus, an authorization letter, a permission code, a verification code, a security parameter, or the like.

In another possible implementation of the sixth aspect, the first vehicle includes an image sensor, and after the receiving unlocking request information from a second vehicle, the method further includes:

obtaining a first image or a first video by using the image sensor.

In the foregoing implementation, after receiving the unlocking request information, the vehicle may obtain an image or a video around the first vehicle by using the image sensor (if the image sensor is not turned on, the image sensor may be first turned on). The image or the video may be stored in the first vehicle, or may be uploaded to a cloud or sent to another device, to record a situation around the vehicle.

In another possible implementation of the sixth aspect, before an unlocking control signal used to open the vehicle door lock is generated, the method further includes:

recognizing a target object based on the first image or the first video; and determining that an identity of the target object is trusted.

In the foregoing implementation, the first image or the first video may be used for information recognition. If it is recognized that the image or the video includes the target object, and the identity of the target object is trusted, the vehicle door lock may be opened.

For example, when the vehicle is in a help-seeking state, if the unlocking request information is received, the first vehicle may obtain an image around the vehicle by using a surround vision system. If the image includes the second vehicle, after the first vehicle determines that an identity of the second vehicle is trusted (for example, recognizes that the second vehicle is a special vehicle or a rescue vehicle), the first vehicle may release the locked state.

For another example, when the vehicle is in a help-seeking state, if the unlocking request information is received, the first vehicle may obtain an image around the vehicle by using a surround vision system. If the image includes a target person, after the first vehicle may determine that an identity of the target person is trusted (for example, the target person is a person with a special occupation, for example, a policeman, a doctor, or a firefighter, or the target person is a trusted person preset in the first vehicle, for example, a relative or a friend of a vehicle owner), the first vehicle may release the locked state.

In another possible implementation of the sixth aspect, the determining, based on the verification information, that the second vehicle has the permission to release the locked state of the first vehicle includes:

obtaining authorization information; and determining, based on the verification information and the authorization information, that the second vehicle has the permission to release the locked state of the first vehicle.

The authorization information indicates a user, a user type, an apparatus, or an apparatus type with the permission. When a user indicated by the verification information is the user indicated by the authorization information, when a user type indicated by the verification information is the user type indicated by the authorization information, when an apparatus indicated by the verification information is the apparatus indicated by the authorization information, when an apparatus type indicated by the verification information is the apparatus type indicated by the authorization information, when there is a correspondence between an apparatus indicated by the verification information and the apparatus indicated by the authorization information, or when there is a correspondence between a user indicated by the verification information and the user indicated by the authorization information, the second vehicle has the permission to release the locked state of the first vehicle.

Alternatively, the authorization information includes authorization verification information, and when the verification information belongs to the authorization verification information, the second vehicle has the permission to release the locked state of the first vehicle.

In another possible implementation of the sixth aspect, a verification code or an authorized vehicle identifier in the first vehicle is set in the first vehicle in at least one of the following manners:

the verification code or the authorized vehicle identifier is pre-configured in the first vehicle;

the verification code or the authorized vehicle identifier is upgraded to the first vehicle by using an over-the-air technology OTA;

the verification code or the authorized vehicle identifier is entered by a user into the first vehicle; or the verification code or the authorized vehicle identifier is requested from a network side device.

In another possible implementation of the sixth aspect, the method further includes:

when no information for indicating to maintain an unlocked state of the first vehicle is received within a preset time period after the request information is received, generating a locking control signal, where the locking control signal is used to control the first vehicle to be in the locked state.

In another possible implementation of the sixth aspect, the method further includes:

when the first vehicle is still in the locked state within a preset time period after the request information is received, generating a locking control signal, where the locking control signal is used to control the first vehicle to be in the locked state.

In a possible implementation of the sixth aspect, the request information includes time information (or referred to as time information T6), and the time information T6 indicates a time period for which the first vehicle is to maintain the unlocked state.

In a possible implementation of the sixth aspect, the unlocking request information is periodically repeated information.

In a possible implementation of the sixth aspect, the request information includes vehicle lock indication information, and the vehicle lock indication information indicates a vehicle lock to be released from a locked state. The vehicle lock to be released from the locked state includes at least one of a driver-side door lock, a front-passenger-side door lock, a rear seat door, a rear trunk lock, a front trunk lock, a sunroof lock, and the like that are of the first vehicle.

In a possible implementation of the sixth aspect, the method further includes:

determining, based on the verification information, that the second vehicle does not have the permission to release the locked state of the first vehicle; and controlling the first vehicle to be in the locked state.

Further, if the first vehicle is originally in the locked state, the first vehicle may maintain the locked state. If the first vehicle is in the unlocked state, the locking control signal is generated, to control the first vehicle to be in the locked state.

According to a seventh aspect, an embodiment of this application provides a vehicle control apparatus. The vehicle control apparatus may be an authentication apparatus, or may be a component (for example, a chip, a software module, or a hardware module) in the authentication apparatus. The vehicle control apparatus may be configured to implement the method described in any one of the first aspect or the possible implementations of the first aspect.

In a possible implementation of the seventh aspect, the vehicle control apparatus includes:
  a receiving unit, configured to receive first information from a first vehicle, where the first information is used to perform authorization or indicates that the first vehicle is in a first state, and the first vehicle that performs authorization is in a locked state, or a vehicle in the first state is in a locked state, or an authorized apparatus is capable of releasing a vehicle in the first state from a locked state, where
  the receiving unit is further configured to receive second information from a terminal apparatus, where the second information is used to request to release the locked state of the first vehicle, and the second information includes verification information; and
  a sending unit, configured to send unlocking indication information to the first vehicle based on the verification information, where the unlocking indication information indicates to release the locked state of the first vehicle.

In a possible implementation of the seventh aspect, the authentication apparatus is a road side apparatus or a vehicle management platform, or the authentication apparatus is located in a road side apparatus or a vehicle management platform.

In another possible implementation of the seventh aspect, the terminal apparatus includes but is not limited to an intelligent terminal or a vehicle like a mobile phone, an automobile, a robot, or an uncrewed aerial vehicle.

Optionally, the foregoing vehicle used as the terminal apparatus may be a special vehicle (including but not limited to a police car, a tractor, a logistics vehicle, or the like) or a rescue vehicle (including but not limited to an ambulance, a fire engine, a recovery vehicle, or the like). Alternatively, the vehicle used as the terminal apparatus may be a preset or predefined trusted vehicle, for example, a trusted vehicle pre-added by the owner of the first vehicle, or a vehicle of a relative of the owner of the first vehicle.

Optionally, the foregoing terminal apparatus may alternatively be a special terminal apparatus, for example, an intelligent terminal like a mobile policing terminal or an express terminal.

In another possible implementation of the seventh aspect, the receiving unit is further configured to:
  receive first vehicle identity indication information from the first vehicle, where the first vehicle identity indication information indicates the first vehicle or a first user that uses the first vehicle.

In another possible implementation of the seventh aspect, the apparatus further includes a processing unit, configured to determine, based on the verification information and the first vehicle identity indication information, that the terminal apparatus is an apparatus authorized to release the locked state of the first vehicle.

The sending unit is further configured to send the unlocking indication information to the first vehicle.

In another possible implementation of the seventh aspect, the verification information includes identification information of the terminal apparatus or identification information of a user (which may be referred to as a second user for ease of differentiation) using the terminal apparatus.

In another possible implementation of the seventh aspect, the apparatus further includes the processing unit, configured to: when the identification information of the terminal apparatus indicates an authorized apparatus, or the identification information of the second user that uses the terminal apparatus indicates an authorized user, determine to release the locked state of the first vehicle.

The sending unit is configured to send the unlocking indication information to the first vehicle.

In another possible implementation of the seventh aspect, the apparatus further includes the processing unit, configured to: when the identification information of the terminal apparatus indicates an apparatus authorized to release the locked state of the first vehicle, or the identification information of the second user that uses the terminal apparatus indicates a user authorized to release the locked state of the first vehicle, determine to release the locked state of the first vehicle.

The sending unit is configured to send the unlocking indication information to the first vehicle. In another possible implementation of the sixth aspect, the verification information includes type information of the terminal apparatus.

In another possible implementation of the seventh aspect, the apparatus further includes the processing unit, configured to: when the type information of the terminal apparatus indicates an authorized type, determine to release the locked state of the first vehicle.

The sending unit is configured to send the unlocking indication information to the first vehicle.

In another possible implementation of the seventh aspect, the sending unit is further configured to:
  when no third information for requesting to maintain an unlocked state of the first vehicle is received within a preset time period after the second information is received,
  send locking indication information to the first vehicle, where the locking indication information is used to control the first vehicle to be in the locked state.

In another possible implementation of the seventh aspect, the second information includes time information (which may also be referred to as first time information or time information T1 for ease of differentiation), and the time information T1 indicates a time period for which the first vehicle is to maintain the unlocked state.

In another possible implementation of the seventh aspect, the unlocking indication information includes time information (which may also be referred to as second time information or time information T2 for ease of differentiation), and the time information T2 indicates the time period for which the first vehicle is to maintain the unlocked state.

In another possible implementation of the seventh aspect, the first information is periodically repeated information.

In another possible implementation of the seventh aspect, the second information is periodically repeated information.

In another possible implementation of the seventh aspect, the unlocking indication information is periodically repeated information.

In another possible implementation of the seventh aspect, the first information is the following message or is carried in the following message:

a help-seeking message broadcast by the first vehicle;

an authorization indication message sent by the first vehicle to the authentication apparatus, where the authorization indication message indicates that the authentication apparatus has obtained authorization to control the first vehicle; or a request message sent by the first vehicle to the authentication apparatus, where the request message is used to request the road side apparatus to start control on the first vehicle based on authorization.

In another possible implementation of the seventh aspect, the first information includes time information (which may also be referred to as third time information or time information T3 for ease of differentiation), and the time information T3 indicates a time period in which the authorized apparatus is capable of releasing the first vehicle from the locked state.

In another possible implementation of the seventh aspect, the first information includes vehicle lock indication information.

The vehicle lock indication information indicates a vehicle lock to be released from a locked state, and the vehicle lock to be released from the locked state includes at least one of a driver-side door lock, a front-passenger-side door lock, a rear seat door lock, a rear trunk lock, a front trunk lock, a sunroof lock, and the like that are of the first vehicle.

In another possible implementation of the seventh aspect, the second information includes the vehicle lock indication information.

In another possible implementation of the seventh aspect, the unlocking indication information includes the vehicle lock indication information.

In another possible implementation of the seventh aspect, the receiving unit is further configured to receive a first signature from the terminal apparatus, where the first signature is determined based on the second information and a first private key.

The processing unit is further configured to determine, based on the first signature and a first public key, that verification on the second information succeeds, where the first public key is a decryption key for the first private key.

According to an eighth aspect, an embodiment of this application provides a vehicle control apparatus. The vehicle control apparatus is configured to implement the method described in any one of the second aspect or the possible implementations of the second aspect. Further, the vehicle control apparatus may be a vehicle, or may be a component (for example, a chip, a software module, or a hardware module) in the vehicle.

In a possible implementation of the eighth aspect, the apparatus includes:

a sending unit, configured to send first information, where the first information is used to perform authorization or indicates that a first vehicle is in a first state, and the first vehicle that performs authorization is in a locked state, or a vehicle in the first state is in a locked state, or an authorized apparatus is capable of releasing a vehicle in the first state from a locked state;

a receiving unit, configured to receive unlocking indication information from an authentication apparatus, where the unlocking indication information indicates to release the locked state of the first vehicle; and a processing unit, configured to generate a control signal based on the unlocking indication information, where the control signal is used to release the locked state of the first vehicle.

In another possible implementation of the eighth aspect, the sending unit is further configured to:

send first vehicle identity indication information to the authentication apparatus, where the first vehicle identity indication information indicates the first vehicle or a first user that uses the first vehicle.

In another possible implementation of the eighth aspect, the unlocking indication information further includes security information and/or identification information of the authentication apparatus.

In another possible implementation of the eighth aspect, the processing unit is further configured to:

determine identity information of the authentication apparatus based on the security information; and generate the control signal.

In another possible implementation of the eighth aspect, the processing unit is further configured to determine, based on the identification information of the authentication apparatus, that the authentication apparatus is an authorized apparatus; and generate the control signal.

In another possible implementation of the eighth aspect, the receiving unit is further configured to receive second information from a terminal apparatus, where the second information is used to request to release the locked state of the first vehicle.

The sending unit is further configured to send the first information in response to the second information.

In another possible implementation of the eighth aspect, the terminal apparatus includes but is not limited to an intelligent terminal or a vehicle like a mobile phone, an automobile, a robot, or an uncrewed aerial vehicle.

Optionally, the foregoing vehicle used as the terminal apparatus may be a special vehicle (including but not limited to a police car, a tractor, a logistics vehicle, or the like) or a rescue vehicle (including but not limited to an ambulance, a fire engine, a recovery vehicle, or the like). Alternatively, the vehicle used as the terminal apparatus may be a preset or predefined trusted vehicle, for example, a trusted vehicle pre-added by the owner of the first vehicle, or a vehicle of a relative of the owner of the first vehicle.

Optionally, the foregoing terminal apparatus may alternatively be a special terminal apparatus, for example, an intelligent terminal like a mobile policing terminal or an express terminal.

In another possible implementation of the eighth aspect, the second information includes identification information of the terminal apparatus, and the first information includes the identification information of the terminal apparatus.

In another possible implementation of the eighth aspect, the second information includes identification information of a second user that uses the terminal apparatus, and the first information includes the identification information of the second user.

In another possible implementation of the eighth aspect, the processing unit is further configured to:

when no information for indicating to maintain an unlocked state of the first vehicle is received within a preset time period after the unlocking indication information is received, generate a locking control signal, where the locking control signal is used to control the first vehicle to be in the locked state.

In another possible implementation of the eighth aspect, the processing unit is further configured to:
  when the first vehicle is still in the locked state within a preset time period after the unlocking indication information is received,
  generate a locking control signal, where the locking control signal is used to control the first vehicle to be in the locked state.

In another possible implementation of the eighth aspect, the unlocking indication information includes time information (which is referred to as first time information or time information T2 for ease of description), and the time information T2 indicates a time period for which the first vehicle is to maintain the unlocked state.

In another possible implementation of the eighth aspect, the first information is periodically repeated information.

In another possible implementation of the eighth aspect, the unlocking indication information is periodically repeated information.

In another possible implementation of the eighth aspect, the first information is the following message or is carried in the following message:
  a help-seeking message broadcast by the first vehicle;
  an authorization indication message sent by the first vehicle to the authentication apparatus, where the authorization indication message indicates that the authentication apparatus has obtained authorization to control the first vehicle; or
  a request message sent by the first vehicle to the authentication apparatus, where the request message is used to request the road side apparatus to start control on the first vehicle based on authorization.

In another possible implementation of the eighth aspect, the first information includes time information (which is referred to as second time information or time information T3 for ease of description), and the time information T3 indicates a time period in which the authorized apparatus is capable of releasing the first vehicle from the locked state.

In another possible implementation of the eighth aspect, the first information includes vehicle lock indication information, and the vehicle lock indication information indicates a vehicle lock to be released from a locked state.

The vehicle lock to be released from the locked state includes at least one of a driver-side door lock, a front-passenger-side door lock, a rear seat door lock, a rear trunk lock, a front trunk lock, a sunroof lock, and the like that are of the first vehicle.

In another possible implementation of the eighth aspect, the unlocking indication information includes the vehicle lock indication information, and the vehicle lock indication information indicates the vehicle lock to be released from the locked state.

According to a ninth aspect, an embodiment of this application provides a vehicle control apparatus. The apparatus may be configured to implement the method described in any one of the third aspect or the possible implementations of the third aspect. Further, the apparatus may be a vehicle, or may be a component or a chip in the vehicle.

In any possible implementation of the ninth aspect, the vehicle control apparatus includes:
  a sending unit, configured to send first information to an authentication apparatus, where the first information is used to perform authorization or indicates that the first vehicle is in a first state, and the first vehicle that performs authorization is in a locked state, or a vehicle in the first state is in a locked state, or an authorized apparatus is capable of releasing a vehicle in the first state from a locked state;
  a receiving unit, configured to receive unlocking request information from a terminal apparatus, where the unlocking request information includes verification information; and
  a processing unit, configured to generate a control signal based on the verification information, where the control signal is used to release the locked state of the first vehicle.

In another possible implementation of the ninth aspect, the terminal apparatus includes but is not limited to an intelligent terminal or a vehicle like a mobile phone, an automobile, a robot, or an uncrewed aerial vehicle.

Optionally, the foregoing vehicle used as the terminal apparatus may be a special vehicle (including but not limited to a police car, a tractor, a logistics vehicle, or the like) or a rescue vehicle (including but not limited to an ambulance, a fire engine, a recovery vehicle, or the like). Alternatively, the vehicle used as the terminal apparatus may be a preset or predefined trusted vehicle, for example, a trusted vehicle pre-added by the owner of the first vehicle, or a vehicle of a relative of the owner of the first vehicle.

Optionally, the foregoing terminal apparatus may alternatively be a special terminal apparatus, for example, an intelligent terminal like a mobile policing terminal or an express terminal.

In another possible implementation of the ninth aspect, the sending unit is further configured to:
  send second information to the terminal apparatus, where the second information indicates that the first vehicle is in the first state; or
  send second information to the terminal apparatus, where the first information is used to perform authorization, and the second information indicates that the first vehicle authorizes the authentication apparatus or indicates the authentication apparatus.

In another possible implementation of the ninth aspect, the second information includes identification information of the first vehicle or identification information of a user that uses the first vehicle.

In another possible implementation of the ninth aspect, the receiving unit is further configured to:
  receive third information from the terminal apparatus, where the third information is used to request to release the locked state of the first vehicle, where the sending first information to an authentication apparatus includes: sending the first information to the authentication apparatus based on receiving of the third information.

In another possible implementation of the ninth aspect, the third information includes an identifier of the terminal apparatus or an identifier of a user that uses the terminal apparatus.

In another possible implementation of the ninth aspect, the processing unit is further configured to:
  when no information for indicating to maintain an unlocked state of the first vehicle is received within a preset time period after the unlocking indication information is received, or when the first vehicle is still in the locked state within a preset time period after the unlocking request information is received,
  generate a locking control signal, where the locking control signal is used to control the first vehicle to be in the locked state.

In another possible implementation of the ninth aspect, the unlocking request information includes time information (which may also be referred to as first time information or time information T4 for ease of differentiation), and the time information T4 indicates a time period for which the first vehicle is to maintain the unlocked state.

In another possible implementation of the ninth aspect, the first information is periodically repeated information.

In another possible implementation of the ninth aspect, the unlocking request information is periodically repeated information.

In another possible implementation of the ninth aspect, the first information is or is carried in an E-call request message.

In another possible implementation of the ninth aspect, the first information includes time information (which may also be referred to as second time information or time information T5 for ease of differentiation), and the time information T5 indicates a time period in which the authorized apparatus is capable of releasing a vehicle lock of the first vehicle from a locked state.

In another possible implementation of the ninth aspect, the first information includes vehicle lock indication information, and the vehicle lock indication information indicates a vehicle lock to be released from a locked state.

The vehicle lock to be released from the locked state includes at least one of a driver-side door lock, a front-passenger-side door lock, a rear seat door lock, a rear trunk lock, a front trunk lock, a sunroof lock, and the like that are of the first vehicle.

In another possible implementation of the ninth aspect, the unlocking request information includes the vehicle lock indication information, and the vehicle lock indication information indicates the vehicle lock to be released from the locked state.

According to a tenth aspect, an embodiment of this application provides a vehicle control apparatus. The vehicle control apparatus is configured to implement the method described in any one of the fourth aspect or the possible implementations of the fourth aspect. Further, the apparatus may be a terminal apparatus (including a vehicle), or may be a component or a chip in the terminal apparatus.

In any possible implementation of the tenth aspect, the vehicle control apparatus includes:

a sending unit, configured to send authorization request information to an authentication apparatus, where the authorization request information is used to request to grant permission to release a locked state of a first vehicle; and a receiving unit, configured to receive authorization information from the authentication apparatus, where the authorization information includes verification information, and the verification information indicates that the terminal apparatus is granted the permission to release the locked state of the first vehicle.

The sending unit is further configured to send unlocking request information to the first vehicle, where the unlocking request information includes the verification information, and the unlocking request information is used to request to release the locked state of the first vehicle.

In another possible implementation of the tenth aspect, the receiving unit is further configured to:

receive first information from the first vehicle, where the first information indicates that the first vehicle authorizes the authentication apparatus, or indicates the authentication apparatus, or indicates that the first vehicle is in a first state, where a vehicle in the first state is in a locked state, or an authorized apparatus is capable of releasing a vehicle in the first state from a locked state.

In another possible implementation of the tenth aspect, the sending unit is further configured to:

send second information to the first vehicle, where the second information is used to request to release the locked state of the first vehicle.

In another possible implementation of the tenth aspect, the unlocking request information is periodically repeated information.

In another possible implementation of the tenth aspect, the unlocking request information includes time information (which may also be referred to as time information T4 for ease of differentiation), and the time information T4 indicates a time period for which the first vehicle is to maintain the unlocked state.

In another possible implementation of the tenth aspect, the first information includes vehicle lock indication information, and the vehicle lock indication information indicates a vehicle lock to be released from a locked state.

The vehicle lock to be released from the locked state includes at least one of a driver-side door lock, a front-passenger-side door lock, a rear seat door lock, a rear trunk lock, a front trunk lock, and a sunroof lock that are of the first vehicle.

In another possible implementation of the tenth aspect, the unlocking request information includes the vehicle lock indication information, and the vehicle lock indication information indicates the vehicle lock to be released from the locked state.

According to an eleventh aspect, an embodiment of this application provides a vehicle control apparatus. The vehicle control apparatus is configured to implement the method described in any one of the fifth aspect or the possible implementations of the fifth aspect. Further, the vehicle control apparatus may be an authentication apparatus, or may be a component (for example, a chip, a software module, or a hardware module) in the authentication apparatus.

In a possible implementation of the eleventh aspect, the vehicle control apparatus includes:

a receiving unit, configured to receive first information from a first vehicle, where the first information is used to perform authorization or indicates that the first vehicle is in a first state, and the first vehicle that performs authorization is in a locked state, or a vehicle in the first state is in a locked state, or an authorized apparatus is capable of releasing a vehicle in the first state from a locked state, where the receiving unit is further configured to receive authorization request information from a terminal apparatus, where the authorization request information is used to request to grant permission to release the locked state of the first vehicle; and a sending unit, configured to send authorization information to the terminal apparatus, where the authorization information includes verification information, and the verification information indicates that the terminal apparatus is granted the permission to release the locked state of the first vehicle.

In a possible implementation of the eleventh aspect, the second vehicle may be a special vehicle (including but not limited to a police car, a tractor, a logistics vehicle, or the like) or a rescue vehicle (including but not limited to an ambulance, a fire engine, a recovery vehicle, or the like).

In another possible implementation of the eleventh aspect, the verification information may include one or more of identification information of a terminal apparatus, identification information of a user that uses the terminal apparatus, type information of the terminal apparatus, an authorization letter, a permission code, a verification code, a security parameter, or the like.

In another possible implementation of the eleventh aspect, the first information includes time information (which may also be referred to as time information T5 for ease of differentiation), and the time information T5 indicates a time period in which the authorized apparatus is capable of releasing a vehicle lock of the first vehicle from a locked state.

In another possible implementation of the eleventh aspect, the first information is periodically repeated information.

In another possible implementation of the eleventh aspect, the first information is or is carried in an in-vehicle emergency call E-call request message.

In another possible implementation of the eleventh aspect, the first information includes vehicle lock indication information, and the vehicle lock indication information indicates a vehicle lock to be released from a locked state.

The vehicle lock to be released from the locked state includes at least one of a driver-side door lock, a front-passenger-side door lock, a rear seat door lock, a rear trunk lock, a front trunk lock, and a sunroof lock that are of the first vehicle.

According to a twelfth aspect, an embodiment of this application provides a vehicle control apparatus. The vehicle control apparatus is configured to implement the method described in any one of the fifth aspect or the possible implementations of the fifth aspect. Further, the vehicle control apparatus may be a vehicle, or may be a component (for example, a chip, a software module, or a hardware module) in the vehicle.

In a possible implementation of the tenth aspect, the vehicle control apparatus includes:
- a receiving unit, configured to receive request information from a second vehicle, where the request information is used to request to release a locked state of a first vehicle, the request information includes verification information, and the verification information is used to verify whether the second vehicle has permission to release the locked state of the first vehicle; and
- a processing unit, configured to determine, based on the verification information, that the second vehicle has the permission to release the locked state of the first vehicle.

The processing unit is further configured to generate a control signal, where the control signal is used to release the locked state of the first vehicle.

In a possible implementation of the twelfth aspect, the second vehicle may be a special vehicle (including but not limited to a police car, a tractor, a logistics vehicle, or the like) or a rescue vehicle (including but not limited to an ambulance, a fire engine, a recovery vehicle, or the like).

In a possible implementation of the twelfth aspect, the verification information may include one or more of identification information of a terminal apparatus, identification information of a user that uses the terminal apparatus, type information of the terminal apparatus, an authorization letter, a permission code, a verification code, a security parameter, or the like.

In another possible implementation of the twelfth aspect, the processing unit is further configured to:
obtain a first image or a first video by using the image sensor.

In another possible implementation of the twelfth aspect, the processing unit is further configured to:
recognize a target object based on the first image or the first video; and
determine that an identity of the target object is trusted.

In another possible implementation of the twelfth aspect, the processing unit is specifically configured to:
obtain authorization information; and
determine, based on the verification information and the authorization information, that the second vehicle has the permission to release the locked state of the first vehicle.

The authorization information indicates a user, a user type, an apparatus, or an apparatus type with the permission. When a user indicated by the verification information is the user indicated by the authorization information, when a user type indicated by the verification information is the user type indicated by the authorization information, when an apparatus indicated by the verification information is the apparatus indicated by the authorization information, when an apparatus type indicated by the verification information is the apparatus type indicated by the authorization information, when there is a correspondence between an apparatus indicated by the verification information and the apparatus indicated by the authorization information, or when there is a correspondence between a user indicated by the verification information and the user indicated by the authorization information, the second vehicle has the permission to release the locked state of the first vehicle.

Alternatively, the authorization information includes authorization verification information, and when the verification information belongs to the authorization verification information, the second vehicle has the permission to release the locked state of the first vehicle.

In another possible implementation of the tenth aspect, a verification code or an authorized vehicle identifier in the first vehicle is set in the first vehicle in at least one of the following manners:
the verification code or the authorized vehicle identifier is pre-configured in the first vehicle;
the verification code or the authorized vehicle identifier is upgraded to the first vehicle by using an over-the-air technology OTA;
the verification code or the authorized vehicle identifier is entered by a user into the first vehicle; or
the verification code or the authorized vehicle identifier is requested from a network side device.

In another possible implementation of the twelfth aspect, the processing unit is specifically configured to:
when no information for indicating to maintain an unlocked state of the first vehicle is received within a preset time period after the request information is received,
generate a locking control signal, where the locking control signal is used to control the first vehicle to be in the locked state.

In another possible implementation of the twelfth aspect, the processing unit is specifically configured to:
when the first vehicle is still in the locked state within a preset time period after the request information is received,
generate a locking control signal, where the locking control signal is used to control the first vehicle to be in the locked state.

In a possible implementation of the twelfth aspect, the request information includes time information (or referred to as time information T6), and the time information T6 indicates a time period for which the first vehicle is to maintain the unlocked state.

In a possible implementation of the twelfth aspect, the unlocking request information is periodically repeated information.

In a possible implementation of the twelfth aspect, the request information includes vehicle lock indication information, and the vehicle lock indication information indicates a vehicle lock to be released from a locked state. The vehicle lock to be released from the locked state includes at least one of a driver-side door lock, a front-passenger-side door lock, a rear seat door, a rear trunk lock, a front trunk lock, a sunroof lock, and the like that are of the first vehicle.

In a possible implementation of the twelfth aspect, the processing unit is further configured to:
 determine, based on the verification information, that the second vehicle does not have the permission to release the locked state of the first vehicle; and
 control the first vehicle to be in the locked state.

According to a thirteenth aspect, an embodiment of this application discloses a vehicle control apparatus. The vehicle control apparatus includes at least one processor and a communications interface, and the at least one processor is configured to invoke a computer program stored in at least one memory, so that the apparatus implements the method described in any one of the first aspect or the possible implementations of the first aspect. In this case, the apparatus may be an authentication apparatus, or may be a component or a chip in the authentication apparatus. Alternatively, the apparatus implements the method described in any one of the second aspect or the possible implementations of the second aspect. In this case, the apparatus may be a vehicle, or may be a component or a chip in the vehicle. Alternatively, the apparatus implements the method described in any one of the third aspect or the possible implementations of the third aspect. In this case, the apparatus may be a vehicle, or may be a component or a chip in the vehicle. Alternatively, the apparatus implements the method described in any one of the fourth aspect or the possible implementations of the fourth aspect. In this case, the apparatus may be a terminal apparatus (including a vehicle), or may be a component or a chip in the terminal apparatus. Alternatively, the apparatus implements the method described in any one of the fifth aspect or the possible implementations of the fifth aspect. In this case, the apparatus may be an authentication apparatus, or may be a component or a chip in the authentication apparatus. Alternatively, the apparatus implements the method described in any one of the sixth aspect or the possible implementations of the sixth aspect. In this case, the apparatus may be a vehicle, or may be a component or a chip in the vehicle.

In a process of performing the foregoing method, a process of sending information (for example, first information) in the foregoing method may be understood as a process of outputting information by the processor, and a process of receiving information in the foregoing method may be understood as a process of inputting information by the processor. When outputting information, the processor may output the information to a transceiver (or the communications interface or a sending module), so that the transceiver transmits the information. After the information is output by the processor, other processing may further need to be performed before the information arrives at the transceiver. Similarly, when the processor receives input information, the transceiver (or the communications interface or the sending module) receives the information, and inputs the information into the processor. Further, after the transceiver receives the information, other processing may further need to be performed on the information before the information is input into the processor.

Based on the foregoing principle, for example, sending information mentioned in the foregoing method may be understood as outputting information by the processor. For another example, receiving information may be understood as receiving input information by the processor.

Optionally, unless otherwise specified, or if operations such as transmitting, sending, and receiving related to the processor do not contradict an actual function or internal logic of the operations in related descriptions, all the operations may be more generally understood as operations such as outputting, receiving, and inputting of the processor, instead of operations such as transmitting, sending, and receiving directly performed by a radio frequency circuit and/or an antenna.

Optionally, in an implementation process, the processor may be a processor specially configured to perform these methods, or a processor, for example, a general-purpose processor, that executes computer instructions in a memory to perform these methods. The memory may be a non-transitory memory, for example, a read-only memory (ROM). The memory and the processor may be integrated on a same chip, or may be separately disposed on different chips. Neither of a type of the memory and a manner of disposing the memory and the processor is limited in embodiments of this application.

In a possible implementation, the at least one memory is located outside the foregoing vehicle control apparatus.

In another possible implementation, the at least one memory is located inside the foregoing vehicle control apparatus.

In another possible implementation, some memories in the at least one memory are located inside the vehicle control apparatus, and the other memories are located outside the vehicle control apparatus.

In this application, the processor and the memory may alternatively be integrated into one component, that is, the processor and the memory may alternatively be integrated together.

According to a fourteenth aspect, an embodiment of this application further provides a chip system. The chip system includes at least one processor and a communications interface, the communications interface is configured to send and/or receive data, and the at least one processor is configured to invoke a computer program stored in at least one memory, so that the chip system implements the method described in any one of the first aspect or the possible implementations of the first aspect, or implements the method described in any one of the second aspect or the possible implementations of the second aspect, or implements the method described in any one of the third aspect or the possible implementations of the third aspect, or implements the method described in any one of the fourth aspect or the possible implementations of the fourth aspect, or implements the method described in any one of the fifth aspect or the possible implementations of the fifth aspect, or implements the method described in any one of the sixth aspect or the possible implementations of the sixth aspect is implemented.

According to a fifteenth aspect, an embodiment of this application further provides a computer-readable storage medium. The computer-readable storage medium stores a computer program, and when the computer program is run on one or more processors, the method described in any one of the first aspect or the possible implementations of the first aspect is implemented, or the method described in any one of the second aspect or the possible implementations of the second aspect is implemented, or the method described in any one of the third aspect or the possible implementations of the third aspect is implemented, or the method described in any one of the fourth aspect or the possible implementations of the fourth aspect is implemented, or the method described in any one of the fifth aspect or the possible implementations of the fifth aspect is implemented, or the method described in any one of the sixth aspect or the possible implementations of the sixth aspect is implemented.

According to a sixteenth aspect, an embodiment of this application further provides a computer program product. When the computer program product runs on one or more processors, the method described in any one of the first aspect or the possible implementations of the first aspect is implemented, or the method described in any one of the second aspect or the possible implementations of the second aspect is implemented, or the method described in any one of the third aspect or the possible implementations of the third aspect is implemented, or the method described in any one of the fourth aspect or the possible implementations of the fourth aspect is implemented, or the method described in any one of the fifth aspect or the possible implementations of the fifth aspect is implemented, or the method described in any one of the sixth aspect or the possible implementations of the sixth aspect is implemented.

According to a seventeenth aspect, an embodiment of this application further provides a vehicle control system. The vehicle control system includes a road side apparatus, a terminal apparatus, and a first vehicle. The road side apparatus is configured to perform the method described in any one of the first aspect or the possible implementations of the first aspect, the terminal apparatus is configured to perform the method described in any one of the fourth aspect or the possible implementations of the fourth aspect, and the first vehicle is configured to perform the method described in any one of the second, third, or sixth aspect or the possible implementations of the second, third, or sixth aspect.

According to an eighteenth aspect, an embodiment of this application further provides a vehicle control system. The vehicle control system includes a vehicle management platform, a terminal apparatus, and a first vehicle. The vehicle management platform is configured to perform the method described in any one of the first or fifth aspect and the possible implementations of the first or fifth aspect, the terminal apparatus is configured to perform the method described in any one of the fourth aspect or the possible implementations of the fourth aspect, and the first vehicle is configured to perform the method described in any one of the second, third, or sixth aspect or the possible implementations of the second, third, or sixth aspect.

According to a nineteenth aspect, an embodiment of this application further provides a vehicle control system. The vehicle control system includes a terminal apparatus and a first vehicle. The terminal apparatus is configured to perform the method described in any one of the fourth aspect or the possible implementations of the fourth aspect, and the first vehicle is configured to perform the method described in any one of the second, third, or sixth aspect or the possible implementations of the second, third, or sixth aspect.

BRIEF DESCRIPTION OF DRAWINGS

The following briefly describes accompanying drawings for describing embodiments.

DESCRIPTION OF EMBODIMENTS

Figure 1:
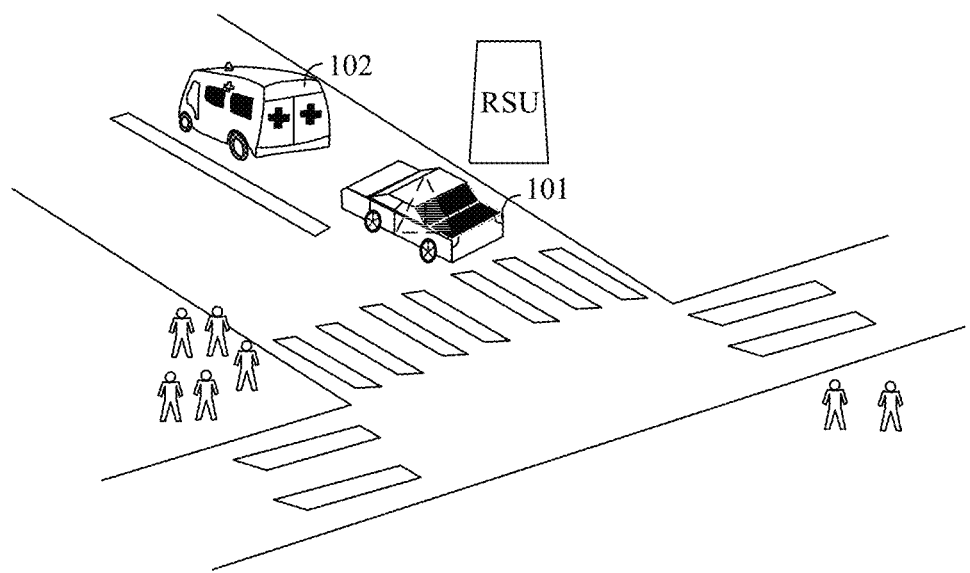
FIG. 1 is a schematic diagram of an application scenario of a vehicle control method according to an embodiment of this application.

The following describes embodiments of this application with reference to the accompanying drawings in embodiments of this application.

For ease of understanding, some concepts related to embodiments of this application are described below for reference by using examples. Details are as follows:

1. Terminal Apparatus

The terminal apparatus shown in embodiments of this application may be a handheld terminal, a vehicle, a vehicle-mounted device (for example, an on-board unit (OBU)), or the like. Alternatively, the terminal apparatus may be devices in various application scenarios, for example, a mobile internet device (MID), a terminal in industrial control, a wireless terminal in self-driving, a terminal in transportation safety, a terminal in an internet of things (IoT) system, a terminal in a smart city, or a terminal in a smart home. Alternatively, the terminal apparatus may be devices in various networks, for example, user equipment (UE) in a long term evolution (LTE) network or a 5th generation mobile communication technology (5G) network, or a terminal (station, STA) or an access point (AP) in a wireless local area network technology (for example, Wi-Fi).

Optionally, when the terminal apparatus is a handheld terminal, the terminal apparatus may be a mobile phone, a wearable device, a tablet computer (pad), a computer (like a notebook computer or a palmtop computer) with data receiving and sending functions, or may be an intelligent terminal like a mobile policing terminal or an express terminal.

Optionally, when the terminal apparatus is a vehicle, the terminal apparatus may be a common vehicle, for example, a passenger vehicle or a commercial vehicle; or may be a special vehicle (including but not limited to a police car, a tractor, or a logistics vehicle) or a rescue vehicle (including but not limited to an ambulance, a fire engine, or a recovery vehicle).

It may be understood that a specific form of the terminal apparatus is not limited in this application. All apparatuses that can communicate with a road side apparatus, a vehicle management platform, or the like fall within a protection scope of the terminal apparatus.

2. Road Side Apparatus

The road side apparatus, or referred to as a road side device, is an apparatus located at a road edge (or at an intersection or on a road side). It should be noted that the road edge (or the intersection or the road side) herein may refer to an outdoor road, including various roads such as an arterial road, a secondary road, an elevated road, or a temporary road, or may refer to an indoor road, for example, a road in an indoor parking lot.

For example, the road side apparatus may include one or more of a multi-access edge computing (MEC) processor, a road side unit (RSU), and a plurality of types of sensors.

In a design, the RSU may include a high-gain directional beam-controlled read/write antenna and a radio frequency controller. The high-gain directional beam-controlled read/write antenna may be a microwave transceiver module that is responsible for one or more of sending/receiving, modulation/demodulation, encoding/decoding, encryption/decryption, and the like of signals and data. The radio frequency controller is a module that controls data transmission and reception and receives information from an upper computer or sends information to an upper computer. In another design, the RSU device may alternatively be a communications apparatus installed on a road side in an electronic toll collection (ETC) system. The RSU device may communicate with an on-board unit (OBU) by using a dedicated short-range communication (DSRC) technology.

Optionally, the road side apparatus may be an independent apparatus, or may be integrated into another apparatus. For example, the road side apparatus may be integrated into an apparatus like a smart gas station, a charging pile, a smart signal light, a street lamp, a utility pole, or a traffic sign.

3. Vehicle

The vehicle in embodiments of this application is an apparatus that is driven by power to move. The vehicle usually includes a plurality of subsystems, for example, including but not limited to a traveling system, a sensor system, a control system, one or more peripheral devices, a power supply, or a user interface. Optionally, the vehicle may alternatively include more or fewer subsystems, and each subsystem may include a plurality of elements. In addition, each subsystem and element of the vehicle may be interconnected in a wired or wireless manner.

It should be noted that the vehicle in embodiments of this application may be an automobile or an electric vehicle, or may be a vehicle running on a track, or may be an intelligent vehicle (for example, a driverless vehicle), an intelligent mobile robot, or the like.

The intelligent vehicle supports a function of sensing a road environment by using an in-vehicle sensing system, automatically planning a driving route, and controlling the vehicle to reach a predetermined target location. The intelligent vehicle is integrated with technologies such as a computer, sensing, information fusion, communication, an artificial intelligence machine, or automatic control, and is a high-tech complex integrated with functions such as environment sensing, planning and decision-making, and multi-level driver assistance. For example, the intelligent vehicle may be a vehicle or a wheeled mobile robot that has a driver assistance system or a fully automated driving system.

4. Vehicle Management Platform

The vehicle management platform is an apparatus having a data processing capability, and may perform management, control, and the like on a vehicle, for example, send control information and data update information to the vehicle.

Optionally, the vehicle management platform may be implemented by using an apparatus like a server, a mobile terminal, a host, a virtual machine, or a robot.

It should be understood that when the vehicle management platform is a server, the vehicle management platform may include one server, or may include a plurality of servers (for example, a server cluster). For example, the vehicle management platform may be specifically a server cluster in which a plurality of servers are deployed by using a distributed architecture. The cluster may include one or more of a cloud computing server, a content delivery network (CDN) server, a network time protocol (NTP) server, a domain name system (DNS) server, and the like. The servers may coordinate with each other to jointly complete functions such as computing, data storage, and communication.

Optionally, the vehicle management platform may alternatively be a cloud platform. Optionally, the vehicle management platform may be deployed on a public cloud, a private cloud, or a hybrid cloud.

5. Broadcast, Unicast, and Multicast

In a unicast communication mode, there is usually one sender and one receiver. The sender sends data to the receiver in a point-to-point mode. During unicast communication, a destination address of a sent data packet is an address of a receiver interface. For example, an apparatus A sends information to an apparatus B in the unicast mode, and a data packet to which the information belongs includes an internet protocol (IP) address of the apparatus B and/or a media access control (MAC) address of the apparatus B.

A multicast communication mode may also be referred to as a group communication mode. Usually, there is one sender and a group of specified receivers, and the sender may send data to all receivers in the group. During multicast communication, a destination address of a sent data packet is a multicast address (for example, the multicast address may identify an address of a group of interfaces or a reserved class-D address). The data packet sent to the multicast address is sent to the group of interfaces identified by the address.

In a broadcast communication mode, there is usually one sender and all receivers in one network domain (or network range) (for example, subnet). The sender may send data to all the receivers in the network domain. During broadcast communication, a destination address of a sent data packet is a broadcast address, and the broadcast address is an address for simultaneous sending to all workstations (or nodes) in a network. For example, in a network using the transmission control protocol/internet protocol (TCP/IP), an IP address in which a host identifier (host ID) segment is all is a broadcast address, and a data packet sent to the broadcast address may be sent to all workstations (or nodes) related to the host ID segment. For example, for a network segment 10.1.1.0 (255.255.255.0), a broadcast address is 10.1.1.255 (255 is 11111111 in binary). When a data packet whose destination address is 10.1.1.255 is sent, the data packet is distributed to all workstations (or nodes) on the network segment.

6. Over the Air (OTA)

OTA is a technology for downloading data by using a wireless network, and may be applied to scenarios such as version upgrade or data update of a device like a vehicle, a smart appliance (a television, a gateway, a refrigerator, or the like), a mobile terminal (a mobile phone, a tablet computer, or the like), or a set-top box. In the OTA technology, an OTA upgrade package is downloaded for automatic upgrade (or the OTA upgrade package can be copied to an SD card for upgrade). OTA upgrade has a high speed and small impact on data. For example, for a vehicle, an original equipment manufacturer (OEM, or referred to as original equipment manufacturer), a map cloud server, a vehicle management platform, or the like upgrades related hardware or software of the vehicle or updates data in the vehicle by using the OTA technology. This helps quickly respond to a requirement and improve user experience.

7. Locked State and Unlocked State of a Vehicle

The locked state of the vehicle means that a locking apparatus is used to enable an external entrance and exit of the vehicle to be in a closed state, and for example, includes one or more of the following states: a door lock of the vehicle is in a locked state, a rear trunk of the vehicle is in a locked state, a window of the vehicle is in a locked state, or a sunroof of the vehicle is in a locked state.

It should be understood that, for the vehicle door lock, "locking" (equivalent to "closing the vehicle lock" or "locking up") in embodiments of the present application means that after a vehicle door is closed, the vehicle door cannot be opened by pulling an interior door handle of the vehicle or by pulling an exterior door handle of the vehicle. "Locking" in embodiments of the present application does not mean that after the vehicle door is closed, the vehicle door can be opened by pulling the interior door handle of the vehicle or by pulling the exterior door handle of the vehicle.

The unlocked (unlocking) state is a state existing after the locked state of the vehicle is released and before the vehicle is locked again. For example, after the vehicle door lock is in the unlocked state, any user can open the vehicle door by pulling the interior door handle of the vehicle or by pulling the exterior door handle of the vehicle. For another example, after the rear trunk is in the unlocked state, any user can open the rear trunk. For another example, after the vehicle window of the vehicle is in the unlocked state, any user can control lifting of the vehicle window glass. For another example, after the sunroof is in the unlocked state, any user can control opening or closing of the sunroof.

A time period of maintaining the unlocked state in embodiments of this application refers to duration in which the vehicle is in the unlocked state, that is, a time length from a moment at which an unlocking event takes effect to a moment at which an event that the vehicle is locked again occurs.

8. Vehicle Lock Indication Information

The vehicle lock indication information indicates a vehicle lock to be unlocked. It should be understood that a vehicle may include one or more vehicle locks, for example, may include a driver-side door lock, a front-passenger-side door lock, at least one rear seat door lock, a rear trunk lock, a front trunk lock, or a sunroof lock. When the vehicle is in a locked state, some or all of the foregoing plurality of vehicle locks are in a locked state, and the vehicle lock indication information may indicate a specific vehicle lock or specific vehicle locks to be released from the locked state.

For example, in a design, the vehicle may indicate, based on information such as a vehicle condition, another apparatus to open a specific vehicle lock or specific vehicle locks, to control the vehicle lock more properly.

For example, when an express package needs to be placed or an item in a rear trunk needs to be taken, the vehicle lock to be released from the locked state may be the rear trunk lock of the vehicle, and a lock of a cockpit door may not be a vehicle lock to be released from the locked state. In this way, a potential safety risk caused by unauthorized opening of the vehicle door can be reduced, an item loss, data leakage, or a like risk in a cockpit can be reduced, service quality of the vehicle can be improved, and user experience can be improved.

Descriptions of the foregoing related concepts may be applied to the following embodiments.

A vehicle usually includes entrances and exits such as a plurality of vehicle doors, a plurality of vehicle windows, a rear trunk, or a sunroof, and the foregoing entrances and exits may be locked by using vehicle locks. For example, the vehicle door may be locked by using a vehicle door lock, the rear trunk may be locked by using a rear trunk lock, the vehicle window may be opened or closed by using a vehicle window control apparatus, and the sunroof may be opened or closed by using a sunroof control apparatus. Regardless of a traveling process or a case that a user leaves the vehicle after parking, the vehicle lock is an important means for ensuring safety of the vehicle and the user.

To help a driver or a passenger enter and exit the vehicle or place a thing in the vehicle, a locked state may be released through manual control by using a central locking function of the vehicle. In a current vehicle lock control process, for example, when the vehicle lock is controlled by using an electronic key or a control button in the vehicle, the vehicle owner needs to perform control manually. When the vehicle owner is not near the vehicle or the vehicle owner is in an unconscious state, the vehicle owner cannot lock or unlock the vehicle. Consequently, quality of service provided by the vehicle is reduced, and user experience is poor.

For example, FIG. 1 is a schematic diagram of an application scenario of a vehicle control method according to an embodiment of this application. When a vehicle 101 is parked on a road side after being in danger, and a driver (or a passenger) cannot control the vehicle (for example, the driver (or the passenger) is in a coma or cannot move due to injury), the vehicle is usually in a locked state. When a rescue vehicle (for example, an ambulance) 102 arrives near the vehicle 101, because rescue personnel cannot unlock the vehicle in a timely manner, even if the vehicle is unlocked by violence, valuable rescue time needs to be consumed. This affects rescue timeliness and threatens life safety of the driver (or the passenger).

Figure 2:
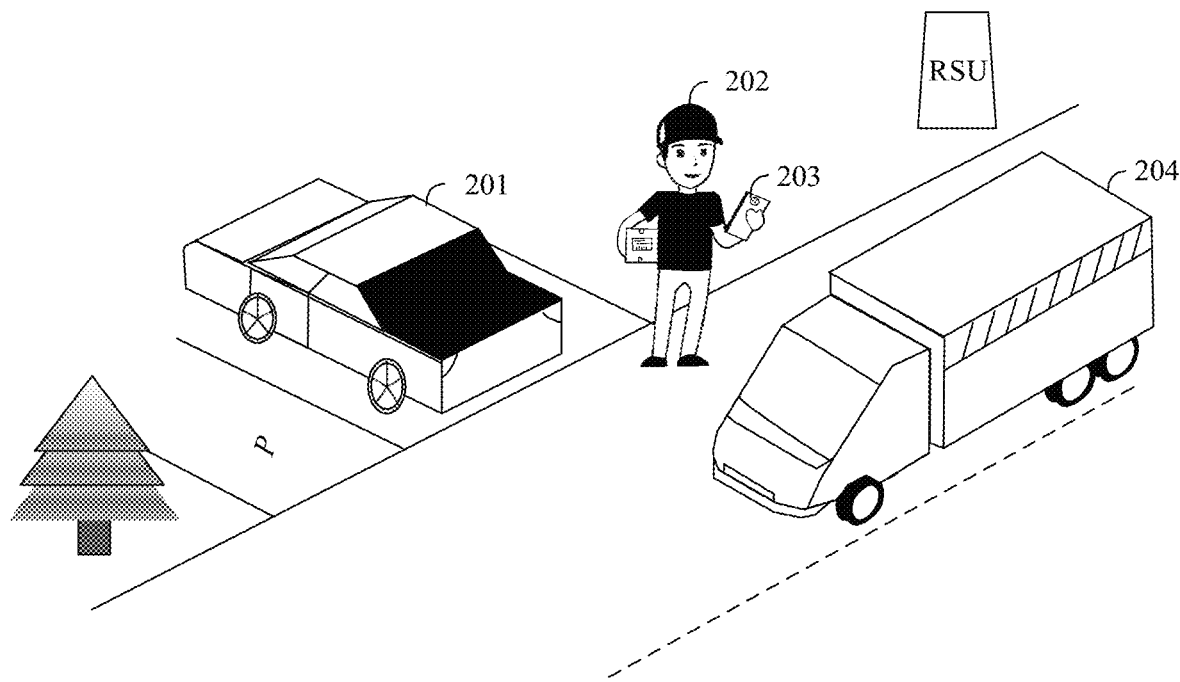
FIG. 2 is a schematic diagram of an application scenario of another vehicle control method according to an embodiment of this application.

For another example, the logistics industry is increasingly prosperous, and a quantity of express packages collected by people increases year by year. There are often scenarios in which it is difficult to collect express packages, for example, no one is at home, people are at work, people work overtime and miss the business hours of express stations, or people are on business trips. Because a vehicle is usually parked at a fixed location, if express packages can be collected by using the vehicle, the foregoing problem that it is difficult to collect the express packages can be resolved. However, because a vehicle owner cannot perform remote unlocking or remote locking for a vehicle lock (for example, a vehicle door lock or a rear trunk lock), the user has inconvenient experience of using the vehicle. Even if the vehicle owner can perform remote unlocking or remote locking for the vehicle lock after receiving a call from a courier, because a real identity of the courier cannot be verified, a lawbreaker may disguise the courier to contact the vehicle owner to open the vehicle door, causing a property loss. FIG. 2 is a schematic diagram of an application scenario of another vehicle control method according to an embodiment of this application. A vehicle 201 is parked near an express package receiving address, but an owner of the vehicle 201 is not within a range for controlling the vehicle 201. If an express package arrives but the vehicle 201 cannot support remote unlocking, the express package of the owner may not be signed for in a timely manner. When the vehicle 201 supports remote control for unlocking, if the vehicle owner receives a call from a "courier 202" and learns that an express package needs to be signed for, because the courier 202 may be disguised by a lawbreaker, after the vehicle is unlocked, an item in the vehicle may be lost or even the vehicle may be stolen, causing a property loss.

In view of this, the technical solutions in embodiments of this application are provided. This application provides a vehicle control method and a related apparatus, to conveniently and safely control an external status of a vehicle, for example, a locked state or an unlocked state of a vehicle door lock or a rear trunk, an open state or a closed state of a vehicle window, or an open state or a closed state of a sunroof.

The following first describes a vehicle control system provided in an embodiment of this application.

Figure 3:
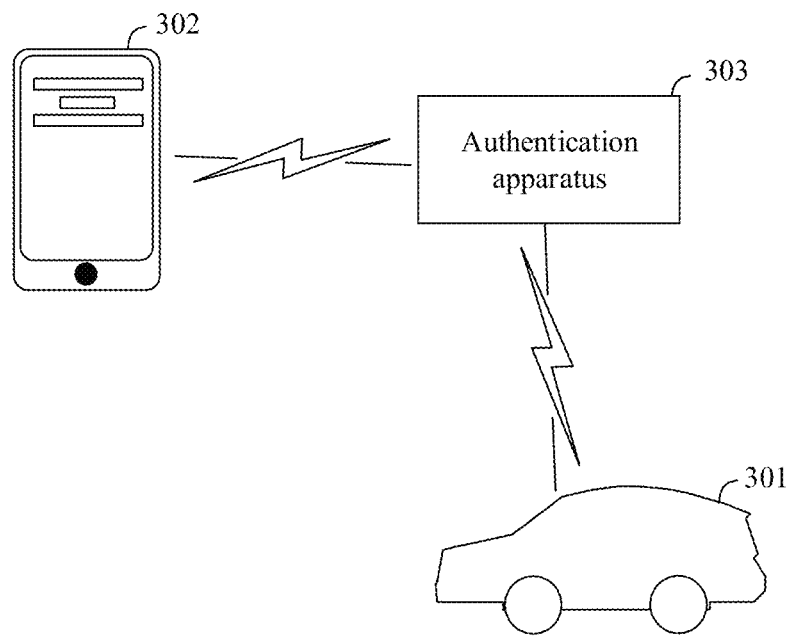
FIG. 3 is a schematic diagram of an architecture of a vehicle control system according to an embodiment of this application.

FIG. 3 is a schematic diagram of an architecture of a possible vehicle control system 30 according to an embodiment of this application. As shown in FIG. 3, the system may include a first vehicle 301, a terminal apparatus 302, and an authentication apparatus 303.

The first vehicle 301 is an apparatus driven by power to move. The vehicle may include a plurality of vehicle doors, and the vehicle doors may be locked by using vehicle door lock; or the vehicle may include a rear trunk, and the rear trunk may be locked by using a rear trunk lock; or a window or a sunroof of the vehicle may be locked. For descriptions of the first vehicle 301, refer to the foregoing descriptions of the vehicle.

The terminal apparatus 302 is an apparatus having data receiving and sending capabilities, and includes but is not limited to an intelligent terminal or a vehicle like a mobile phone, an automobile, a robot, or an uncrewed aerial vehicle. For descriptions of the terminal apparatus 302, refer to the foregoing descriptions.

The authentication apparatus 303 is an apparatus having data receiving and sending capabilities. The authentication apparatus 303 has permission to control a vehicle lock of the first vehicle, for example, may control the first vehicle 301 to release a locked state, and/or may control the first vehicle to be in a locked state. Alternatively, the authentication apparatus 303 may grant lock control permission to another apparatus, so that the another apparatus can control locking and/or unlocking of the first vehicle.

In a possible implementation, the authentication apparatus 303 may be a road side apparatus or a vehicle management platform, or may be located on a road side apparatus or a vehicle management platform. For descriptions of the road side apparatus and the vehicle management platform, refer to the foregoing descriptions.

The terminal apparatus 302 and the authentication apparatus 303 may communicate with each other by using a network link, and the authentication apparatus 303 and the first vehicle 301 may communicate with each other by using a network link, so that the terminal apparatus 302 and/or the authentication apparatus 303 can control an external status of the first vehicle 301. The following uses an example in which the external status is a vehicle door lock status, and another external status is similar.

In a possible design, the terminal apparatus 302 (or a user of the terminal apparatus 302) is an unlocking requester, and the authentication apparatus 303 may be used as a trusted management intermediary between the first vehicle 301 and the terminal apparatus 302. When the terminal apparatus 302 needs to open a vehicle door lock, the authentication apparatus 303 may open the vehicle door lock for the trusted terminal apparatus 302, so as to control the external status of the first vehicle 301 more conveniently and safely. For example, the vehicle door lock may be opened when a vehicle owner is not nearby or a passenger in the vehicle has no lock control capability, so that rescue personnel can enter the first vehicle 301 in an emergency to perform rescue. This reduces personal danger caused because the vehicle lock cannot be opened in a timely manner. For another example, an item may be placed into the first vehicle 301 or taken out of the first vehicle 301 without damaging the first vehicle 301, so that a user has better vehicle use experience.

A communication link between any two of the foregoing three parties may include one or more types of connection media, including a wired link (for example, an optical fiber), a wireless link, a combination of a wired link and a wireless link, or the like. For example, the connection medium may be a wireless link, and the wireless link uses a short-range connection technology, for example, an 802.11b/g technology, a Bluetooth technology, a Zigbee technology, a radio frequency identification (RFID) technology, an ultra-wideband (UWB) technology, a wireless short-range communication (for example, in-vehicle wireless short-range communication) technology, or a vehicle-to-everything (V2X, vehicle-to-outside information exchange) technology. For another example, the wireless link uses a long-range connection technology, for example, a radio-access-type technology like a global system for mobile communications (GSM), a general packet radio service (GPRS), a universal mobile telecommunications system (UMTS), LTE, or 5G.

For example, a V2X communications module is configured in the first vehicle 301, and has a V2X communication function. Therefore, the first vehicle 301 may communicate with the authentication apparatus 303 and/or the terminal apparatus 302 through the V2X communications module.

Figure 4:
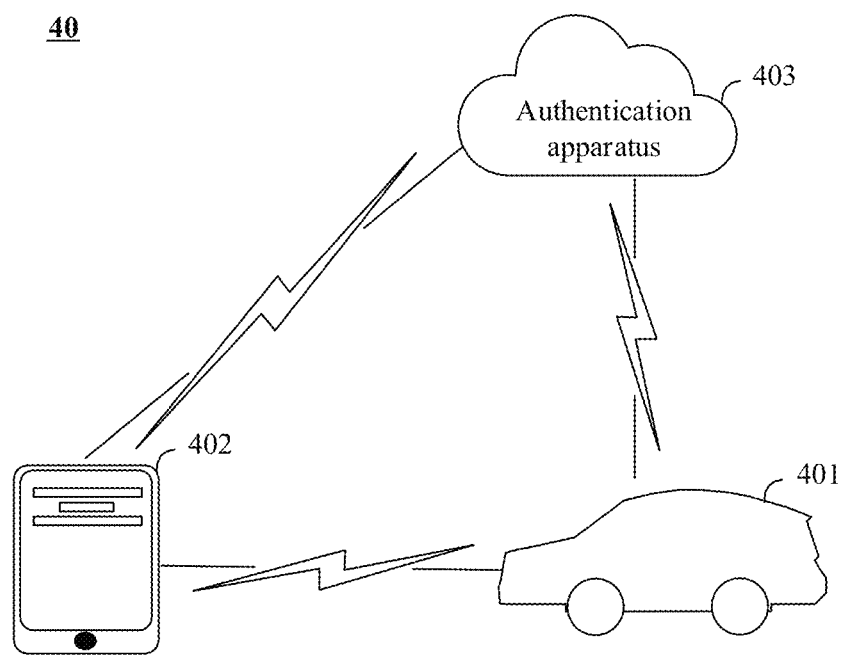
FIG. 4 is a schematic diagram of an architecture of another vehicle control system according to an embodiment of this application.

FIG. 4 is a schematic diagram of an architecture of another possible vehicle control system 40 according to an embodiment of this application. As shown in FIG. 4, the system may include a first vehicle 401, a terminal apparatus 402, and an authentication apparatus 403.

For descriptions of the first vehicle 401, refer to the descriptions of the first vehicle 301 in FIG. 3, or refer to the foregoing descriptions of the vehicle. For descriptions of the terminal apparatus 402, refer to the descriptions of the terminal apparatus 302 in FIG. 3, or refer to the foregoing descriptions of the terminal apparatus. The authentication apparatus 403 is an apparatus that has data receiving and sending capabilities and a data processing capability. For details, refer to the descriptions of the authentication apparatus 303 in FIG. 3.

In a possible implementation, the authentication apparatus 403 may be a road side apparatus or a vehicle management platform, or may be located on a road side apparatus or a vehicle management platform. For descriptions of the road side apparatus and the vehicle management platform, refer to the foregoing descriptions. In the figure, an example in which the authentication apparatus 403 is a vehicle management platform or is located on a vehicle management platform is used.

The terminal apparatus 402 and the authentication apparatus 403 may communicate with each other by using a network link, and the authentication apparatus 403 and the first vehicle 401 may communicate with each other by using a network link, so that the terminal apparatus 402 and/or the authentication apparatus 403 can control an external status of the first vehicle 401. The following uses an example in which the external status is a vehicle door lock status, and another external status is similar.

In a possible design, the authentication apparatus 403 may grant, to the terminal apparatus 402, permission to control a vehicle door lock of the first vehicle 401. Correspondingly, the terminal apparatus 402 may control an external status of the vehicle based on the permission.

In another possible design, the authentication apparatus 403 has permission to control the first vehicle 401, and may be used as a trusted management intermediary between the first vehicle and an unlocking requester (for example, the terminal apparatus 402 or a user of the terminal apparatus 402). When the unlocking requester needs to open the vehicle door lock, the authentication apparatus 403 may open the vehicle door lock of the first vehicle after verifying an identity of the unlocking requester, so that the vehicle door lock is controlled more conveniently and safely.

A communication link between any two of the foregoing three parties may include one or more types of connection media, including a wired link (for example, an optical fiber), a wireless link, a combination of a wired link and a wireless link, or the like. For related descriptions, refer to the descriptions and examples of the connection medium in FIG. 3.

Figure 5:
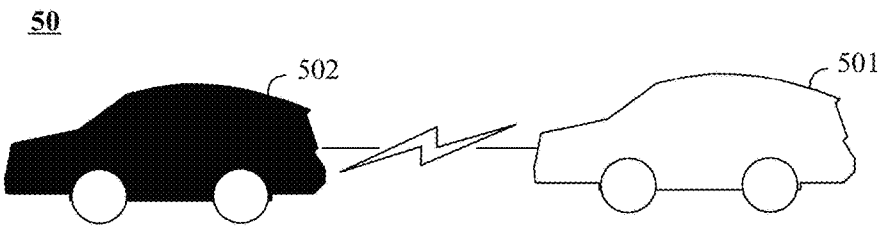
FIG. 5 is a schematic diagram of an architecture of another vehicle control system according to an embodiment of this application.

FIG. 5 is a schematic diagram of an architecture of another possible vehicle control system 50 according to an embodiment of this application. As shown in FIG. 5, the system may include a first vehicle 501 and a terminal apparatus 502.

For descriptions of the first vehicle 501, refer to the descriptions of the first vehicle 301 in FIG. 3, or refer to the foregoing descriptions of the vehicle. For descriptions of the terminal apparatus 502, refer to the descriptions of the terminal apparatus 302 in FIG. 3, or refer to the foregoing descriptions of the terminal apparatus.

The terminal apparatus 502 and the first vehicle 501 may communicate with each other through a network link, so that the terminal apparatus 502 (or a user of the terminal apparatus 502) can control an external status of the first vehicle 501, for example, can request to open a vehicle door lock of the first vehicle 501. Correspondingly, the first vehicle 501 receives the request from the terminal apparatus 502, and performs permission verification on the terminal apparatus 502. If the terminal apparatus 502 has permission to control the external status of the first vehicle 501, the external status of the first vehicle 501 may be correspondingly controlled, for example, the vehicle door lock may be opened.

The communication link between the terminal apparatus 502 and the first vehicle 501 may include one or more types of connection media, including a wired link (for example, an optical fiber), a wireless link, a combination of a wired link and a wireless link, or the like. For related descriptions, refer to the descriptions and examples of the connection medium in FIG. 3.

According to the vehicle control method provided in embodiments of this application, for a vehicle whose external status is a locked state, the vehicle or an authentication apparatus may perform authentication on a requester that requests to release the locked state of the vehicle, and release the locked state of the vehicle when the authentication succeeds.

In a method in which an authentication apparatus performs authentication on a requester that requests to release a locked state of a vehicle, a first vehicle sends first information to the authentication apparatus, where the first information is used to authorize the authentication apparatus, or indicates that the first vehicle is in a first state. The first state is, for example, a locked state; or the first state is, for example, a help-seeking state, a dangerous state, an alarm state, an emergency state, or a to-be-rescued state. A vehicle in the alarm state, the emergency state, or the to-be-rescued state is in a locked state. The locked state of the vehicle in the first state may be released by the authorization apparatus, or an external status of the vehicle in the first state may be controlled by the authorization apparatus. For example, the vehicle is controlled to be in the locked state or an unlocked state. If the first information is used to authorize the authentication apparatus, when receiving the first information, the authentication apparatus may learn that the authentication apparatus has permission to control the first vehicle, for example, release the locked state of the first vehicle.

The authentication apparatus receives the first information from the first vehicle, and learns that the first vehicle is in the first state. Therefore, when second information is received from a terminal apparatus, whether to release the locked state of the first vehicle may be determined based on the second information. The second information is used to request to release the locked state of the first vehicle. The second information includes verification information. The verification information is used to determine whether the terminal apparatus is an authorized terminal apparatus, that is, used to determine whether the terminal apparatus has permission to release the locked state of the first vehicle. When the terminal apparatus is an authorized terminal apparatus, it is determined to release the locked state of the first vehicle, and indication information is sent to the first vehicle, where the indication information indicates to release the locked state of the first vehicle.

It should be understood that the foregoing authorized apparatus may be understood as an apparatus having permission to control an external status of the first vehicle. For example, the foregoing authorized apparatus may be an authentication apparatus having control permission, a terminal apparatus having control permission, a road side apparatus having control permission, or an apparatus used by a user having control permission. In an implementation, the first vehicle may authorize the authentication apparatus when the first vehicle is in the first state, so that the authentication apparatus has permission to control the external status of the first vehicle. In another implementation, the first vehicle may indicate a status of the first vehicle to the authentication apparatus, and when receiving information indicating the status, the authentication apparatus may have, by default, permission to control the external status of the first vehicle. In another implementation, the first vehicle pre-authorizes the authentication apparatus (in an offline or online manner), but the permission is not activated. When the first vehicle is in the first state, the first vehicle indicates the state to the authentication apparatus to activate the permission of the authentication apparatus. Authorization of the terminal apparatus is described in the following embodiments.

With reference to the accompanying drawings, the following describes in detail a vehicle control method in embodiments of this application by using an example in which a vehicle door lock is controlled.

In a possible design, an authentication apparatus is located in a road side apparatus. The road side apparatus verifies an identity of an unlocking requester, and when determining that the identity of the unlocking requester is trusted or the unlocking requester has permission to release a locked state, the road side apparatus may indicate a first vehicle to release the locked state, for example, open a vehicle door lock.

Figure 6:
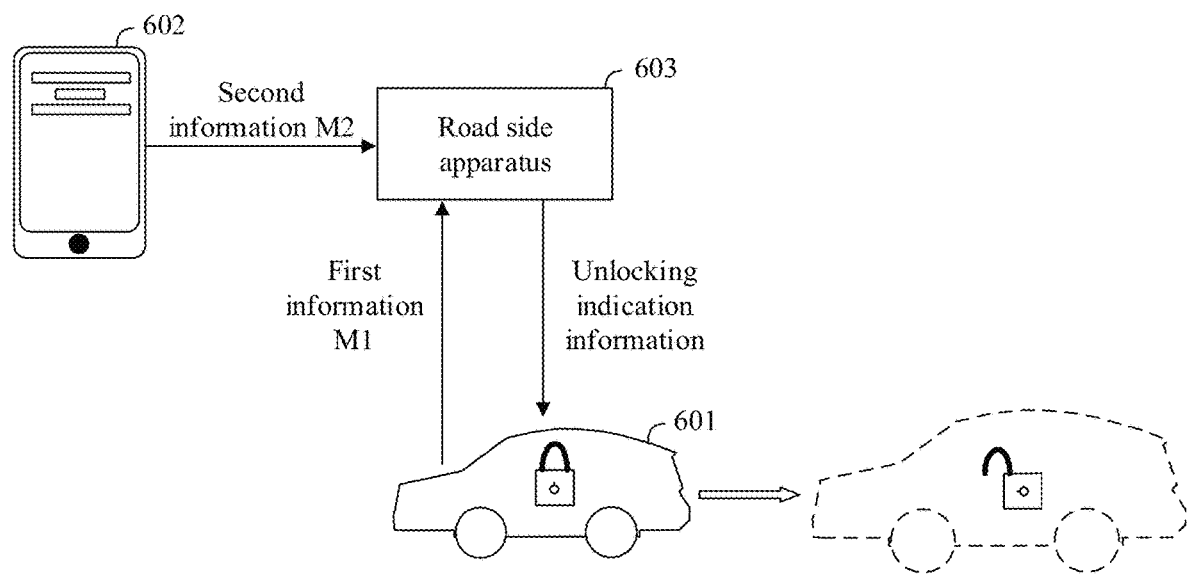
FIG. 6 is a schematic diagram of running of a vehicle control system according to an embodiment of this application.

For example, FIG. 6 is a schematic diagram of running of a vehicle control method according to an embodiment of this application. The method may be applied to the vehicle control system 30 shown in FIG. 3. A first vehicle 601 may send first information M1 to a road side apparatus 603. The first information M1 may indicate that the first vehicle 601 is in a first state, and the road side apparatus 603 can control a vehicle lock of the first vehicle 601 in the first state. A terminal apparatus 602 may send second information M2 to the road side apparatus 603, where the second information M2 is used to request to release a locked state of the first vehicle 601. If determining that the terminal apparatus 602 has permission to release the locked state of the first vehicle 601, the road side apparatus 603 may send unlocking indication information to the first vehicle 601. Correspondingly, the first vehicle 601 releases the locked state based on the unlocking indication information, for example, opens a vehicle door lock.

A possible scenario is considered. Refer to FIG. 1. The first vehicle 601 shown in FIG. 6 may be the vehicle 101 shown in FIG. 1, the terminal apparatus 602 shown in FIG. 6 may be the ambulance 102 shown in FIG. 1, and the road side apparatus 603 shown in FIG. 6 may be the RSU shown in FIG. 1. When the vehicle 101 is parked on a road side after being in danger, and a driver (or a passenger) cannot control the vehicle (for example, the driver (or the passenger) is in a coma or cannot move due to injury), the vehicle 101 may send first information M1 to the RSU on the road side. When the ambulance 102 arrives, the ambulance 102 may send second information M2 to the RSU. If determining that the ambulance 102 has permission to open the first vehicle, the RSU may send unlocking indication information to the vehicle 101. Correspondingly, the vehicle 101 may release a locked state based on the unlocking indication information, for example, unlock a vehicle door, so that the driver or the passenger in the vehicle 101 is rescued.

Another possible scenario is considered. Refer to FIG. 2. The first vehicle 601 shown in FIG. 6 may be the vehicle 201 shown in FIG. 2, the terminal apparatus 602 shown in FIG. 6 may be the intelligent terminal 203 (or the express vehicle 204) of the courier shown in FIG. 2, and the road side apparatus 603 shown in FIG. 6 may be the RSU shown in FIG. 1. A vehicle lock of the vehicle 201 may be controlled by the RSU. The courier may send second information M2 to the RSU by using the intelligent terminal 203. Correspondingly, when determining that the intelligent terminal 203 has unlocking permission, the RSU may indicate the vehicle 201 to open the vehicle lock. After permission of the terminal is verified and the vehicle lock is opened through the RSU, the courier or the like may put an express package or another item into the vehicle. This reduces a possibility of a property loss, and improves user experience.

Figure 7:
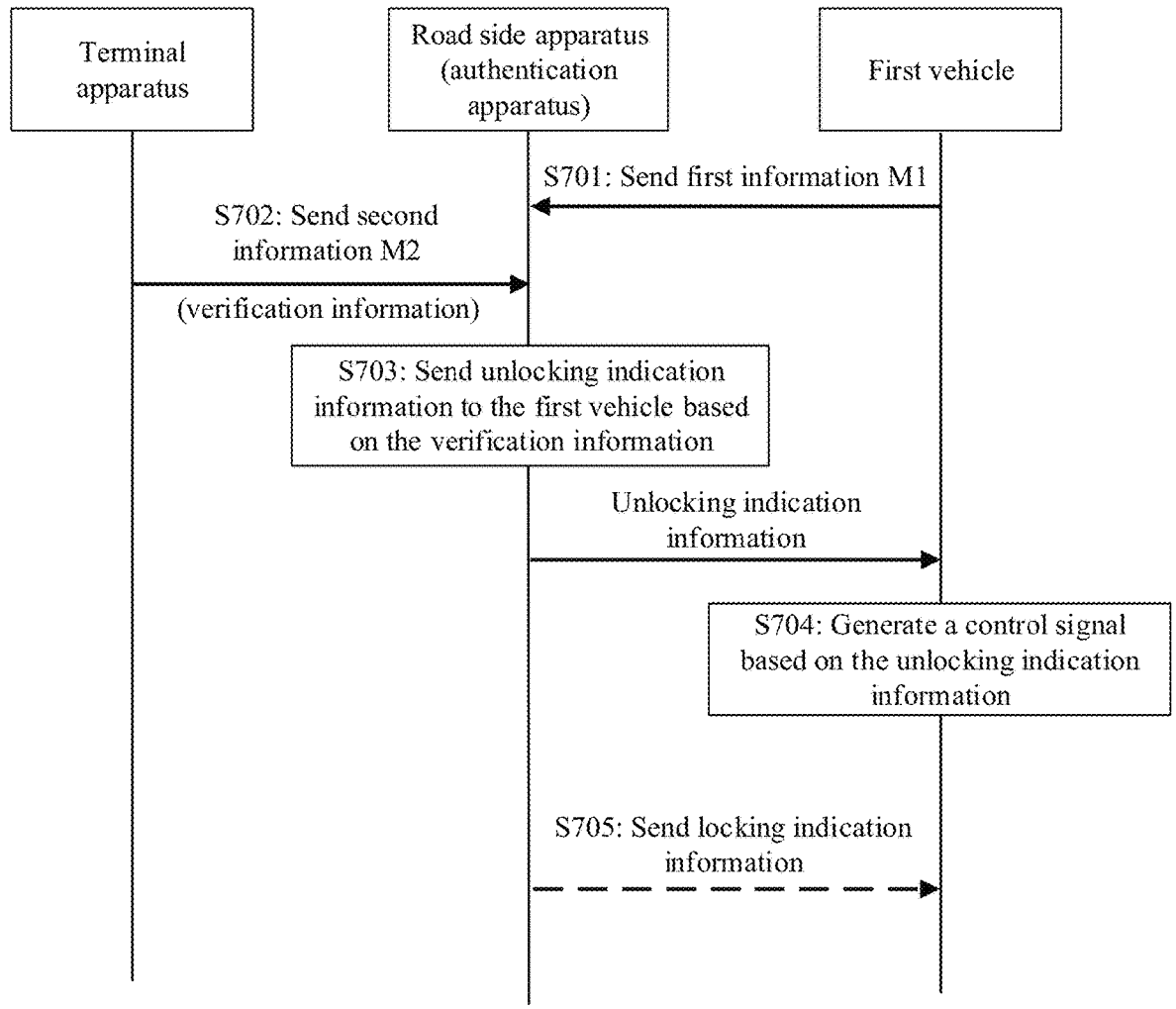
FIG. 7 is a schematic flowchart of a vehicle control method according to an embodiment of this application.

FIG. 7 is a schematic flowchart of a vehicle control method according to an embodiment of this application. Optionally, the method may be applied to the vehicle control system 30 in FIG. 3.

The vehicle control method shown in FIG. 7 may include at least step S701 to step S704. Details are as follows.

Step S701: A first vehicle sends first information M1.

A meaning of the first information M1 is the same as a meaning of the first information in the foregoing embodiments. For example, for the first information M1, the following enumerates three possible designs.

Design 1: The first information M1 may be a help-seeking message (which may also be referred to as a danger notification message) broadcast by the first vehicle to the surroundings, or a field or an information element of the help-seeking message. When the first vehicle broadcasts the help-seeking message, the first vehicle is in a first state, and indicates, by using the help-seeking message, that the vehicle is in the first state. Optionally, the first vehicle may broadcast the help-seeking message in the following help-seeking state: a dangerous state, an alarm state, an emergency state, a to-be-rescued state (for example, a state in which the vehicle encounters an accident or the driver has a sudden illness), or the like.

Optionally, the help-seeking message may be a message generated by an in-vehicle emergency call (E-call) system or a message (or referred to as an E-call request message) generated after E-call is activated. Alternatively, optionally, the help-seeking message may be a message generated by the first vehicle when the vehicle detects that the driver or the passenger cannot operate the vehicle. Alternatively, optionally, the help-seeking message may be a message actively triggered by the driver or the passenger. Alternatively, optionally, the help-seeking message may be a message generated after the first vehicle stops moving or the first vehicle is locked.

In a possible implementation, the first information M1 is a field in the help-seeking message, and is referred to as a first field below to distinguish from another field that may exist in the help-seeking message. "First" does not represent a location of the field in the help-seeking message, and is merely for ease of description. If the first field in the help-seeking message has a first value, the first vehicle is in the first state. Specifically, the help-seeking message may include the first field, and the first field may have a plurality of values. When a value of the first field is the first value, for example, "1", it indicates that hazard lights of the first vehicle have been activated (or indicates that E-call has been activated, or indicates that it is detected that the driver or the passenger cannot operate the vehicle). Correspondingly, a road side apparatus may determine, by parsing the help-seeking message, that the hazard lights of the first vehicle have been activated. When the hazard lights of the first vehicle have been activated, the first vehicle is in the first state, and indicates, by using the help-seeking message, that the first vehicle is in the first state.

It should be understood that a name of a message is not limited in embodiments of this application. Herein, an example is used to describe the message name for ease of understanding the solution.

Design 2: The first information M1 may be an authorization indication message sent by the first vehicle to the road side apparatus, or a field or an information element of the authorization indication message. The authorization indication message indicates that the road side apparatus has obtained authorization for controlling the first vehicle, for example, has obtained authorization for controlling a vehicle door lock of the first vehicle. Optionally, the authorization indication message may include one or more of an authorization letter, a permission code, a verification code, a security parameter, and the like that are related to permission.

Optionally, the permission indicated by the authorization indication message may be temporary or permanent. For example, the first information M1 may include time information (which is referred to as time information T3 for ease of differentiation), and the time information T3 indicates duration of the permission. In other words, the time information T3 indicates duration in which the first vehicle can be controlled by the road side apparatus.

Design 3: The first information M1 may be a request message sent by the first vehicle to the road side apparatus or a field or an information element of the request message, and the request message is used to request the road side apparatus to start control on the first vehicle based on authorization. For example, the road side apparatus has permission to control the vehicle door lock of the first vehicle, and the first vehicle sends the request message to the road side apparatus, to request the road side apparatus to control the vehicle door lock of the first vehicle.

The following enumerates a possible design. The road side apparatus has permanent authorization for controlling the vehicle door lock of the vehicle. When the first vehicle is in danger or in another scenario in which a vehicle door needs to be opened, the first vehicle may send the request message to the road side apparatus. Correspondingly, the road side apparatus may start control on the vehicle door lock based on the permission to control the vehicle door lock.

Optionally, the permission of the road side apparatus to control the vehicle door lock may be temporary authorization or permanent authorization. Usually, the temporary authorization has a specific period (or a validity period). The period of the temporary authorization may be predefined or preconfigured, or may be determined based on a user input, or may be calculated by the vehicle based on a current vehicle condition, a safety degree, or the like. The permanent authorization may not have a specific period, or may have a long period.

Optionally, the first information M1 may include time information T3, and a meaning of the time information T3 is the same as that in Design 2. For example, the time information T3 indicates duration in which an authorized apparatus is capable of releasing the locked state of the first vehicle. According to the time information T3, the vehicle door may be locked after the duration indicated by the time information T3 expires, to reduce a possibility of a property loss.

The help-seeking message in Design 1 may also include the time information T3. That is, in any implementation of Design 1 to Design 3, the first vehicle may send the time information T3 to the road side apparatus, to indicate, to the road side apparatus, a time period in which the road side apparatus controls a status of the first vehicle.

Further, optionally, the time information T3 may be duration, counter information, a validity period, or the like. For example, if the time information T3 is 1 hour, it indicates that a state in which the first vehicle can be controlled by the road side apparatus may last for 1 hour. For another example, the time information T3 is 00:00:00 on Apr. 1, 2021, which may indicate that a state in which the first vehicle can be controlled by the road side apparatus may last until the time point indicated by the time information T3. For another example, the time information T3 is time indication information "20200531183930", which indicates that a state in which the first vehicle can be controlled by the road side apparatus may last until 18:39:30 on May 31, 2020. Alternatively, the time information T3 may be timer information, a frame number of a protocol data unit, or the like. Details are not described herein.

In an implementation, the first information M1 includes first vehicle identity indication information, and the first vehicle identity indication information may indicate the first vehicle or a user that uses the first vehicle. For example, the first vehicle identity indication information may be identification information of the first vehicle or identification information of the user (which is referred to as a first user for ease of description) using the first vehicle. The identification information of the first vehicle may be one or more of a vehicle identification number (VIN, also referred to as vehicle frame number), a license plate number, a MAC address of the first vehicle or a MAC address of a communications module in the first vehicle, an IP address of the first vehicle or a MAC address of a communications module in the first vehicle, an identity (ID, which may be a fixed ID or a temporary ID) of the first vehicle, a device name, a number, a key (or a security parameter or a security certificate) corresponding to the first vehicle, or the like. Alternatively, the identification information of the first vehicle may be information that is generated based on one or more pieces of the foregoing information and that identifies the first vehicle. Optionally, the identification information of the first user may be one or more of an ID, a user name, an identity certificate, a number, or the like of the first user.

Correspondingly, when receiving the first identification information, the road side apparatus may determine that the first vehicle corresponding to the first identification information is in the first state.

Optionally, the first information M1 may further include vehicle lock indication information. The vehicle lock indication information indicates a vehicle lock to be unlocked. For the vehicle lock indication information, refer to the foregoing descriptions.

Optionally, the first information M1 may further include one or more of location information (for example, coordinates) of the first vehicle, a quantity of passengers in the first vehicle, vehicle model information of the first vehicle, voice information in a period of time, an E-call trigger reason, vehicle condition information, and the like. In this way, an apparatus receiving the first information M1 may obtain more detailed information of the first vehicle, to properly meet a requirement of the first vehicle. For example, when the first vehicle seeks help, a danger situation may be learned by using the foregoing information, to facilitate formulation of a rescue plan and improve rescue efficiency. For example, a route to a danger location may be planned based on the location information of the first vehicle, to facilitate a rescue. For another example, according to the quantity of passengers in the first vehicle or a vehicle model of the first vehicle (for example, a bus or a common passenger vehicle), a quantity of rescue vehicles, a quantity of rescue devices or a quantity of medical devices or medicines that need to be carried, and the like can be easily arranged, to cope with different quantities of people in danger and improve rescue efficiency.

Optionally, the first information M1 may be sent in a unicast, multicast, or broadcast manner. For example, when the first information M1 is sent in a broadcast manner, the first information M1 may be received by a node (or a workstation, a terminal, a road side apparatus, or the like) in a subnet or an area. When the first information M1 is sent in a multicast manner, the first information M1 may be received by another node in a communication group. When the first information M1 is sent in a unicast manner (for example, when the first vehicle sends the first information M1 to the road side apparatus), the first information M1 may be received by a receiver specified by the first vehicle.

Optionally, the first information M1 may be sent by the first vehicle to the road side apparatus in a unicast manner. Correspondingly, the road side apparatus receives the first information M1 from the first vehicle. Alternatively, the first information M1 may be sent by the first vehicle in a broadcast manner, and the road side apparatus is within a broadcast range. Correspondingly, the road side apparatus receives the first information M1 from the first vehicle.

Optionally, the first information M1 may be sent a plurality of times at different time points. Further, the first information M1 is periodically repeated information. For example, the first information M1 may be a periodically repeated message, or the first information M1 may be included in a periodically repeated message. For example, a broadcast message including the first information M1 may be broadcast once every 5 seconds (s). In a possible design, the first vehicle may continuously notify the road side apparatus of an updated status of the first vehicle by sending the periodic first information M1, so that the road side apparatus performs, in a timely manner, an operation that matches the latest status of the first vehicle. In addition, periodically repeated sending can increase a possibility that the first information M1 is successfully received.

Step S702: A terminal apparatus sends second information M2.

Specifically, the second information M2 includes verification information, and the verification information is used by an authentication apparatus to determine permission of the terminal apparatus, that is, determine whether the terminal apparatus has permission to change or control a status of the first vehicle, for example, release the locked state of the first vehicle.

The second information M2 may be used to request to release the locked state of the first vehicle, for example, request to open the vehicle door lock of the first vehicle. For example, the second information M2 is included in an unlocking request message. When receiving the second information M2, the road side apparatus may indicate, in response to the second information M2 after confirming the permission, to open the vehicle door lock of the first vehicle. For another example, the second information M2 may be included in a broadcast message. The terminal apparatus may be a special vehicle (including but not limited to a police car, a tractor, an express transportation vehicle, or the like) or a rescue vehicle (including but not limited to an ambulance, a fire engine, a recovery vehicle, or the like). In response to the broadcast message of the special vehicle, after confirming the permission, the road side apparatus may indicate to open the vehicle door lock of the first vehicle.

Optionally, the second information M2 may be sent a plurality of times at different time points. Further, the second information M2 is periodically repeated information. For example, the second information M2 is a periodically repeated message, or the second information M2 is included in a periodically repeated message. For example, a broadcast message including the second information M2 may be broadcast every 5 minutes. In a possible design, periodically repeated sending can increase a possibility that the second information M2 is successfully received by the road side apparatus. In addition, the periodically repeated sending may further indicate that a request of the terminal apparatus for requesting to open the vehicle door lock persists. That is, if the terminal apparatus stops periodically sending the second information M2, it may indicate that the terminal apparatus changes from expecting to open the vehicle door lock to not expecting to open the vehicle door lock.

In an implementation, the verification information includes second identification information, and the second identification information may be identification information of the terminal apparatus or identification information of a user (which is referred to as a second user for ease of differentiation) using the terminal apparatus. The identification information of the terminal apparatus may be one or more of a MAC address of the terminal apparatus, an IP address of the terminal apparatus, an ID (which may be a fixed ID or a temporary ID) of the terminal apparatus, a device name, a number, and the like. Alternatively, the identification information of the terminal apparatus may be information that is generated based on one or more pieces of the foregoing information and that identifies the terminal apparatus. Optionally, if the terminal apparatus is a vehicle (which is referred to as a second vehicle for ease of description), an identifier of the terminal apparatus may alternatively be one or more of a vehicle identification number (VIN, also referred to as a vehicle frame number), a license plate number, and the like of the second vehicle.

Optionally, the identification information of the second user may be one or more of an ID, a user name, an identity certificate, a number, or the like of the second user.

Optionally, the second information M2 may include time information (which is referred to as time information T1 for ease of differentiation), and the time information T1 indicates a time period for which the first vehicle is to maintain the unlocked state. The time period for maintaining the unlocked state may also be understood as a time period of the vehicle from being unlocked to being locked again. For example, the time information T1 may indicate duration in which the vehicle door lock maintains an unlocked state. The time information may be duration, counter information, a validity period, or the like. For a related example, refer to the foregoing example of the time information T3. For example, if the time information T1 is 1 hour, after the first vehicle releases the locked state of the vehicle door lock, the vehicle door lock may maintain the unlocked state for 1 hour (a start time point may be preset, or may be a moment of receiving the second information M2, or may be a moment of releasing the locked state of the vehicle door lock). After 1 hour, the vehicle door lock is controlled to be in the locked state. It can be learned that according to the time information, the vehicle door may be locked after the duration expires, to avoid a possibility of a property loss.

Optionally, the second information M2 may be sent in a unicast, multicast, or broadcast manner. For details, refer to the descriptions of the manner of sending the first information M1 in step S701. Details are not described herein. Optionally, the second information M2 may be sent by the terminal apparatus to the road side apparatus in a unicast manner. Correspondingly, the road side apparatus receives the second information M2 from the terminal apparatus. Alternatively, the second information M2 may be sent by the terminal apparatus in a broadcast manner, and the road side apparatus is within a broadcast range. Correspondingly, the road side apparatus receives the second information M2 from the terminal apparatus.

Step S703: The road side apparatus sends unlocking indication information to the first vehicle based on the verification information, where the unlocking indication information indicates to release the locked state of the first vehicle. Correspondingly, the first vehicle may receive the unlocking indication information from the road side apparatus. For example, the unlocking indication information indicates to open the vehicle door lock of the first vehicle. Correspondingly, the first vehicle may open the vehicle door lock based on the unlocking indication information.

The road side apparatus determines, based on the verification information, whether to release the locked state of the first vehicle or whether the terminal apparatus has permission to release the locked state of the first vehicle. The unlocking indication information is sent to the first vehicle when it is determined to release the locked state of the first vehicle or when the terminal apparatus has unlocking permission for the first vehicle. The unlocking indication information is not sent to the first vehicle when it is determined not to release the locked state of the first vehicle or when the terminal apparatus does not have unlocking permission for the first vehicle.

It can be learned that the road side apparatus may determine, based on the verification information, that the terminal apparatus is authorized to control the first vehicle, and then send the unlocking indication information to the first vehicle. For example, the following enumerates three possible implementations.

Implementation 1: The road side apparatus may obtain, from the terminal apparatus, the identification information of the terminal apparatus or the identification information of the second user that uses the terminal apparatus. When the identification information of the terminal apparatus indicates an authorized apparatus or the identification information of the second user indicates an authorized user, it is determined to release the locked state of the first vehicle. The road side apparatus sends the unlocking indication information to the first vehicle.

Optionally, the second information M2 (or the verification information in the second information M2) may include the identification information of the terminal apparatus or the identification information of the second user, so that the road side apparatus may obtain the identification information of the terminal apparatus or the identification information of the second user by receiving the second information M2. Alternatively, the road side apparatus may obtain the identification information of the terminal apparatus or the identification information of the second user from the terminal apparatus by using a handshake message or another message.

For example, the road side apparatus stores authorization information, and the authorization information includes identification information corresponding to one or more terminal apparatuses that have permission to control the first vehicle, or identification information corresponding to one or more users. If the verification information includes the identification information of the terminal apparatus or the identification information of the second user that uses the terminal apparatus, the road side apparatus may determine, based on the verification information, whether the terminal apparatus is an authorized terminal apparatus or whether the second user is an authorized user.

For example, the authorization information is an authorization list (which is also referred to as a whitelist), and the authorization list includes identification information of a terminal apparatus or a user that has permission to control the first vehicle. When the terminal apparatus is verified based on the verification information, whether the identification information of the terminal apparatus indicates a terminal apparatus in the authorization list or whether the identification information of the second user indicates a user in the authorization list may be determined. When the terminal apparatus or the user in the authorization list is indicated, the road side apparatus determines to release the locked state of the first vehicle or the terminal apparatus has the unlocking permission for the first vehicle.

It can be learned that in Implementation 1, the road side apparatus may not need to use the first vehicle identity indication information during authentication or authorization. For example, the terminal apparatus may be a trusted public rescue apparatus like a fire engine or an ambulance. The authentication apparatus may consider by default that the public rescue apparatus is granted, in a specific condition (for example, the first vehicle sends the first information in a unicast manner or in a broadcast manner), permission to release locked states of all vehicles.

Implementation 2: The road side apparatus determines, based on the verification information and the first vehicle identity indication information, that the terminal apparatus is an apparatus authorized to release the locked state of the first vehicle, and then sends the unlocking indication information to the first vehicle.

Specifically, the first vehicle identity indication information indicates the first vehicle or the first user that uses the first vehicle. The first identity indication information may be sent by the first vehicle to the road side apparatus, or may be obtained by the road side apparatus by querying a network side. Optionally, the first identity indication information and the first information M1 may be a same piece of information, or may be different pieces of information. Alternatively, optionally, the first identity indication information may be included in a broadcast message or a handshake message of the first vehicle.

Authorized apparatuses of different vehicles are different, or authorized users of different vehicles are different. Therefore, the first vehicle identity indication information needs to be used to determine an authorized apparatus or an authorized user for the first vehicle.

In an example, the road side apparatus determines authorization information of the first vehicle based on the first vehicle identity indication information. The road side apparatus determines, based on the identification information of the terminal apparatus and the authorization information of the first vehicle, whether the terminal apparatus is an apparatus authorized to release the locked state of the first vehicle. Alternatively, the road side apparatus determines, based on the identification information of the second user that uses the terminal apparatus and the authorization information of the first vehicle, whether the second user is a user authorized to release the locked state of the first vehicle. For related descriptions, refer to the descriptions in Implementation 1.

In another example, the authorized apparatus for the first vehicle may include a private apparatus, for example, a private car. A user of the private car has a kinship or another trust relationship with the user that uses the first vehicle. Because users of different vehicles have different kinship or trust relationships, the first vehicle needs to provide the first vehicle identity indication information for the road side apparatus. Correspondingly, the road side apparatus determines, based on the first vehicle identity indication information and the verification information, whether the terminal apparatus has permission to release the locked state of the first vehicle.

In another example, some vehicles (or users of the vehicles) may subscribe to a public rescue service in advance. In this case, a public rescue apparatus (for example, a fire engine or an ambulance) has permission to control an external status of the first vehicle. Some vehicles (or users of the vehicles) do not subscribe to the public rescue service, and another authorization mechanism may need to be executed. In this case, the first vehicle provides the first vehicle identity indication information for the road side apparatus, to determine whether the first vehicle or the user that uses the first vehicle subscribes to the public rescue service.

Implementation 3: A type of a terminal apparatus having control permission is predefined (or preconfigured or specified in a protocol) in the road side apparatus, and the verification information includes type information of the terminal apparatus. In this case, the road side apparatus may determine, based on the verification information, whether the terminal apparatus is authorized to control the first vehicle, to send the unlocking indication information to the first vehicle.

For example, when the type information of the terminal apparatus indicates a type of a terminal apparatus in an authorization list, it is determined to release the locked state of the first vehicle, that is, it is determined that the terminal apparatus has the permission to control the first vehicle.

In an implementation, the unlocking indication information may include security information, and the security information is used by the first vehicle to perform security check on the road side apparatus, to improve communication security. For example, the security information may be an identifier of a connection between the first vehicle and the road side apparatus, a security context of the road side apparatus, or the like. The first vehicle may verify, based on the security information, whether an identity of the road side apparatus is trusted.

In another implementation, the unlocking indication information may include identification information of the road side apparatus. Specifically, the identification information of the road side device may be used by the first vehicle to determine whether the identity of the road side device is trusted or secure. In addition/Alternatively, the identification information of the road side device may be further used by the first vehicle to determine whether the road side device has permission to open the vehicle door lock. The identification information of the road side apparatus may be one or more of a MAC address of the road side apparatus, an IP address of the road side apparatus, an ID (which may be a fixed ID or a temporary ID) of the road side apparatus, a device name, a number, or the like. Alternatively, the identification information of the road side apparatus may be information that is generated based on one or more pieces of the foregoing information and that identifies the road side apparatus.

In another implementation, the unlocking indication information includes both identification information of the road side apparatus and security information.

Optionally, the unlocking indication information may include time information (which is referred to as time information T2 for ease of differentiation), and the time information T2 indicates the time period for which the first vehicle is to maintain the unlocked state, for example, a time period for which the vehicle door lock is to maintain the unlocked state. According to the time information T2, the vehicle door may be locked after the time period indicated by the time information T2 expires, to reduce a possibility of a property loss.

Optionally, the unlocking indication information may include vehicle lock indication information. The vehicle lock indication information indicates a vehicle lock to be unlocked. For example, the vehicle lock indication information may indicate at least one of a driver-side door lock, a front-passenger-side door lock, a rear seat door lock, a rear trunk lock, a front trunk lock, a sunroof lock, and the like that are of the first vehicle. For details, refer to the foregoing descriptions.

Optionally, the unlocking indication information may be sent a plurality of times at different time points. Further, the unlocking indication information is periodically repeated information. For example, the unlocking indication information is a periodically repeated message, or the unlocking indication information is included in a periodically repeated message. For example, a message including the unlocking indication information may be sent once every 20 s. In a possible design, periodically repeated sending can increase a possibility that the unlocking indication information is successfully received by the first vehicle. In addition, the periodically repeated sending may further indicate that the road side apparatus expects the vehicle lock to be in an opened state continuously. That is, if the road side apparatus stops periodically sending the unlocking indication information, it may indicate that the road side apparatus changes from expecting the vehicle lock to be opened to not expecting the vehicle lock to be opened.

Optionally, the authorization information (for example, the authorization list) may be preconfigured in the road side apparatus, or may be upgraded to the road side apparatus by using an over-the-air OTA technology, or may be received by the road side apparatus from a network side device (for example, a server or a cloud), or may be entered by a user into the road side device.

It can be learned that because a location of the road side apparatus is usually fixed, the road side apparatus can more conveniently obtain an apparatus that has vehicle lock control permission in an area in which the road side apparatus is located, a user that uses the apparatus, an apparatus type, or the like, so that the authorization information can be updated in a more timely manner. This improves user experience. Certainly, this application is also applicable to a case in which the road side apparatus is not fixed.

Step S704: The first vehicle generates a control signal based on the unlocking indication information.

The control signal may be used to release the locked state of the first vehicle. For example, there may be the following three possible cases in which the first vehicle generates the control signal based on the unlocking indication information.

Case 1: If security verification has been performed between the road side apparatus and the first vehicle, secure communication may be performed between the first vehicle and the road side apparatus. When receiving the unlocking indication information of the road side apparatus, the first vehicle may determine that the road side apparatus is a real or secure road side apparatus, and release the locked state.

Case 2: The unlocking indication information includes security information. If determining, based on the security information, that the identity of the road side apparatus is trusted or secure, the first vehicle releases the locked state.

Case 3: The unlocking indication information may include the identification information of the road side apparatus. If determining, based on the identification information of the road side apparatus, that the road side apparatus is an authorized apparatus, the first vehicle releases the locked state.

It should be understood that the three cases may coexist, or two of the three cases may exist, or the three cases may exist independently. For example, if the unlocking indication information includes both the security information and the identification information of the road side apparatus, the first vehicle determines, based on the identification information of the road side information, that the road side apparatus is an authorized apparatus, determines, based on the security information, that the identity of the road side apparatus is trusted or secure, and then generates the control signal to release the locked state.

Further, the control signal may be output to the vehicle lock, to release the locked state of the vehicle lock.

Optionally, if the unlocking indication information includes vehicle lock indication information, the control signal may be sent to a vehicle lock indicated by the vehicle lock indication information, to open the corresponding vehicle lock.

Optionally, the first vehicle may control duration for which the vehicle lock maintains the unlocked state. The following enumerates two possible examples.

Example 1: If the first vehicle does not receive, within a period of time (which is referred to as a preset time period P1 for ease of description) after the unlocking indication information is received, a message indicating to maintain the unlocked state of the first vehicle, the first vehicle generates a control signal for closing the vehicle lock.

The message for maintaining the unlocked state of the first vehicle may be unlocking indication information periodically or aperiodically sent by the road side apparatus. For example, the unlocking indication information may be sent once every 10 minutes, and the preset time period P1 is 12 minutes. After the first vehicle generates the unlocking control signal based on the unlocking indication information, if the first vehicle does not receive the unlocking indication information again within 12 minutes (optionally, including 12 minutes), the first vehicle generates a locking control signal. The locking control signal is used to control the first vehicle to be in the locked state.

Example 2: After the first vehicle outputs the control signal (or opens the vehicle door lock) based on the unlocking indication information, if the vehicle lock is not opened within a period of time (which is referred to as a preset time period P2 for ease of description), a locking control signal for closing the vehicle lock is generated. The preset time period P2 may be predefined or preconfigured, or may be obtained based on a user input, or may be obtained through calculation based on a safety status and/or a vehicle status. For example, the preset time period P2 may be 20 minutes. If the vehicle lock is not opened within 20 minutes (optionally, including 20 minutes) after the first vehicle generates the unlocking control signal, a locking control signal is generated. The locking control signal is used to control the first vehicle to be in the locked state.

A possible case is considered. After the first vehicle broadcasts the help-seeking message, if a rescue vehicle passes nearby (the rescue vehicle does not rescue the first vehicle, for example, only passes nearby), the rescue vehicle broadcasts the second information M2, and the road side apparatus determines that the rescue vehicle has permission to open the first vehicle, so as to indicate to open the vehicle lock of the first vehicle. In this case, after the vehicle lock of the first vehicle is opened, if a device, for example, a vehicle door, locked by the vehicle lock is not opened within the preset time period P2, the vehicle lock may be closed.

Optionally, the vehicle lock control method shown in FIG. 7 further includes step S705, which is specifically as follows.

Step S705: If the road side apparatus does not receive, within a preset time period (the preset time period is referred to as a preset time period P3 for ease of differentiation) after the second information M2 is received, third information for requesting to maintain the locked state of the first vehicle, for example, third information for requesting to maintain the vehicle door lock opened, the road side apparatus sends locking indication information to the first vehicle. The locking indication information is used to control the first vehicle to be in the locked state, for example, used to close the vehicle lock or enable the locked state of the first vehicle.

Optionally, the preset time period may be preconfigured, predefined, or obtained through user input.

Optionally, content of the third information may be the same as that of the second information M2. Further, optionally, the second information M2 may be periodically sent information (for example, included in periodically repeated information), and the second information M2 and the third information may be information with same content but different sending time points.

In a possible case, to improve safety, the road side apparatus periodically or aperiodically determines permission of the road side apparatus. If the third information for requesting to maintain the unlocked state of the first vehicle is received within the preset time period P3 after the second information M2 is received, the vehicle lock may be indicated to maintain the unlocked state. If the third information for requesting to maintain the unlocked state of the first vehicle is not received within the preset time period P3 after the second information M2 is received, the vehicle door lock may be closed.

For example, the third information indicates to maintain the vehicle door lock opened. If the road side apparatus determines that the third information is not received within the preset time period P3 after the second information M2 is received, the road side apparatus may send the locking indication information to the first vehicle, to indicate to close the vehicle door lock.

It should be understood that, if the first vehicle is originally in the locked state, the first vehicle may maintain the locked state. If the first vehicle is in the unlocked state, the locking control signal is generated, to control the first vehicle to be in the locked state.

Optionally, security protection may be performed on the first information M1, the second information M2, the unlocking indication information, the third information, and the locking indication information by using one or more of an encryption key, an integrity protection key, a signature mechanism, or the like. For example, a signature (and/or a security certificate) is carried when an information sender sends information. After receiving the information, a receiver verifies the signature to confirm authenticity of the obtained information. For example, security protection is performed on the second information M2. The terminal apparatus may send a first signature to the road side apparatus, where the first signature is determined based on the second information M2 and a first private key. Correspondingly, the road side apparatus receives the first signature from the terminal apparatus, and determines, based on the first signature and a first public key (the first public key is a decryption key of the first private key), that verification on the second information M2 succeeds. A source of the second information M2 may be determined through signature verification, to improve security.

In the embodiment shown in FIG. 7, the authentication apparatus has permission to control a vehicle. The authentication apparatus serves as a trusted management intermediary between the vehicle and an unlocking requester, to more conveniently and safely control an external status of the first vehicle (for example, a locked state or an unlocked state of a vehicle door or a rear trunk, an opened state or a closed state of a vehicle window, or an opened state or a closed state of a sunroof).

In another possible design, the terminal apparatus may send second information (which is referred to as information I1 for ease of differentiation) to the first vehicle, where the information I1 is used to request to release the locked state of the first vehicle. The first vehicle sends information I2 to the road side apparatus in response to the information I1, and the authentication apparatus is located in the road side apparatus. In this case, the road side apparatus may serve as a trusted management intermediary between an unlocking requester (the terminal apparatus or the user of the terminal apparatus) and the first vehicle. When the road side apparatus determines that an identity of the unlocking requester is trusted or the unlocking requester has permission to open the vehicle door lock, the road side apparatus may indicate the first vehicle to open the vehicle door lock.

Figure 8:
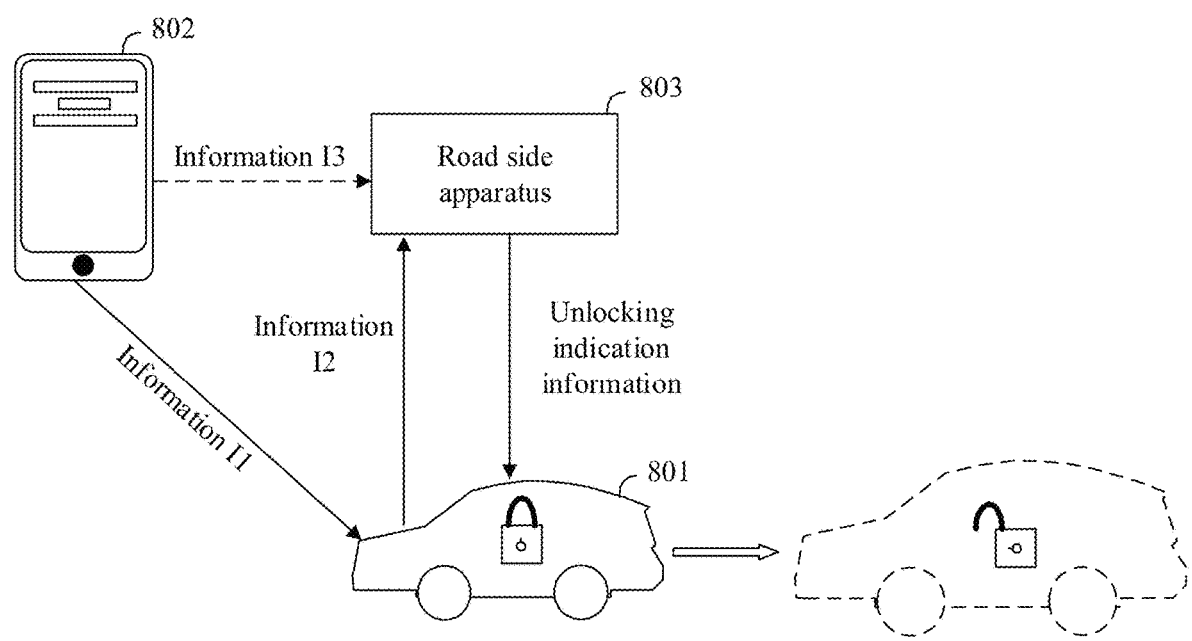
FIG. 8 is a schematic diagram of running of another vehicle control system according to an embodiment of this application.

For example, FIG. 8 is a schematic diagram of running of another possible vehicle control method according to an embodiment of this application. The method may be applied to the vehicle control system 30 shown in FIG. 3. A terminal apparatus 802 sends information I1 to a first vehicle 801, where the information I1 is used to request to release a locked state of the first vehicle. In response to the information I1, the first vehicle 801 may send information I2 to a road side apparatus 803. The information I2 may indicate that the first vehicle 801 is in a first state. The road side apparatus 803 can control an external status of the first vehicle 801 in the first state. After determining that the terminal apparatus 802 has permission to control the first vehicle 801, the road side apparatus 803 may indicate the first vehicle 801 to open a vehicle lock.

Figure 9:
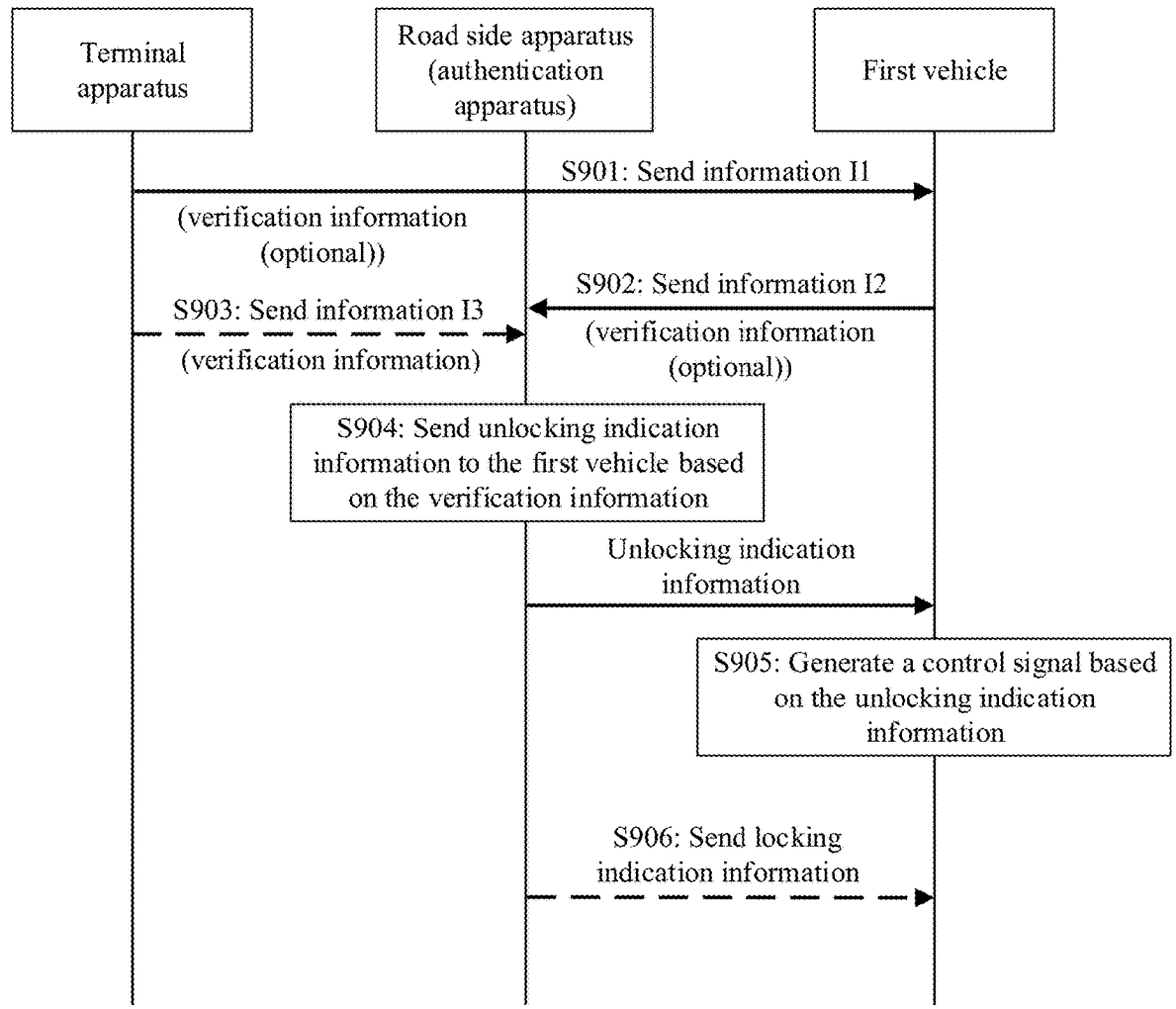
FIG. 9 is a schematic flowchart of another vehicle control method according to an embodiment of this application.

Specifically, FIG. 9 is a schematic flowchart of a vehicle control method according to an embodiment of this application. Optionally, the method may be applied to the vehicle control system 30 in FIG. 3.

The vehicle control method shown in FIG. 9 may include at least step S901 to step S904. Details are as follows.

Step S901: A terminal apparatus sends information I1 to a first vehicle.

Optionally, the information I1 may be used to request to release a locked state of the first vehicle. The following enumerates three possible designs.

Design 1: The information I1 is predefined, preconfigured, or protocol-specified request information. When a receiver (for example, the first vehicle) receives the information I1, the receiver may release a locked state in response to the information I1.

Design 2: The information I1 may include a field, and the field may have a plurality of values. When a field obtained by a receiver (for example, the first vehicle) through parsing has a first value, the receiver may release a locked state.

Design 3: The information I1 may be broadcast information sent by a special vehicle. A receiver releases a locked state in response to the broadcast message from the special vehicle.

Further, in any implementation of Design 1 to Design 3, before releasing the locked state, the receiver may first determine that the terminal apparatus has permission.

Optionally, the information I1 may include verification information. The verification information may be used to determine whether the terminal apparatus or a user that uses the terminal apparatus has permission to control the vehicle, or used to verify whether an identity of the terminal apparatus is trusted, or the like. The verification information may include identification information of the terminal apparatus, identification information of the user that uses the terminal apparatus, or the like. For the identification information, refer to the descriptions in step S702.

Optionally, the information I1 may include time information. The time information indicates a time period for which the first vehicle is to maintain an unlocked state (or an opened state), or indicates a time period in which the first vehicle can be controlled by another apparatus (for example, the terminal apparatus or a road side apparatus).

Optionally, the information I1 may be sent a plurality of times at different time points. Further, the information I1 is periodically repeated information. For example, the information I1 is included in periodically repeated information. For a periodicity of the information I1, refer to the foregoing descriptions of the periodicity of the information I2. Details are not described herein.

Optionally, the information I1 may be sent in a unicast, multicast, or broadcast manner. For example, the information I1 may be sent by the terminal apparatus to the first vehicle in a unicast manner. Correspondingly, the first vehicle receives the information I1 from the terminal apparatus. For another example, the information I1 may be sent by the terminal apparatus in a broadcast manner, and the first vehicle is within a broadcast range of the terminal apparatus. Correspondingly, the first vehicle receives the information I1 from the terminal apparatus.

Step S902: The first vehicle sends information I2.

A meaning of the information I2 is the same as that of the first information M1 in the embodiment shown in FIG. 7. Optionally, the information I2 may include one or more of first vehicle identity indication information, time information, vehicle lock indication information, location information (for example, coordinates) of the first vehicle, a quantity of passengers in the first vehicle, vehicle model information of the first vehicle, voice information within a period of time, an E-call trigger reason, vehicle condition information, and the like. For specific descriptions of the information I2, refer to step S701.

Further, the information I2 may include information about the terminal apparatus, for example, the foregoing verification information.

Optionally, the information I2 may be sent by the first vehicle to a road side apparatus in response to the information I1.

Optionally, the embodiment shown in FIG. 9 may further include step S903, which is specifically as follows.

Step S903: The terminal apparatus sends information I3 to the road side apparatus.

The information I3 may include the verification information. The verification information may be used to determine whether the terminal apparatus or the user that uses the terminal apparatus has permission to control the vehicle, or used to verify whether the identity of the terminal apparatus is trusted, or the like.

When step S903 is not included in this embodiment, the information I2 in step S902 includes the verification information. When step S903 is included in this embodiment, the information I1 in step S901 includes the verification information, or may not include the verification information.

For specific descriptions of the information 13, refer to related descriptions of the information M2 in step S702.

It should be understood that step S903 is an optional step, that is, the terminal apparatus may send the information 13 to the road side apparatus, or may not send the information 13 to the road side apparatus.

For example, in a design, the information 13 may include identification information of the terminal apparatus, and the identification information of the terminal apparatus may be used by the road side apparatus to determine whether the terminal apparatus is an authorized apparatus.

In another design, the first vehicle may obtain the identification information of the terminal apparatus, and the foregoing information 12 may carry the identification information of the terminal apparatus, so that the terminal apparatus does not need to send the information 13 to the road side apparatus.

Certainly, this is also applicable to a case in which the information 13 includes other information (for example, identification information of the user that uses the terminal apparatus).

Step S904: The road side apparatus sends unlocking indication information to the first vehicle based on the verification information, where the unlocking indication information indicates to release the locked state of the first vehicle. Correspondingly, the first vehicle may receive the unlocking indication information from the road side apparatus. For example, the unlocking indication information indicates to open the vehicle door lock of the first vehicle. Correspondingly, the first vehicle may open the vehicle door lock based on the unlocking indication information.

For specific descriptions, refer to related descriptions in step S703.

Step S905: The first vehicle generates a control signal based on the unlocking indication information.

The control signal may be used to release the locked state of the first vehicle.

For details, refer to related descriptions in step S704.

Optionally, the vehicle door lock control method shown in FIG. 9 further includes step S906, which is specifically as follows.

Step S906: If the road side apparatus does not receive, within a preset time period after the information 13 is received, information for requesting to maintain the locked state of the first vehicle, for example, information for requesting to maintain the vehicle door lock opened, the road side apparatus sends locking indication information to the first vehicle. The locking indication information is used to close the vehicle lock or enable the locked state of the first vehicle.

For specific descriptions, refer to related descriptions in step S705.

In the embodiment shown in FIG. 9, the authentication apparatus has permission to control a vehicle. The authentication apparatus serves as a trusted management intermediary between the vehicle and an unlocking requester, to more conveniently and safely control an external status of the first vehicle (for example, a locked state or an unlocked state of a vehicle door or a rear trunk, an opened state or a closed state of a vehicle window, or an opened state or a closed state of a sunroof).

In another possible design, a terminal apparatus may request authorization from an authentication apparatus. Correspondingly, the authentication apparatus may grant the terminal apparatus permission to control a vehicle, so that the terminal apparatus can control an external status of the vehicle, for example, control the vehicle to be in a locked state or an unlocked state. In an implementation, permission granting may be implemented by sending authorization information to the terminal apparatus. Correspondingly, the terminal apparatus may indicate, based on the authorization information, a first vehicle to open a vehicle door lock.

Figure 10:
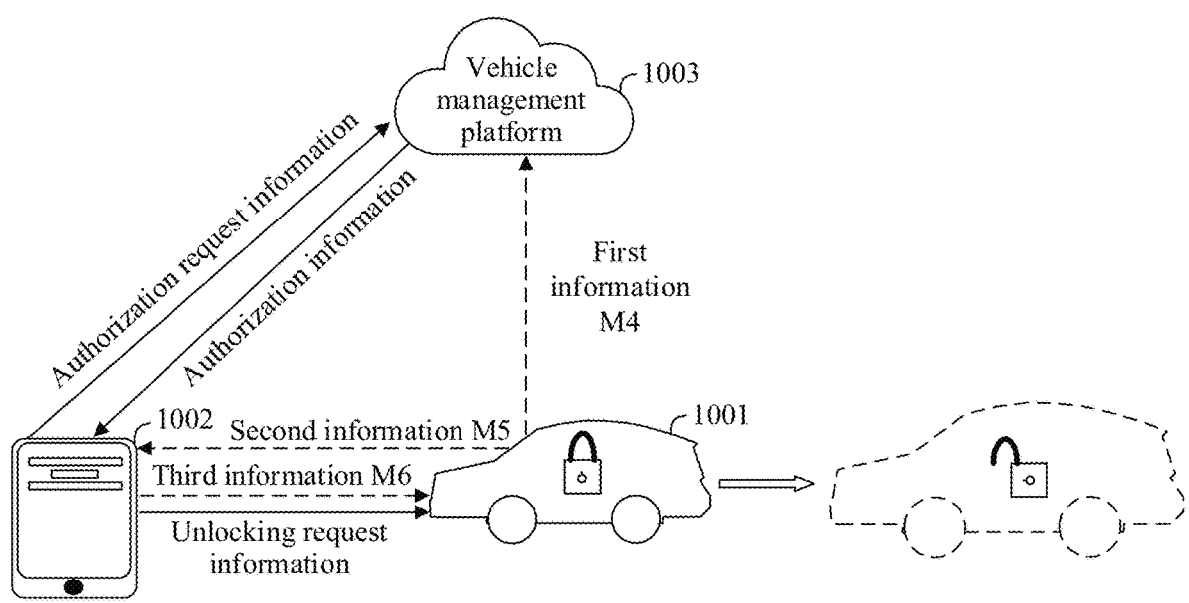
FIG. 10 is a schematic diagram of running of another vehicle control system according to an embodiment of this application.

For example, FIG. 10 is a schematic diagram of running of a vehicle control method according to an embodiment of this application. The method may be applied to the vehicle control system 40 shown in FIG. 4. An authentication apparatus is located in a vehicle management platform 1003, and a first vehicle 1001 may send first information (which is referred to as first information M4 for ease of differentiation) to the vehicle management platform 1003. The first information M4 is used to perform authorization or indicates that the first vehicle 1001 is in a first state. For related descriptions of the first information M4, refer to the foregoing descriptions of the first information. An external status of the first vehicle 1001 may be controlled by another apparatus. The another apparatus, for example, a terminal apparatus 1002, may request authorization from the vehicle management platform 1003. Correspondingly, when determining that an identity of the terminal apparatus 1002 is trusted or the terminal apparatus 1002 has permission to open a vehicle door lock, the vehicle management platform 1003 may send permission information to the terminal apparatus 1002. The terminal apparatus 1002 may send unlocking request information to the vehicle based on the permission information, for example, authorization information, to indicate the first vehicle to release a locked state, for example, open the vehicle door lock.

A possible scenario is considered. Refer to FIG. 1. The first vehicle 1001 shown in FIG. 10 may be the vehicle 101 shown in FIG. 1, and the terminal apparatus 1002 shown in FIG. 10 may be the ambulance 102 shown in FIG. 1. After being in danger, the vehicle 101 may send first information M4 to the vehicle management platform. When the ambulance 102 arrives, the ambulance 102 may request authorization from the vehicle management platform. The ambulance 102 may send unlocking request information to the vehicle 101 based on authorization information, to indicate the first vehicle to release a locked state, for example, open a vehicle door lock, so that a passenger in the vehicle 101 is rescued.

Another possible scenario is considered. Refer to FIG. 2. The first vehicle 1001 shown in FIG. 10 may be the vehicle 201 shown in FIG. 2, and the terminal apparatus 1002 shown in FIG. 10 may be the intelligent terminal 203 (or the express vehicle 204) of the courier shown in FIG. 1. After an express package arrives, a vehicle owner may remotely indicate the vehicle 201 to send first information M4 to the vehicle management platform. The intelligent terminal 203 (or the express vehicle 204) of the courier may request authorization from the vehicle management platform. The intelligent terminal 203 (or the express vehicle 204) of the courier may send unlocking request information to the vehicle 201 based on authorization information, to indicate the vehicle 201 to release a locked state, for example, open a vehicle door lock, so that the courier may put the express package or another item into the vehicle. Because the intelligent terminal 203 (or the express vehicle 204) may be synchronized to the vehicle management platform by using a logistics network or the like, the vehicle management platform may determine an identity of the terminal apparatus or an identity of a user of the terminal apparatus. This prevents a criminal from impersonating the courier and reduces a risk of a property loss.

Optionally, in the scenario shown in FIG. 10, the first vehicle 1001 may send second information M5 to the terminal apparatus 1002, where the second information M5 indicates that the first vehicle 1001 is in a first state. Correspondingly, the terminal apparatus 1002 requests authorization from the vehicle management platform 1003 in response to the second information M5.

Alternatively, optionally, the terminal apparatus 1002 may send third information M6 to the first vehicle, where the third information M6 is used to request to release the locked state of the first vehicle 1001, for example, request to open the vehicle lock of the first vehicle. In response to the third information M6, the first vehicle 1001 sends first information M4 to the vehicle management platform 1003, to indicate that the first vehicle 1001 is in the first state. The terminal apparatus 1002 may request authorization from the vehicle management platform 1003, and then send unlocking request information to the first vehicle 1001 based on authorization information, to indicate the first vehicle to release the locked state.

Figure 11:
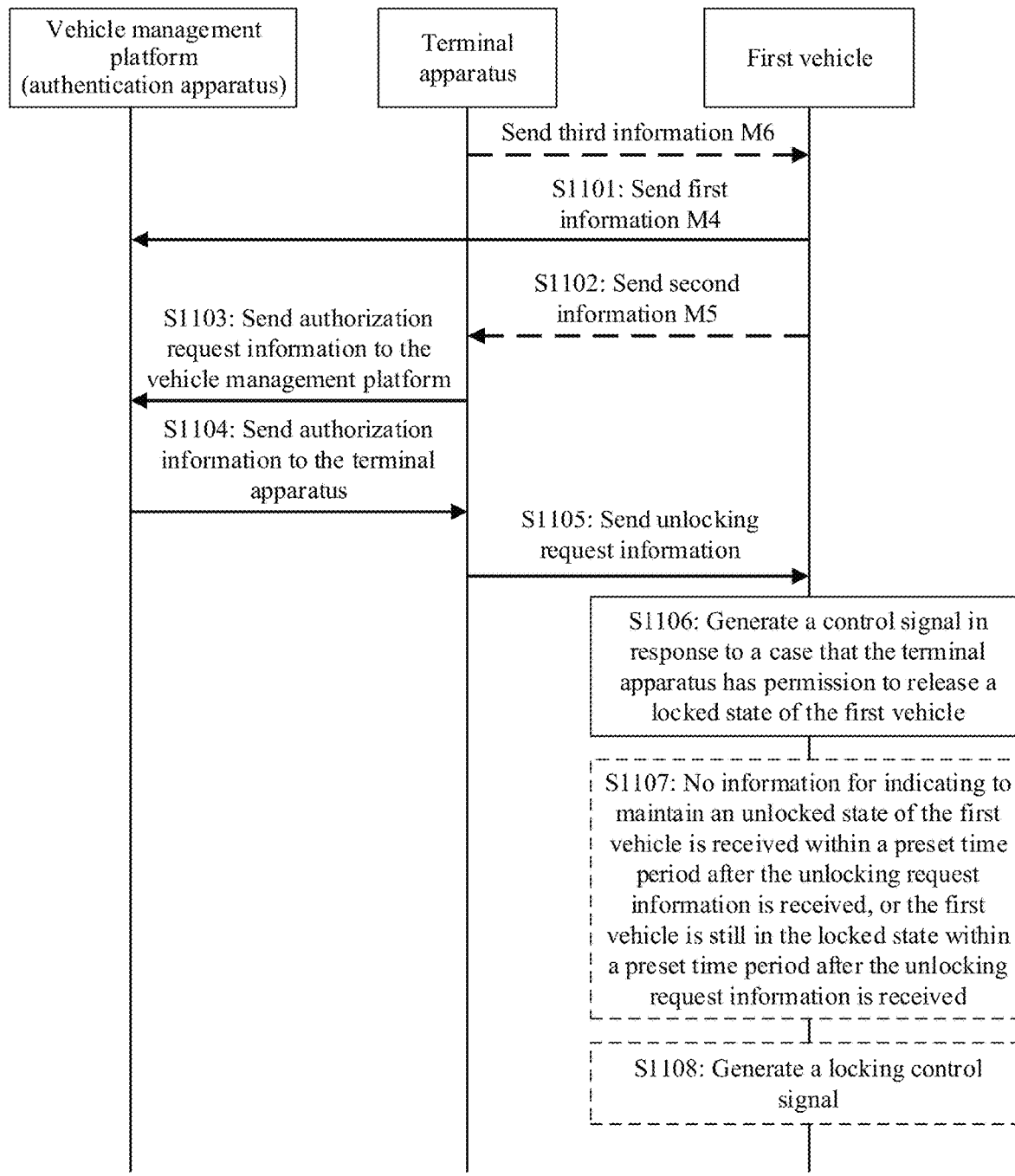
FIG. 11 is a schematic flowchart of another vehicle control method according to an embodiment of this application.

FIG. 11 is a schematic flowchart of a vehicle control method according to an embodiment of this application. Optionally, the method may be applied to the vehicle control system in FIG. 4. It should be understood that for some detailed steps and information content in FIG. 10, refer to related descriptions in the embodiment shown in FIG. 7 or FIG. 9.

The vehicle control method shown in FIG. 11 may include at least step S1101 to step S1106. Details are as follows.

Optionally, the embodiment shown in FIG. 11 includes step S1101 and/or step S1102. Details are as follows.

Step S1101: A first vehicle sends first information M4 to a vehicle management platform. Correspondingly, the vehicle management platform may receive the first information M4 sent by the first vehicle.

The first information M4 is used to authorize the vehicle management platform, or indicates that the first vehicle is in a first state. Meanings of the first information M4 and the first state are the same as meanings of the first information and the first state in the foregoing embodiments.

Optionally, the first information M4 may include one or more of first vehicle identity indication information, time information (which is referred to as time information T5 for ease of differentiation), vehicle lock indication information, location information (for example, coordinates) of the first vehicle, a quantity of passengers in the first vehicle, vehicle model information of the first vehicle, voice information within a period of time, an E-call trigger reason, vehicle condition information, and the like. For specific descriptions, refer to the foregoing descriptions. For example, for the time information T5, refer to the descriptions of the time information T3 in the foregoing embodiment.

It should be understood that step S1101 is an optional step. In other words, the first vehicle may not send the first information M4 to the vehicle management platform. For example, after the first vehicle is in danger, a rescue vehicle (which is considered as a terminal apparatus) may request authorization from the vehicle management platform, and the first vehicle does not need to send the first information M4 to the vehicle management platform.

Step S1102: The first vehicle sends second information M5 to a terminal apparatus. Correspondingly, the terminal apparatus may receive the second information M5 from the first vehicle.

The second information M5 may indicate the first vehicle to authorize the vehicle management platform, or indicate the vehicle management platform, or the second information M5 indicates that the first vehicle is in the first state.

In an example, the second information M5 indicates the first vehicle to authorize the vehicle management platform. For example, the first vehicle authorizes the vehicle management platform. In this case, the first vehicle may indicate, to the terminal apparatus, that the first vehicle has authorized the vehicle management platform, so that the terminal apparatus may request authorization from the indicated vehicle management platform. The vehicle management platform serves as an intermediary to manage vehicle permission, so that the first vehicle can be controlled more conveniently and safely.

In another example, the second information M5 indicates the vehicle management platform. Compared with that in the previous example, the second information M5 does not indicate that the vehicle management platform has been authorized by the first vehicle, and provides only a receiver of authorization request information for the terminal apparatus. In this example and the foregoing example, the second information M5 provides information about the receiver of the authorization request information for the terminal apparatus, and this may be used as a prerequisite of the subsequent step 1103, or may be used as a trigger condition of the subsequent step 1103.

In another example, the second information M5 indicates that the first vehicle is currently in the first state, that is, the first vehicle is currently in the locked state or a state in which the first vehicle can be unlocked by an authorized apparatus. In this example, the second information M5 indicates that the first vehicle is currently in the first state, to trigger the terminal apparatus to perform the subsequent step 1103.

Optionally, the second information M5 may further include one or more of first vehicle identity indication information, time information, vehicle lock indication information, location information (for example, coordinates) of the first vehicle, a quantity of passengers in the first vehicle, vehicle model information of the first vehicle, voice information within a period of time, an E-call trigger reason, vehicle condition information, and the like. For specific descriptions, refer to the foregoing embodiments.

It should be understood that step S1102 is an optional step, that is, the first vehicle may not send the second information M5 to the terminal apparatus. For example, after the first vehicle is in danger, the rescue vehicle (which is considered as the terminal apparatus) may request authorization from the vehicle management platform, and the first vehicle does not need to send the second information M5 to the terminal apparatus.

Step S1103: The terminal apparatus sends authorization request information to the vehicle management platform. Correspondingly, the vehicle management platform receives the authorization request information from the terminal apparatus.

The authorization request information is used to request the vehicle management platform to grant permission to control the first vehicle, for example, request to grant permission to release the locked state of the vehicle.

Optionally, the authorization request information may include one or more of identification information of the terminal apparatus, information about a user that uses the first terminal, security information, verification information, and the like, and is used by the vehicle management platform to determine an identity of the terminal apparatus, to facilitate secure communication.

Optionally, the authorization request information may include the first vehicle identity indication information. Correspondingly, the vehicle management platform parses the authorization information, and may grant the terminal apparatus permission to control the first vehicle. For the first vehicle identity indication information, refer to the related descriptions in step S701.

Step S1104: The vehicle management platform sends authorization information to the terminal apparatus.

Specifically, the authorization information may include verification information. The verification information may indicate that the terminal apparatus has permission to control the vehicle, for example, may specifically indicate that the first terminal has permission to release the locked state. The permission is granted by the vehicle management platform. Optionally, the verification information may include one or more of an authorization letter, a permission code, a verification code, a security parameter, and the like that are related to the permission.

Optionally, the authorization information may further include time information used to indicate a time period of the permission. The time information may be duration, a moment, counter information, a validity period, or the like.

Optionally, the authorization information may include the first vehicle identity indication information, to indicate that the permission is used for the first vehicle.

Step S1105: The terminal apparatus sends unlocking request information to the first vehicle. Correspondingly, the first vehicle receives the unlocking request information from the terminal apparatus.

The unlocking request information is used to request to release the locked state of the first vehicle. The unlocking request information may include the foregoing authorization information, or include some information in the authorization information.

Optionally, the unlocking request information may further include time information (which is referred to as time information T4 for ease of differentiation), and the time information T4 indicates a time period for which the vehicle door lock is to maintain an unlocked state. The time information may be duration, a moment, counter information, a validity period, or the like.

Optionally, the unlocking request information may include vehicle lock indication information. For a meaning of the vehicle lock indication information, refer to the foregoing descriptions.

Optionally, the unlocking request information may be sent a plurality of times at different time points. Further, the unlocking request information is periodically repeated information. For example, the unlocking request information is included in periodically repeated information. For a periodicity of the unlocking request information, refer to the descriptions in step S703.

Step S1106: The first vehicle generates a control signal in response to a case that the terminal apparatus has permission to release the locked state of the first vehicle.

The control signal may be used to release the locked state of the first vehicle.

Specifically, the first vehicle may determine, based on the authorization information (or the verification information in the authorization information), whether the terminal apparatus is granted permission to control opening of the vehicle door lock. If the authorization information indicates that the terminal apparatus has the permission to control opening of the vehicle door lock, the first vehicle generates the control signal.

Further, the control signal may be output to one or more vehicle locks, to correspondingly release locked states of the vehicle locks. For details, refer to step 704.

Step S1107: The first vehicle does not receive, within a preset time period (which is referred to as a preset time period P1 for ease of differentiation) after the unlocking indication information is received, information (which is referred to as information M0 for ease of differentiation) for indicating to maintain the unlocked state of the first vehicle, or the first vehicle is still in the locked state within a preset time period (which is referred to as a preset time period P2 for ease of differentiation) after the unlocking request information is received.

For a related example, refer to the descriptions of Example 1 and Example 2 in step S704.

Optionally, at least one of the preset time period P1 and the preset time period P2 may be predefined or preconfigured, or may be obtained based on a user input, or may be obtained through calculation based on a safety status and a vehicle status.

Optionally, content of the information M0 may be the same as that of the unlocking request information. Because the unlocking request information may be periodically sent information (for example, included in a periodically repeated message), the unlocking request information and the information M0 may be information with same content but different sending time points.

Step S1108: The first vehicle generates a locking control signal, where the locking control signal is used to control the first vehicle to be in the locked state.

For example, the unlocking request information indicates to open the vehicle door lock of the first vehicle. If the first vehicle is not opened by a user within the preset time period P2 after the vehicle door lock is opened, the locking control signal is generated. This reduces a possibility of a property loss and reduces a safety risk.

Optionally, before the first vehicle sends the first information M4 or sends the second information M5, the first vehicle may receive third information M6 from the terminal apparatus. In response to the third information M6, the first vehicle may send the first information M4 and/or the second information M5.

In the embodiment shown in FIG. 11, the vehicle management platform may assign vehicle control permission to the terminal apparatus, and the terminal apparatus may control opening of the vehicle door lock based on the permission, to conveniently and safely control the vehicle door lock.

In another possible design, a terminal apparatus may request to release a locked state of a first vehicle. The first vehicle may verify the terminal apparatus, and if the terminal apparatus has permission to open a vehicle door lock, the first vehicle may release the locked state.

Figure 12:
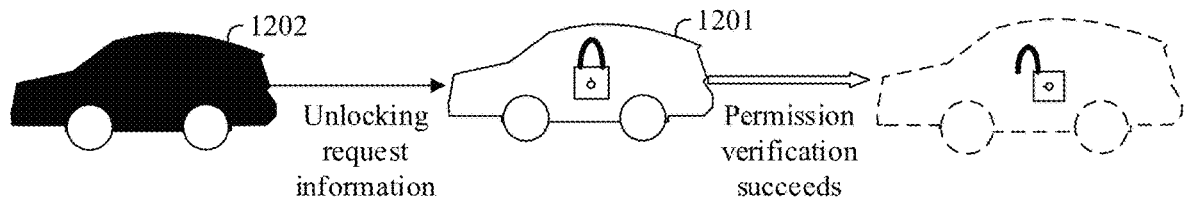
FIG. 12 is a schematic diagram of running of another vehicle control system according to an embodiment of this application.

For example, FIG. 12 is a schematic diagram of running of a vehicle control method according to an embodiment of this application. The method may be applied to the vehicle control system 50 shown in FIG. 5. A terminal apparatus 1202 may send request information to a first vehicle 1201, where the request information is used to request to release a locked state of the first vehicle, for example, open a vehicle door lock. If the first vehicle 1201 determines that the terminal apparatus 1202 has permission to release the locked state, the first vehicle 1201 releases the locked state, for example, opens the vehicle door lock.

A possible case is considered. The terminal apparatus 1202 may be a special vehicle (including but not limited to a police car, a tractor, a logistics vehicle, or the like) or a rescue vehicle (including but not limited to an ambulance, a fire engine, a recovery vehicle, or the like). Alternatively, the terminal apparatus 1202 may be a preset or predefined trusted vehicle, for example, a trusted vehicle pre-added by the owner of the first vehicle 1201, or a vehicle of a relative of the owner of the first vehicle 1201. Because the first vehicle 1201 verifies that the terminal apparatus 1202 has permission to open the vehicle door lock, the vehicle door lock can be opened conveniently and safely.

For example, in a case of a danger, a rescue vehicle rescues a person in the first vehicle 1201 in a timely manner. Alternatively, the relative may place an item in the vehicle or take an item from the vehicle by using a relative vehicle when the owner is not nearby. Alternatively, when the vehicle owner is not nearby, a courier may place an express package in the vehicle or pick up, from the vehicle, an item that needs to be sent.

Figure 13:
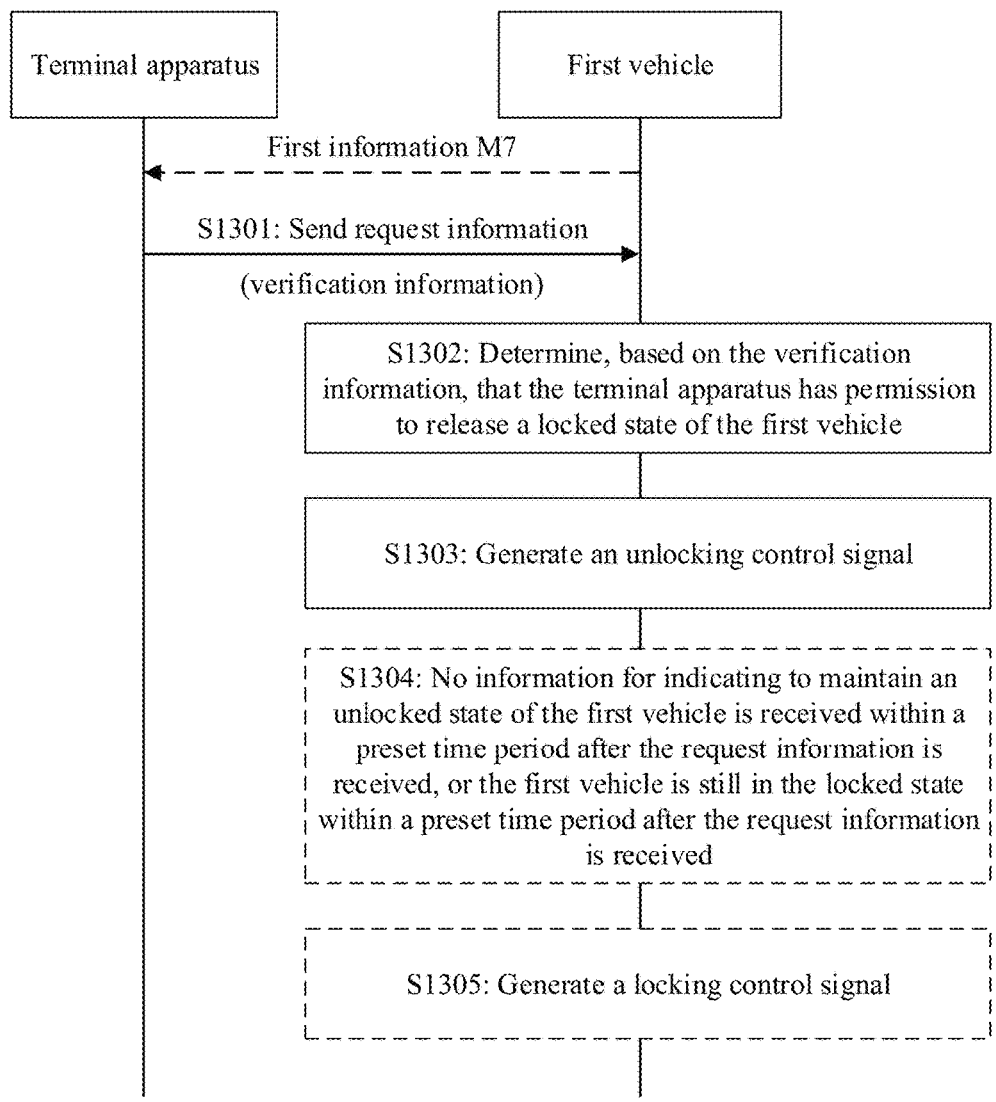
FIG. 13 is a schematic flowchart of another vehicle control method according to an embodiment of this application.

FIG. 13 is a schematic flowchart of a vehicle control method according to an embodiment of this application. Optionally, the method may be applied to the vehicle control system in FIG. 5.

The vehicle control method shown in FIG. 13 may include at least step S1301 to step S1305. Details are as follows.

Step S1301: A terminal apparatus sends request information to a first vehicle. Correspondingly, the first vehicle receives the request information from the terminal apparatus.

Specifically, the request information is used to request to release a locked state of the first vehicle. For example, the request information includes a field, and the field may have a plurality of values. When the field has a first value, it indicates that the locked state is requested to be released. For another example, the request information is predefined, preconfigured, or protocol-specified information. After receiving the request information, a receiver (for example, the first vehicle) may release the locked state when determining that the terminal has been authorized.

Optionally, the request information includes verification information used to verify whether the terminal apparatus has permission to release the locked state of the first vehicle.

Optionally, the verification information may include one or more of identification information of the terminal apparatus, identification information of a user that uses the terminal apparatus, type information of the terminal apparatus, an authorization letter, a permission code, a verification code, and a security parameter. For the identification information of the terminal apparatus, refer to the foregoing embodiment.

Further, optionally, if the terminal apparatus is a second vehicle, an identifier of the terminal apparatus may be one or more of a VIN, a license plate number, a vehicle ID, or the like of the second vehicle. Optionally, the foregoing vehicle used as the terminal apparatus may be a special vehicle (including but not limited to a police car, a tractor, a logistics vehicle, or the like) or a rescue vehicle (including but not limited to an ambulance, a fire engine, a recovery vehicle, or the like). Alternatively, the vehicle used as the terminal apparatus may be a preset or predefined trusted vehicle, for example, a trusted vehicle pre-added by the owner of the first vehicle, or a vehicle of a relative of the owner of the first vehicle. Alternatively, the foregoing terminal apparatus may alternatively be a special terminal apparatus, for example, an intelligent terminal like a mobile policing terminal or an express terminal.

Optionally, the request information may further include time information (which is referred to as time information T6 for ease of differentiation), vehicle lock indication information, or the like. The time information indicates a time period for which the first vehicle is to maintain an unlocked state. The vehicle lock indication information indicates a vehicle lock to be unlocked. For example, the vehicle lock indication information may indicate at least one of a driver-side door lock, a front-passenger-side door lock, a rear seat door lock, a rear trunk lock, a front trunk lock, a sunroof lock, and the like that are of the first vehicle. For details, refer to the foregoing descriptions. For example, for the time information T6, refer to the related descriptions of the time information T2 in the foregoing embodiment.

Optionally, the request information may be sent a plurality of times at different time points. For example, the request information may be periodically or aperiodically repeated information. For details, refer to the foregoing embodiment.

The request information may be sent in a unicast, multicast, or broadcast manner. For details, refer to the foregoing descriptions about unicast, multicast, and broadcast.

Step S1302: The first vehicle determines, based on the verification information, that the terminal apparatus has permission to release the locked state of the first vehicle.

For example, that the first vehicle obtains authorization information may be used as a prerequisite for performing step S1302. The authorization information is used for comparison with the verification information received from the terminal apparatus, to determine whether the terminal apparatus has permission to release the locked state of the first vehicle. The authorization information may be, for example, one or more of the identification information of the terminal apparatus, the identification information of the user that uses the terminal apparatus, type information of the terminal apparatus, type information of the user that uses the terminal apparatus, an authorization letter, a permission code, a verification code, and a security parameter. The following enumerates three specific possible implementations.

Implementation 1: The verification information includes the identification information of the terminal apparatus and the authorization information also includes the identification information of the terminal apparatus, or the verification information includes the identification information of the user that uses the terminal apparatus and the authorization information also includes the identification information of the user that uses the terminal apparatus. If the identification information of the terminal apparatus included in the verification information indicates an authorized terminal, the terminal apparatus has permission to release the locked state of the first vehicle. Alternatively, if the identification information that is of the user that uses the terminal apparatus and that is included in the verification information indicates an authorized user, the terminal apparatus has permission to release the locked state of the first vehicle. That is, if a user indicated by the verification information is a user indicated by the authorization information, or an apparatus indicated by the verification information is an apparatus indicated by the authorization information, or there is a correspondence between an apparatus indicated by the verification information and an apparatus indicated by the authorization information, or there is a correspondence between a user indicated by the verification information and a user indicated by the authorization information, it may be determined that the apparatus is an authorized apparatus or whether the user is an authorized user.

Implementation 2: The verification information includes the type information of the terminal apparatus and the authorization information also includes the type information of the terminal apparatus, or the verification information includes the type information of the user that uses the terminal apparatus and the authorization information also includes the type information of the user that uses the terminal apparatus. The first vehicle may obtain the authorization information, where the authorization information includes type information of one or more terminal apparatuses that have permission to release the locked state of the first vehicle. The first vehicle may determine, on the basis that an apparatus type indicated by the verification information is an apparatus type indicated by the authorization information, that the terminal apparatus is an authorized terminal apparatus. Alternatively, the first vehicle may obtain the authorization information, where the authorization information includes type information of one or more users who have permission to release the locked state of the first vehicle. The first vehicle may determine, on the basis that a user type indicated by the verification information is a user type indicated by the authorization information, that the terminal apparatus is an authorized terminal apparatus.

Implementation 3: The authorization information includes authorization verification information such as the authorization code or the authorization letter. When the verification information belongs to the authorization verification information, the first vehicle may determine that the second vehicle has permission to release the locked state of the first vehicle.

Optionally, the foregoing authorization information, for example, the authorization information in Implementation 1 or Implementation 2, may be set in the first vehicle in at least one of the following manners.

Manner 1: The authorization information is pre-configured in the first vehicle, for example, pre-configured before delivery of the first vehicle, or configured when the first vehicle is upgraded and maintained in a 4S shop.

Manner 2: The authorization information may be upgraded to the first vehicle by using an over-the-air (OTA) technology. Because efficiency of updating by using the OTA is higher, the authorization information can be quickly updated. This avoids or reduces a problem that a vehicle door lock cannot be opened in a timely manner because data is not updated in a timely manner, and improves user experience.

Manner 3: The authorization information may be entered by a user into the first vehicle. For example, the vehicle owner may enter an identity of a trusted relative or friend, or a vehicle identifier into the vehicle, so that a trusted user or terminal can open the vehicle door lock.

Manner 4: The authorization information may be obtained by the first vehicle by requesting a network side device (for example, a server or a cloud).

For example, Table 1 is a schematic diagram of possible authorization information according to an embodiment of this application. The authorization information may include one or more of an identifier (for example, an authorized vehicle identifier) of an authorized terminal apparatus, a permission name, a permission validity period, a permission source, and the like. For example, if the verification information is an identifier "B001" of the second vehicle, it may be determined, by comparing the verification information with the authorization information, that the second vehicle has permission to release the locked state, and the locked state of the first vehicle may be released.

TABLE 1

| Authorization information | | | | |
|---|---|---|---|---|
| Identifier of the first vehicle | Authorized vehicle identifier | Permission name | Permission validity period | Permission source |
| A10001 | B001 | Release a locked state | Jan. 1, 2022 | Factory setting |
| A10001 | B002 | Release a locked state | Jan. 1, 2022 | OTA upgrade |
| A10001 | B002 | Release a locked state | Permanent | User input |
| A10001 | . . . | . . . | . . . | . . . |

Step S1303: The first vehicle generates a control signal.

Specifically, the control signal may be used to release the locked state of the first vehicle. Further, the control signal may be output to one or more vehicle locks, to correspondingly release locked states of the vehicle locks.

For details, refer to the descriptions in step S704.

Step S1304: The first vehicle does not receive, within a preset time period after the request information is received, information for indicating to maintain an unlocked state of the first vehicle, or the first vehicle is still in the locked state within a preset time period after the request information is received.

For details, refer to related descriptions in step S1106.

Step S1305: The first vehicle generates a locking control signal.

For details, refer to related descriptions in step S1107.

Optionally, the first vehicle may send first information M7 to the terminal apparatus, and the first information M7 may indicate that the first vehicle is in the first state. For details, refer to the foregoing descriptions of the first state.

In the embodiment shown in FIG. 13, the terminal apparatus has permission to control the vehicle door lock of the first vehicle, and may send the request information to the first vehicle, to request to release the locked state of the first vehicle. The first vehicle may release the locked state after verifying the permission of the terminal apparatus, to conveniently and safely control the vehicle door lock.

In a possible design, the first vehicle may include an image sensor. The image sensor may be a surround vision system of the vehicle, a camera, a lens, a fusion detection apparatus, or another apparatus that can obtain an image (or a video). The image sensor may be used by the first vehicle to obtain a first image or a first video.

For example, after receiving the request information, the vehicle may obtain an image or a video around the first vehicle by using the image sensor (if the image sensor is not turned on, the image sensor may be first turned on). The image or the video may be stored in the first vehicle, or may be uploaded to a cloud or sent to another device, to record a situation around the vehicle.

Further, the first vehicle may recognize a target object by using the first image or the first video, to verify whether an identity of the target object is trusted. Optionally, if it is determined that the identity of the target object is trusted, the first vehicle may release the locked state. The following enumerates two possible examples.

Example 1: When the first vehicle is in a help-seeking state, if the unlocking request information is received, the first vehicle may obtain an image around the vehicle by using a surround vision system. If the image includes the second vehicle, after the first vehicle determines that an identity of the second vehicle is trusted (for example, recognizes that the second vehicle is a special vehicle or a rescue vehicle), the first vehicle may release the locked state, for example, open the vehicle door lock.

Example 2: If the first vehicle receives the request information, the first vehicle may obtain an image around the vehicle by using a surround vision system. If the image includes a target person, after the first vehicle may determine that an identity of the target person is trusted (for example, the target person is a person with a special occupation, for example, a policeman, a doctor, or a firefighter, or the target person is a trusted person preset in the first vehicle, for example, a relative or a friend of a vehicle owner), the first vehicle may release the locked state, for example, open the vehicle door lock.

Certainly, the target object may alternatively be another object that can be used for identity authentication, for example, an identity authentication code. Details are not described herein.

The foregoing design may be applied to one or more of the foregoing embodiments, for example, applied to the embodiment shown in FIG. 7, FIG. 9, FIG. 11, or FIG. 13. The foregoing describes in detail the method in embodiments of this application. The following provides an apparatus in embodiments of this application.

Figure 14:
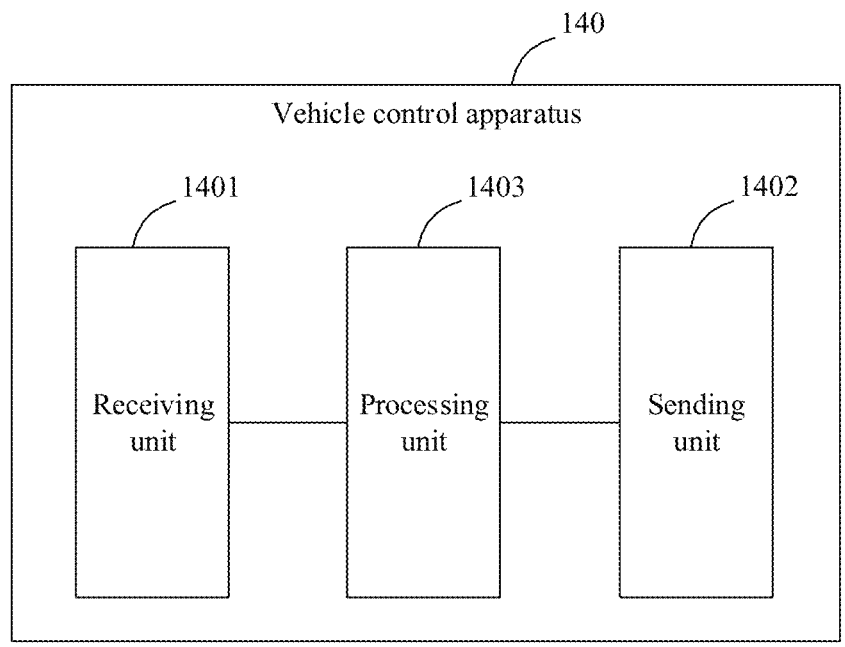
FIG. 14 is a schematic diagram of a structure of a vehicle control apparatus according to an embodiment of this application.

FIG. 14 is a schematic diagram of a structure of a vehicle control apparatus 140 according to an embodiment of this application. The vehicle control apparatus 140 may be an independent device, or may be a component in the independent device, for example, a chip or an integrated circuit. The vehicle control apparatus 140 includes units configured to implement the embodiment shown in FIG. 7, FIG. 9, FIG. 11, or FIG. 13.

In a possible implementation, the vehicle control apparatus 140 may include a receiving unit 1401 and a sending unit 1402. Optionally, the apparatus may further include a processing unit 1403.

In a possible design, the vehicle control apparatus 140 may be the road side apparatus in the embodiment shown in FIG. 7 or FIG. 9, or a component (for example, a chip, a software module, or a hardware module) in the road side apparatus.

In a possible implementation, the receiving unit 1401 is configured to receive first information from a first vehicle, where the first information is used to perform authorization or indicates that the first vehicle is in a first state, and the first vehicle that performs authorization is in a locked state, or a vehicle in the first state is in a locked state, or an authorized apparatus is capable of releasing a vehicle in the first state from a locked state.

The receiving unit 1401 is further configured to receive second information from a terminal apparatus, where the second information is used to request to release the locked state of the first vehicle, and the second information includes verification information.

The sending unit 1402 is configured to send unlocking indication information to the first vehicle based on the verification information, where the unlocking indication information indicates to release the locked state of the first vehicle.

It should be noted that, for implementation of each unit, refer to corresponding descriptions in the embodiment shown in FIG. 7 or FIG. 9.

It should be understood that, in apparatus embodiments of this application, division into a plurality of units or modules is merely logical division based on functions, and is not intended to limit a specific structure of the apparatus. In specific implementation, some function modules may be subdivided into more small function modules, or some function modules may be combined into one function module. However, regardless of whether these function modules are subdivided or combined, procedures performed by the apparatus in a vehicle door lock control process are roughly the same. Usually, each unit corresponds to respective program code (or program instructions). When the program code corresponding to the unit is run on a processor, the unit is controlled by the processor to perform a corresponding procedure to implement a corresponding function.

In a possible design, the vehicle control apparatus 140 may be the first vehicle in the embodiment shown in FIG. 7 or FIG. 9, or a component (for example, a chip, a software module, or a hardware module) in the first vehicle.

In a possible implementation, the sending unit 1402 is configured to send first information, where the first information is used to perform authorization or indicates that a first vehicle is in a first state, and the first vehicle that performs authorization is in a locked state, or a vehicle in the first state is in a locked state, or an authorized apparatus is capable of releasing a vehicle in the first state from a locked state.

The receiving unit 1401 is configured to receive unlocking indication information from an authentication apparatus, where the unlocking indication information indicates to release the locked state of the first vehicle.

The processing unit 1403 is configured to generate a control signal based on the unlocking indication information, where the control signal is used to release the locked state of the first vehicle.

It should be noted that, for implementation of each unit, refer to corresponding descriptions in the embodiment shown in FIG. 7 or FIG. 9.

In a possible design, the vehicle control apparatus 140 may be the first vehicle in the embodiment shown in FIG. 11, or a component (for example, a chip, a software module, or a hardware module) in the first vehicle.

In a possible implementation, the sending unit 1402 is configured to send first information to an authentication apparatus, where the first information is used to perform authorization or indicates that the first vehicle is in a first state, and the first vehicle that performs authorization is in a locked state, or a vehicle in the first state is in a locked state, or an authorized apparatus is capable of releasing a vehicle in the first state from a locked state.

The receiving unit 1401 is configured to receive unlocking request information from a terminal apparatus, where the unlocking request information includes verification information. The processing unit 1403 is configured to generate a control signal based on the verification information, where the control signal is used to release the locked state of the first vehicle.

It should be noted that, for implementation of each unit, refer to corresponding descriptions in the embodiment shown in FIG. 11.

In a possible design, the vehicle control apparatus 140 may be the terminal apparatus in the embodiment shown in FIG. 11, or a component (for example, a chip, a software module, or a hardware module) in the terminal apparatus.

In a possible implementation, the sending unit 1402 is configured to send authorization request information to an authentication apparatus, where the authorization request information is used to request to grant permission to release a locked state of a first vehicle.

The receiving unit 1401 is configured to receive authorization information from the authentication apparatus, where the authorization information includes verification information, and the verification information indicates that the terminal apparatus is granted the permission to release the locked state of the first vehicle.

The sending unit 1402 is further configured to send unlocking request information to the first vehicle, where the unlocking request information includes the verification information, and the unlocking request information is used to request to release the locked state of the first vehicle.

It should be noted that, for implementation of each unit, refer to corresponding descriptions in the embodiment shown in FIG. 11.

In a possible design, the vehicle control apparatus 140 may be the vehicle management platform in the embodiment shown in FIG. 11, or a component (for example, a chip, a software module, or a hardware module) in the vehicle management platform.

In a possible implementation, the receiving unit 1401 is configured to receive first information from a first vehicle, where the first information is used to perform authorization or indicates that the first vehicle is in a first state, and the first vehicle that performs authorization is in a locked state, or a vehicle in the first state is in a locked state, or an authorized apparatus is capable of releasing a vehicle in the first state from a locked state.

The receiving unit 1401 is further configured to receive authorization request information from a terminal apparatus, where the authorization request information is used to request to grant permission to release the locked state of the first vehicle.

The sending unit 1402 is configured to send authorization information to the terminal apparatus, where the authorization information includes verification information, and the verification information indicates that the terminal apparatus is granted the permission to release the locked state of the first vehicle.

It should be noted that, for implementation of each unit, refer to corresponding descriptions in the embodiment shown in FIG. 11.

Figure 15:
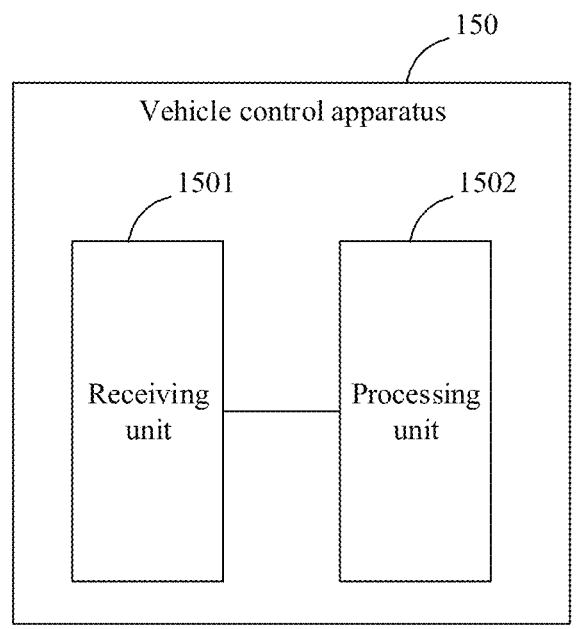
FIG. 15 is a schematic diagram of a structure of another vehicle control apparatus according to an embodiment of this application.

FIG. 15 is a schematic diagram of a structure of a vehicle control apparatus 150 according to an embodiment of this application. The vehicle control apparatus 150 may be an independent device, or may be a component (for example, a chip, a software module, or a hardware module) in the independent device. The vehicle control apparatus 150 includes units configured to implement the embodiment shown in FIG. 13.

In a possible implementation, the vehicle control apparatus 150 may include a receiving unit 1501 and a processing unit 1502. Optionally, the vehicle control apparatus 150 may further include a sending unit (not shown in FIG. 15). In a possible design, the vehicle control apparatus 150 may be the first vehicle in the embodiment shown in FIG. 13, or a component (for example, a chip, a software module, or a hardware module) in the first vehicle.

In a possible implementation, the receiving unit 1501 is configured to receive request information from a second vehicle, where the request information is used to request to release a locked state of the first vehicle, the request information includes verification information, and the verification information is used to verify whether the second vehicle has permission to release the locked state of the first vehicle.

The processing unit 1502 is configured to determine, based on the verification information, that the second vehicle has the permission to release the locked state of the first vehicle.

The processing unit 1502 is further configured to generate a control signal, where the control signal is used to release the locked state of the first vehicle.

It should be noted that, for implementation of each unit, refer to corresponding descriptions in the embodiment shown in FIG. 13.

Figure 16:
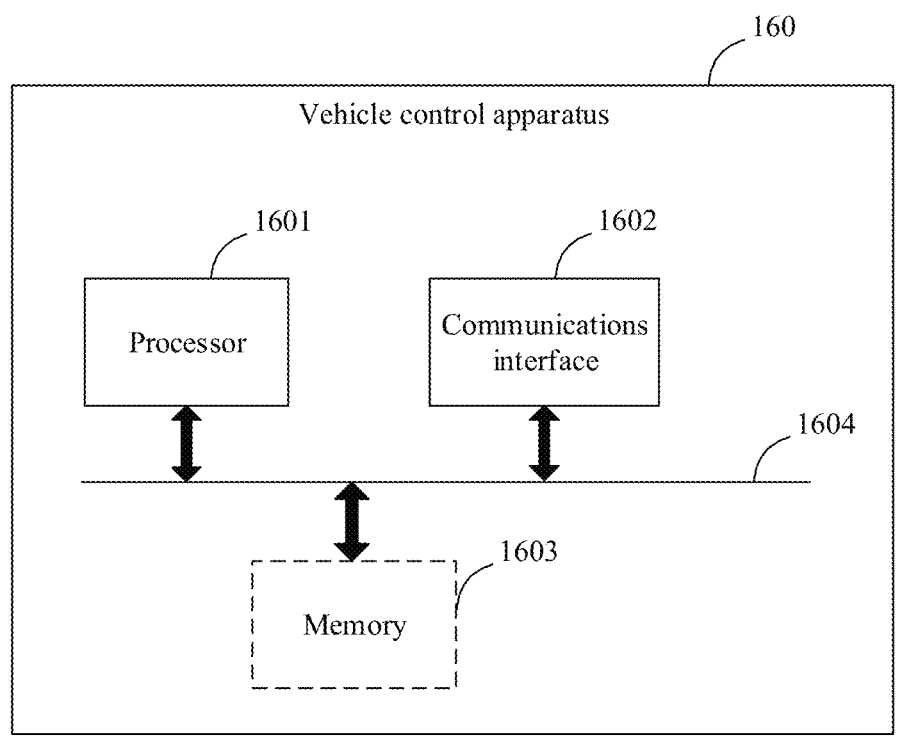
FIG. 16 is a schematic diagram of a structure of another vehicle control apparatus according to an embodiment of this application.

FIG. 16 is a schematic diagram of a structure of a vehicle control apparatus 160 according to an embodiment of this application. The vehicle control apparatus 160 may be an independent device (for example, one or more of a server, a node, a terminal, or a vehicle), or may be a component (for example, a chip, a software module, or a hardware module) in the independent device. The vehicle control apparatus 160 may include at least one processor 1601 and a communications interface 1602. Further, optionally, the vehicle control apparatus 160 may include at least one memory 1603. Further, optionally, a bus 1604 may be further included. The processor 1601, the communications interface 1602, and the memory 1603 are connected by using the bus 1604.

The processor 1601 is a module that performs an arithmetic operation and/or a logic operation, and may be specifically one or a combination of a plurality of processing modules such as a central processing unit (CPU), a graphics processing unit (GPU), a microprocessor unit (MPU), an application-specific integrated circuit (ASIC), a field programmable gate array (FPGA), a complex programmable logic device (CPLD), a coprocessor (assisting the central processing unit in completing corresponding processing and application), and a microcontroller unit (MCU).

The communications interface 1602 may be configured to provide information input or output for the at least one processor. In addition/Alternatively, the communications interface 1602 may be configured to receive data sent by the outside and/or send data to the outside, and may be a wired link interface including an Ethernet cable or the like, or may be a wireless link (Wi-Fi, Bluetooth, universal wireless transmission, an in-vehicle short-range communications technology, and another short-range wireless communications technology) interface. Optionally, the communications interface 1602 may further include a transmitter (for example, a radio frequency transmitter or an antenna), a receiver, or the like coupled to the interface.

For example, the communications interface 1602 may further include an antenna. An electromagnetic wave is received by using the antenna. The communications interface 1602 may further perform frequency modulation and filtering processing on an electromagnetic wave signal, and send a processed signal to the processor 1601. For another example, the communications interface 1602 may further receive a to-be-sent signal from the processor 1601, perform frequency modulation and amplification on the signal, and convert the signal into an electromagnetic wave for radiation through the antenna.

The memory 1603 is configured to provide storage space, and the storage space may store data such as an operating system and a computer program. The memory 1603 may be one or a combination of a random access memory (RAM), a read-only memory (ROM), an erasable programmable read-only memory (EPROM), a compact disc read-only memory (CD-ROM), or the like.

The at least one processor 1601 in the vehicle control apparatus 160 is configured to invoke the computer program stored in the at least one memory 1603, to perform the foregoing vehicle door lock control method, for example, the vehicle door lock control method described in the embodiment shown in FIG. 7, FIG. 9, FIG. 11, or FIG. 13.

In a possible design, the vehicle control apparatus 160 may be the road side apparatus in the embodiment shown in FIG. 7 or FIG. 9, or a component (for example, a chip, a software module, or a hardware module) in the road side apparatus.

In a possible implementation, the processor 1601 in the vehicle control apparatus 160 is configured to invoke the computer program stored in the at least one memory 1603, to perform the following operations:

receiving first information from a first vehicle through the communications interface 1602, where the first information is used to perform authorization or indicates that the first vehicle is in a first state, and the first vehicle that performs authorization is in a locked state, or a vehicle in the first state is in a locked state, or an authorized apparatus is capable of releasing a vehicle in the first state from a locked state;

receiving second information from a terminal apparatus through the communications interface 1602, where the second information is used to request to release the locked state of the first vehicle, and the second information includes verification information; and sending unlocking indication information to the first vehicle through the communications interface 1602 based on the verification information, where the unlocking indication information indicates to release the locked state of the first vehicle.

It should be noted that, for detailed implementation, refer to corresponding descriptions in the embodiment shown in FIG. 7 or FIG. 9.

In another possible design, the vehicle control apparatus 160 may be the first vehicle in the embodiment shown in FIG. 7 or FIG. 9, or a component (for example, a chip, a software module, or a hardware module) in the first vehicle.

In a possible implementation, the processor 1601 in the vehicle control apparatus 160 is configured to invoke the computer program stored in the at least one memory 1603, to perform the following operations:

sending first information through the communications interface 1602, where the first information is used to perform authorization or indicates that the first vehicle is in a first state, and the first vehicle that performs authorization is in a locked state, or a vehicle in the first state is in a locked state, or an authorized apparatus is capable of releasing a vehicle in the first state from a locked state;

receiving unlocking indication information from an authentication apparatus through the communications interface 1602, where the unlocking indication information indicates to release the locked state of the first vehicle; and generating a control signal based on the unlocking indication information, where the control signal is used to release the locked state of the first vehicle.

It should be noted that, for detailed implementation, refer to corresponding descriptions in the embodiment shown in FIG. 7 or FIG. 9.

In another possible design, the vehicle control apparatus 160 may be the first vehicle in the embodiment shown in FIG. 11, or a component (for example, a chip, a software module, or a hardware module) in the first vehicle.

In a possible implementation, the processor 1601 in the vehicle control apparatus 160 is configured to invoke the computer program stored in the at least one memory 1603, to perform the following operations:

sending first information to an authentication apparatus through the communications interface 1602, where the first information is used to perform authorization or indicates that the first vehicle is in a first state, and the first vehicle that performs authorization is in a locked state, or a vehicle in the first state is in a locked state, or an authorized apparatus is capable of releasing a vehicle in the first state from a locked state;

receiving unlocking request information from a terminal apparatus through the communications interface 1602, where the unlocking request information includes verification information; and generating a control signal based on the verification information, where the control signal is used to release the locked state of the first vehicle.

It should be noted that, for detailed implementation, refer to corresponding descriptions in the embodiment shown in FIG. 11.

In another possible design, the vehicle control apparatus 160 may be the terminal apparatus in the embodiment shown in FIG. 11, or a component (for example, a chip, a software module, or a hardware module) in the terminal apparatus.

In a possible implementation, the processor 1601 in the vehicle control apparatus 160 is configured to invoke the computer program stored in the at least one memory 1603, to perform the following operations:

sending authorization request information to an authentication apparatus through the communications interface 1602, where the authorization request information is used to request to grant permission to release a locked state of a first vehicle;

receiving authorization information from the authentication apparatus through the communications interface 1602, where the authorization information includes verification information, and the verification information indicates that the terminal apparatus is granted the permission to release the locked state of the first vehicle; and sending unlocking request information to the first vehicle through the communications interface 1602, where the unlocking request information includes the verification information, and the unlocking request information is used to request to release the locked state of the first vehicle.

It should be noted that, for detailed implementation, refer to corresponding descriptions in the embodiment shown in FIG. 11.

In another possible design, the vehicle control apparatus 160 may be the terminal apparatus in the embodiment shown in FIG. 11, or a component (for example, a chip, a software module, or a hardware module) in the terminal apparatus.

In a possible implementation, the processor 1601 in the vehicle control apparatus 160 is configured to invoke the computer program stored in the at least one memory 1603, to perform the following operations:

receiving first information from a first vehicle through the communications interface 1602, where the first information is used to perform authorization or indicates that the first vehicle is in a first state, and the first vehicle that performs authorization is in a locked state, or a vehicle in the first state is in a locked state, or an authorized apparatus is capable of releasing a vehicle in the first state from a locked state;

receiving authorization request information from a terminal apparatus through the communications interface 1602, where the authorization request information is used to request to grant permission to release the locked state of the first vehicle; and sending authorization information to the terminal apparatus through the communications interface 1602, where the authorization information includes verification information, and the verification information indicates that the terminal apparatus is granted the permission to release the locked state of the first vehicle.

It should be noted that, for detailed implementation, refer to corresponding descriptions in the embodiment shown in FIG. 11.

In another possible design, the vehicle control apparatus 160 may be the first vehicle in the embodiment shown in FIG. 13, or a component (for example, a chip, a software module, or a hardware module) in the first vehicle.

In a possible implementation, the processor 1601 in the vehicle control apparatus 160 is configured to invoke the computer program stored in the at least one memory 1603, to perform the following operations:

receiving request information from a second vehicle through the communications interface 1602, where the request information is used to request to release a locked state of the first vehicle, the request information includes verification information, and the verification information is used to verify whether the second vehicle has permission to release the locked state of the first vehicle;

determining, based on the verification information, that the second vehicle has the permission to release the locked state of the first vehicle; and generating a control signal, where the control signal is used to release the locked state of the first vehicle.

It should be noted that, for implementation of each unit, refer to corresponding descriptions in the embodiment shown in FIG. 13.

An embodiment of this application further provides a chip system. The chip system includes a communications interface and at least one processor. The communications interface is configured to provide information input/output for the at least one processor, and/or the communications interface is configured to send or receive data. The processor is configured to invoke a computer program (or computer instructions), to implement the method in the embodiment shown in FIG. 7, FIG. 9, FIG. 11, or FIG. 13.

An embodiment of this application further provides a computer-readable storage medium. The computer-readable storage medium stores a computer program. When the computer program is run on one or more processors, the method in the embodiment shown in FIG. 7, FIG. 9, FIG. 11, or FIG. 13 is implemented.

An embodiment of this application further provides a computer program product. When the computer program product runs on one or more processors, the method in the embodiment shown in FIG. 7, FIG. 9, FIG. 11, or FIG. 13 is implemented.

It should be noted that, unless otherwise specified, terms such as "first" and "second" in embodiments of this application are used to distinguish between same items or similar items whose functions are basically the same. It should be understood that there is no logical or time sequence dependency between "first", "second", and "$n^{th}$", and neither of a quantity and an execution sequence is limited. It should also be understood that although the terms such as "first" and "second" are used in the following description to describe various elements, these elements should not be limited by the terms. These terms are merely used to distinguish one element from another element. For example, first information and second information are merely used to describe a plurality of pieces of information, but do not indicate differences in content, importance, and the like of the two types of information. Both the first information and the second information may be information, and in some cases may be separate and different indicators.

"One embodiment", "an embodiment", and "a possible implementation" mentioned in embodiments of this application mean that particular features, structures, or characteristics related to the embodiment or the implementation are included in at least one embodiment of this application. Therefore, "in one embodiment", "in an embodiment", or "in a possible implementation" appearing throughout this specification does not necessarily mean a same embodiment. In addition, these particular features, structures, or characteristics may be combined in one or more embodiments in any appropriate manner.

In embodiments of this application, words such as "example" or "for example" are for representing giving an example, an illustration, or a description. Any embodiment or design solution described by using "example" or "for example" in embodiments of this application shall not be construed as being more preferred or more advantageous than another embodiment or design solution. Exactly, use of the word such as "example" or "for example" is intended to present a related concept in a specific manner.

Terms such as "component", "module", and "system" used in embodiments of this application are used to indicate computer-related entities, hardware, firmware, combinations of hardware and software, software, or software being executed. For example, a component may be, but is not limited to, a process that is run on a processor, a processor, an object, an executable file, an execution thread, a program, and/or a computer. As shown in figures, both a computing device and an application that is run on the computing device may be components. One or more components may reside within a process and/or an execution thread, and the components may be located on one computer and/or distributed between two or more computers. In addition, these components may be executed from various computer-readable media that store various data structures. For example, the components may perform, by using a local process and/or a remote process, communication based on a signal having one or more data packets (for example, data from two components interacting with another component in a local system, a distributed system, and/or across a network like the Internet interacting with another system by using a signal).

In embodiments of this application, "at least one" means one or more, and "a plurality of" means two or more than two. The term "at least one of the following items (pieces)" or an expression similar to the term indicates any combination of the items, and includes a single item (piece) or any combination of a plurality of items (pieces). For example, at least one item (piece) of a, b, or c may represent a, b, c, (a and b), (a and c), (b and c), or (a, b, and c), where a, b, and c may be singular or plural.

In embodiments of this application, the term "and/or" describes an association relationship between associated objects and represents that three relationships may exist. For example, A and/or B may represent the following three cases: Only A exists, both A and B exist, and only B exists, where A and B may be singular or plural. The character "/" usually indicates an "or" relationship between the associated objects.

It should be further understood that the term "include" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or groups thereof not excluded.

What is claimed is:

1. A vehicle control apparatus applied to a first vehicle, comprising:
   at least one processor; and
   at least one memory, wherein the at least one memory stores program instructions, and the at least one processor is coupled to the at least one memory to execute the instructions to:
      send first information, wherein the first information is used to perform authorization or indicates that the first vehicle is in a first state, and wherein the first vehicle that performs authorization is in a locked state, a vehicle in the first state is in a locked state, or an authorized apparatus is capable of releasing a vehicle in the first state from a locked state;
      receive unlocking indication information from an authentication apparatus, wherein the unlocking indication information indicates to release the locked state of the first vehicle; and
      generate a control signal based on the unlocking indication information, wherein the control signal is used to release the locked state of the first vehicle.

2. The apparatus according to claim 1, wherein the at least one processor is coupled to the at least one memory to execute the instructions to:
   send first vehicle identity indication information to the authentication apparatus, wherein the first vehicle identity indication information indicates the first vehicle or a first user that uses the first vehicle.

3. The apparatus according to claim 1, wherein the unlocking indication information further comprises at least one of security information or identification information of the authentication apparatus.

4. The apparatus according to claim 1, wherein the at least one processor is coupled to the at least one memory to execute the instructions to:
   receive second information from a terminal apparatus, wherein the second information is used to request to release the locked state of the first vehicle; and
   send the first information in response to receiving the second information.

5. The apparatus according to claim 4, wherein the second information and the first information comprise identification information of the terminal apparatus.

6. The apparatus according to claim 4, wherein the second information and the first information comprise identification information of a second user of the terminal apparatus.

7. The apparatus according to claim 1, wherein the at least one processor is coupled to the at least one memory to execute the instructions to:
   when no information for indicating to maintain an unlocked state of the first vehicle is received within a preset time period after the unlocking indication information is received, or when the first vehicle is still in the locked state within a preset time period after the unlocking indication information is received,
   generate a locking control signal, wherein the locking control signal is used to control the first vehicle to be in the locked state.

8. The apparatus according to claim 1, wherein the unlocking indication information comprises first time information, and the first time information indicates a time period for which the first vehicle is to maintain an unlocked state.

9. The apparatus according to claim 1, wherein at least one of the first information or the unlocking indication information is periodically repeated information.

10. The apparatus according to claim 1, wherein the first information is the following message or is carried in the following message:
    a help-seeking message broadcast by the first vehicle;
    an authorization indication message sent by the first vehicle to the authentication apparatus, wherein the authorization indication message indicates that the authentication apparatus has obtained authorization to control the first vehicle; or
    a request message sent by the first vehicle to the authentication apparatus, wherein the request message is used to request the authentication apparatus to start control on the first vehicle based on authorization.

11. The apparatus according to claim 1, wherein the first information comprises second time information, and the second time information indicates a time period in which the authorized apparatus is capable of releasing the first vehicle from the locked state.

12. The apparatus according to claim 1, wherein:
    at least one of the first information or the unlocking indication information comprises vehicle lock indication information; and
    the vehicle lock indication information indicates a vehicle lock to be released from a locked state, and the vehicle lock to be released from the locked state comprises at least one of a driver-side door lock, a front-passenger-side door lock, a rear seat door lock, a rear trunk lock, a front trunk lock, or a sunroof lock of the first vehicle.

13. A vehicle control apparatus applied to a first vehicle, comprising:
    at least one processor; and
    at least one memory, wherein the at least one memory stores program instructions, and the at least one processor is coupled to the at least one memory to execute the instructions to:
       send first information to an authentication apparatus, wherein the first information is used to perform authorization or indicates that the first vehicle is in a first state, and wherein the first vehicle that performs authorization is in a locked state, a vehicle in the first state is in a locked state, or an authorized apparatus is capable of releasing a vehicle in the first state from a locked state;
       receive unlocking request information from a terminal apparatus, wherein the unlocking request information comprises verification information; and
       generate a control signal based on the verification information, wherein the control signal is used to release the locked state of the first vehicle.

14. The apparatus according to claim 13, wherein the at least one processor is coupled to the at least one memory to execute the instructions to:
    send second information to the terminal apparatus, wherein the second information indicates that the first vehicle is in the first state; or
    send second information to the terminal apparatus, wherein the second information indicates that the first vehicle authorizes the authentication apparatus or indicates the authentication apparatus.

15. The apparatus according to claim 14, wherein the second information comprises identification information of the first vehicle or identification information of a user that uses the first vehicle.

16. The apparatus according to claim 13, wherein the at least one processor is coupled to the at least one memory to execute the instructions to:
receive third information from the terminal apparatus, wherein the third information is used to request to release the locked state of the first vehicle, and wherein sending the first information to the authentication apparatus comprises:
sending the first information to the authentication apparatus in response to receiving the third information.

17. The apparatus according to claim 13, wherein the at least one processor is coupled to the at least one memory to execute the instructions to:
when no information for indicating to maintain an unlocked state of the first vehicle is received within a preset time period after the unlocking request information is received, or when the first vehicle is still in the locked state within a preset time period after the unlocking request information is received,
generate a locking control signal, wherein the locking control signal is used to control the first vehicle to be in the locked state.

18. The apparatus according to claim 13, wherein the unlocking request information comprises first time information, and the first time information indicates a time period for which the first vehicle is to maintain an unlocked state.

19. The apparatus according to claim 13, wherein at least one of the first information or the unlocking request information is periodically repeated information.

20. The apparatus according to claim 13, wherein the first information is or is carried in an in-vehicle emergency call (E-call) request message.

21. The apparatus according to claim 13, wherein the first information comprises second time information, and the second time information indicates a time period in which the authorized apparatus is capable of releasing a vehicle lock of the first vehicle from a locked state.

22. The apparatus according to claim 13, wherein:
at least one of the first information or the unlocking request information comprises vehicle lock indication information; and
the vehicle lock indication information indicates a vehicle lock to be released from a locked state, and the vehicle lock to be released from the locked state comprises at least one of a driver-side door lock, a front-passenger-side door lock, a rear seat door lock, a rear trunk lock, a front trunk lock, or a sunroof lock of the first vehicle.

23. A vehicle control apparatus applied to a terminal apparatus, comprising:
at least one processor; and
at least one memory, wherein the at least one memory stores program instructions, and the at least one processor is coupled to the at least one memory to execute the instructions to:
send authorization request information to an authentication apparatus, wherein the authorization request information is used to request to grant permission to release a locked state of a first vehicle;
receive authorization information from the authentication apparatus, wherein the authorization information comprises verification information, and the verification information indicates that the terminal apparatus is granted the permission to release the locked state of the first vehicle; and
send unlocking request information to the first vehicle, wherein the unlocking request information comprises the verification information, and the unlocking request information is used to request to release the locked state of the first vehicle.

24. A vehicle control apparatus applied to a first vehicle, comprises:
at least one processor; and
at least one memory, wherein the first vehicle is in a first state, a vehicle in the first state is in a locked state, or an authorized apparatus is capable of releasing a vehicle in the first state from a locked state, wherein the at least one memory stores program instructions, and wherein the at least one processor is coupled to the at least one memory to execute the instructions to:
receive request information from a second vehicle, wherein the request information is used to request to release the locked state of the first vehicle, the request information comprises verification information, and the verification information is used to verify whether the second vehicle has permission to release the locked state of the first vehicle;
determine, based on the verification information, that the second vehicle has the permission to release the locked state of the first vehicle; and
generate a control signal, wherein the control signal is used to release the locked state of the first vehicle.

25. The apparatus according to claim 24, wherein the at least one processor is coupled to the at least one memory to execute the instructions to:
obtain authorization information; and
determine, based on the verification information and the authorization information, that the second vehicle has the permission to release the locked state of the first vehicle, wherein:
when a user indicated by the verification information is a user indicated by the authorization information,
when a user type indicated by the verification information is a user type indicated by the authorization information,
when an apparatus indicated by the verification information is an apparatus indicated by the authorization information,
when an apparatus type indicated by the verification information is an apparatus type indicated by the authorization information,
when there is a correspondence between an apparatus indicated by the verification information and an apparatus indicated by the authorization information,
when there is a correspondence between a user indicated by the verification information and a user indicated by the authorization information, or
when the authorization information comprises authorization verification information and when the verification information belongs to the authorization verification information, the second vehicle has the permission to release the locked state of the first vehicle.

26. The apparatus according to claim 24, wherein the at least one processor is coupled to the at least one memory to execute the instructions to:
when no information for indicating to maintain an unlocked state of the first vehicle is received within a preset time period after the request information is received, or when the first vehicle is still in the locked state within a preset time period after the request information is received,
generate a locking control signal, wherein the locking control signal is used to control the first vehicle to be in the locked state.

27. The apparatus according to claim 24, wherein the at least one processor is coupled to the at least one memory to execute the instructions to:
  when the first vehicle is still in the locked state within a preset time period after the request information is received,
  generate a locking control signal, wherein the locking control signal is used to control the first vehicle to be in the locked state.

28. The apparatus according to claim 27, wherein the request information comprises sixth time information, and the sixth time information indicates a time period for which the first vehicle is to maintain an unlocked state.

29. The apparatus according to claim 24, wherein the request information is periodically repeated information.

30. The apparatus according to claim 24, wherein:
  the request information comprises vehicle lock indication information, and the vehicle lock indication information indicates a vehicle lock to be released from a locked state; and
  the vehicle lock to be released from the locked state comprises at least one of a driver-side door lock, a front-passenger-side door lock, a rear seat door lock, a rear trunk lock, a front trunk lock, or a sunroof lock of the first vehicle.

* * * * *